United States Patent
Zalon et al.

(10) Patent No.: US 10,990,350 B2
(45) Date of Patent: *Apr. 27, 2021

(54) AUDIO CONTENT PRODUCTION, AUDIO SEQUENCING, AND AUDIO BLENDING SYSTEM AND METHOD

(71) Applicant: SUPER HI FI, LLC, Los Angeles, CA (US)

(72) Inventors: Zack J. Zalon, Sherman Oaks, CA (US); Brendon Patrick Cassidy, Venice, CA (US)

(73) Assignee: SUPER HI FI, LLC, Los Angeles, CA (US)

(*) Notice: Subject to any disclaimer, the term of this patent is extended or adjusted under 35 U.S.C. 154(b) by 37 days.

This patent is subject to a terminal disclaimer.

(21) Appl. No.: 16/717,096

(22) Filed: Dec. 17, 2019

(65) Prior Publication Data

US 2020/0133628 A1 Apr. 30, 2020

Related U.S. Application Data

(63) Continuation of application No. 15/336,627, filed on Oct. 27, 2016, now Pat. No. 10,509,622.

(Continued)

(51) Int. Cl.
*G06F 3/16* (2006.01)
*G11B 27/036* (2006.01)
(Continued)

(52) U.S. Cl.
CPC .............. *G06F 3/165* (2013.01); *G05B 15/02* (2013.01); *G06F 3/16* (2013.01); *G10L 25/48* (2013.01); *G11B 27/036* (2013.01); *G11B 27/28* (2013.01)

(58) Field of Classification Search
CPC ...... G05B 15/02; G11B 27/28; G11B 27/036; G06F 3/16; G06F 3/165; G10L 25/48
(Continued)

(56) References Cited

U.S. PATENT DOCUMENTS 5,996,022 A 11/1999 Krueger et al.
6,236,974 B1 5/2001 Kolawa et al.
(Continued)

FOREIGN PATENT DOCUMENTS

WO 2005084219 A2 9/2005
WO 2005/113099 A2 12/2005

OTHER PUBLICATIONS

Korean Intellectual Property Office; PCT International Search Report, Issued in connection to PCT/US2016/059209; dated Feb. 9, 2017; 3 pages; Korea.

(Continued)

*Primary Examiner* — Hemant S Patel
(74) *Attorney, Agent, or Firm* — Greenberg Traurig, LLP

(57) ABSTRACT

Some embodiments include a production content server system with a computing device processing operations include causing a content reader server to couple to a content source with content using a wired or wireless link, and downloading at least one content file associated with content retrieved from the content source, where content file includes audio and/or a video. The operations include transcoding at least a portion of the at least one content file with a dynamic range compression to a specified dynamic range, equalization and duration, and processing at least one content audio file from the at least one content file. The operations further include storing the at least one content audio file to a production content database. Some embodiments include processing a production break audio file (Continued)

including blending the at least one production break audio file with at least one other content file.

16 Claims, 30 Drawing Sheets

Related U.S. Application Data

(60) Provisional application No. 62/246,849, filed on Oct. 27, 2015, provisional application No. 62/254,072, filed on Nov. 11, 2015, provisional application No. 62/393,522, filed on Sep. 12, 2016.

(51) Int. Cl.
  *G11B 27/28* (2006.01)
  *G05B 15/02* (2006.01)
  *G10L 25/48* (2013.01)

(58) Field of Classification Search
  USPC .................. 700/94; 709/201–207, 217–248
  See application file for complete search history.

(56) References Cited

U.S. PATENT DOCUMENTS

| | | |
|---|---|---|
| 6,370,513 B1 | 4/2002 | Kolawa et al. |
| 7,013,301 B2 | 3/2006 | Holm et al. |
| 7,032,177 B2 | 4/2006 | Novak et al. |
| 7,320,137 B1 | 1/2008 | Novak et al. |
| 7,487,180 B2 | 2/2009 | Holm et al. |
| 7,756,281 B2 | 7/2010 | Goldstein et al. |
| 7,783,623 B2 | 8/2010 | Acharya |
| 7,917,840 B2 | 3/2011 | Newman et al. |
| 8,260,778 B2 | 9/2012 | Ghatak |
| 8,656,264 B2 | 2/2014 | Newman et al. |
| 8,965,774 B2 | 2/2015 | Eppolito |
| 10,509,622 B2* | 12/2019 | Zalon ..................... G10L 25/48 |
| 2003/0093792 A1 | 5/2003 | Lebeeb et al. |
| 2003/0122966 A1 | 7/2003 | Markman et al. |
| 2003/0126599 A1 | 7/2003 | Novak et al. |
| 2005/0038819 A1 | 2/2005 | Hicken et al. |
| 2005/0065976 A1 | 3/2005 | Holm et al. |
| 2005/0192820 A1 | 9/2005 | Simon et al. |
| 2006/0020614 A1 | 1/2006 | Kolawa et al. |
| 2006/0026048 A1 | 2/2006 | Kolawa et al. |
| 2006/0143236 A1 | 6/2006 | Wu |
| 2006/0190450 A1 | 8/2006 | Holm et al. |
| 2006/0212149 A1 | 9/2006 | Hicken et al. |
| 2006/0217828 A1 | 9/2006 | Hicken |
| 2007/0270988 A1 | 11/2007 | Goldstein et al. |
| 2008/0190269 A1 | 8/2008 | Eom et al. |
| 2008/0215173 A1 | 9/2008 | Hicken et al. |
| 2008/0215599 A1* | 9/2008 | Yun ......................... G06Q 30/00 |
| 2008/0294277 A1 | 11/2008 | Hicken et al. |
| 2008/0306913 A1 | 12/2008 | Newman et al. |
| 2009/0012635 A1 | 1/2009 | Hicken et al. |
| 2009/0063459 A1 | 3/2009 | Acharya |
| 2009/0182736 A1 | 7/2009 | Ghatak |
| 2009/0228423 A1 | 9/2009 | Hicken et al. |
| 2009/0234712 A1 | 9/2009 | Kolawa et al. |
| 2009/0254541 A1 | 10/2009 | Kolawa et al. |
| 2009/0254554 A1 | 10/2009 | Hicken |
| 2009/0276066 A1* | 11/2009 | Callanan ................. G10L 13/08 700/94 |
| 2010/0083124 A1* | 4/2010 | Druzgalski .......... G06F 16/9537 715/738 |
| 2010/0241256 A1 | 9/2010 | Goldstein et al. |
| 2011/0173216 A1 | 7/2011 | Newman et al. |
| 2012/0110515 A1 | 5/2012 | Abramoff et al. |
| 2012/0226706 A1 | 9/2012 | Choi et al. |
| 2012/0331386 A1 | 12/2012 | Hicken et al. |
| 2013/0054251 A1 | 2/2013 | Eppolito |
| 2013/0057640 A1* | 3/2013 | Callahan ................. G06Q 30/02 348/14.02 |
| 2014/0189480 A1 | 7/2014 | Newman et al. |
| 2015/0018993 A1 | 1/2015 | Trivedi |
| 2015/0269256 A1 | 9/2015 | Hicken et al. |
| 2016/0054975 A1 | 2/2016 | Chang |

OTHER PUBLICATIONS

Korean Intellectual Property Office; PCT Written Opinion of the International Searching Authority, Issued in connection to PCT/US2016/059209; dated Feb. 9, 2017; 4 pages; Korea.
Korean Intellectual Property Office; PCT International Search Report, Issued in connection to PCT/US2016/059211; dated Feb. 6, 2017; 3 pages; Korea.
Korean Intellectual Property Office; PCT Written Opinion of the International Searching Authority, Issued in connection to PCT/US2016/059211; dated Feb. 6, 2017; 7 pages; Korea.

\* cited by examiner

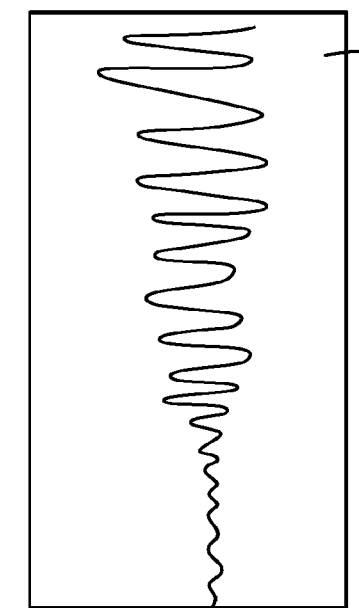
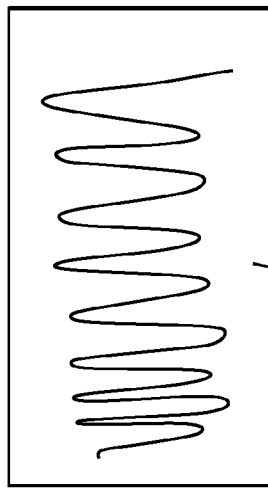
FIG. 20
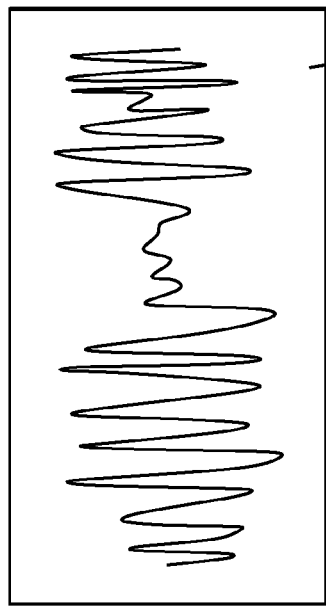
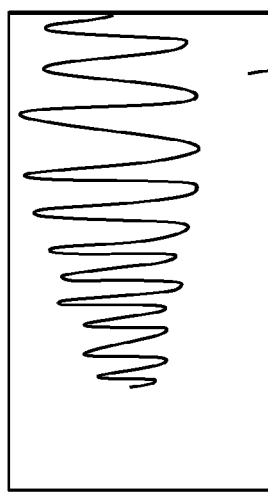
FIG. 21

AUDIO CONTENT PRODUCTION, AUDIO SEQUENCING, AND AUDIO BLENDING SYSTEM AND METHOD

RELATED APPLICATIONS

This application is a continuation application of U.S. application Ser. No. 15/336,627, filed Oct. 27, 2016, entitled "AUDIO CONTENT PRODUCTION, AUDIO SEQUENCING, AND AUDIO BLENDING SYSTEM AND METHOD", which claims the benefit of and priority to U.S. Provisional Application No. 62/246,849, filed Oct. 27, 2015, entitled "AUDIO CONTENT BLENDING SYSTEM AND METHOD", U.S. Provisional Application No. 62/254,072, filed Nov. 11, 2015, entitled "Production Content Creation Server, System and Method", and U.S. Provisional Application No. 62/393,522, filed Sep. 12, 2016, entitled "AUDIO CONTENT SEQUENCING", the entire contents of which are incorporated herein by reference.

BACKGROUND

Digital and internet radio services have globally transformed the delivery of audio content. The widespread use of digital formats such as compressed digital content has provided broadcasters with an almost infinite selection of content. When transitioning from one song (or other content) to another, most services do not strategically select content, and build a content sequence based on genre, or play content based on brand, DJ, and/or listener preferences.

Digital and internet services, and other interactive audio and audio-visual delivery services (e.g., such as iTunes, Spotify, Amazon Prime Music, Tidal, YouTube, etc.) generally include a gap between content or, often sub-optimally, overlap or juxtapose a verbal announcement, play a brief commercial, or fade to news, weather, or other information content at any time during a broadcast. Content is disconnected, with audible and visual gaps between the items causing a loss of energy, lack of continuity and disquieting sterility in the primary way in which users consume the content (i.e., through listening and watching). This content experience is undifferentiated, usually offering no way for a consumer to tell one service from another if merely listening. Generally, the listener has no control or influence over the type, content, and frequency of any introduced content element. There is a large potential market for a production engine that creates content to offer a customized playback experience with all or most content individualized for the listener or a target audience. The potential is to improve the experience of consuming the content by focusing on the presentation of the content: improving the flow between elements by adjusting placements; increasing the opportunity for differentiating the experience using personality and branding; dynamically adjusting the amplitudes of adjacent content for a less jarring auditory transition; artfully managing the disparity of energy between content items; and interjecting additional content to create a richer, more engaging overall consumption experience.

Some brands and/or listeners would prefer content playback personalization with broader and more selectable content to define specific moods or energy levels for specified time periods within a broadcast. There is a large potential market for services that offer a fully customized and automated playback experience where the content mood or energy can be customizable to the listener.

SUMMARY

Some embodiments include a production content server system comprising a computing device comprising at least one processor, and a non-transitory computer readable medium, having stored thereon, instructions that when executed by the computing device, cause the computing device to perform operations. The operations include causing a content reader server to couple to at least one content source with content using a wired or wireless link, and downloading at least one content file associated with at least some content retrieved from the content source, where content file includes at least one of an audio and a video. The operations include transcoding at least a portion of the at least one content file with a dynamic range compression to a specified dynamic range, equalization and duration, and processing at least one content audio file from the at least one content file. The operations further include storing the at least one content audio file to a production content database.

In some embodiments of the invention, the operations include translating any headline and article text associated with the at least one content file and processing to rendered speech using a speech to text file. The operations can also include processing the rendered speech to audio speech files, the audio speech files being specified to a pre-selected dynamic range, equalization and duration, and processing the at least one content audio file with audio actuality of content derived from the at least one content file and the speech file. Further, the at least one content audio file comprises at least one multimedia element included based on a context of any complete or partial story of the content.

In some embodiments, the at least one content source includes at least one of an RSS feed, a JSON file, a POX file, a CSV file, and a text file. In some further embodiments, the at least one content source comprises a third-party server or database, and/or at least one internal server or database of the production content server system.

In some further embodiments, the content includes a news article, and/or a news brief, a news event, and/or a news break, and/or a news announcement, and/or a current news event, lifestyle related news, and/or social media news, and/or a past or historical news event. In some embodiments, the content includes an article or event, and/or a commercial or ad, and/or announcer information, and/or DJ information, and/or at least a portion of a song, and/or music, sound effect, and/or trivia information, and/or weather information, and/or lifestyle related information, and/or social media information, and/or interviewer or interviewee information.

Some embodiments include a content maker server front end coupled to the production content database. The content maker server front end is configured and arranged to select and assemble production content using at least one content audio file from the production content database.

In some embodiments of the invention, the operations comprise receiving from a user content break parameters including a type of content, and/or a content age or currency, and/or a number of content articles to include, and/or a language, and/or a start time, and/or a volume, and/or a duration of a single content article or group of content articles, and/or user or system-specified defaults. The operations also include retrieving at least one content audio file by accessing the production content database, where the at least one content audio file is selected based at least in part on the content break parameters. Further, the operations include attempting preparation of at least one sequence including a timing to voice start using the at least one content file, where a successful attempt is based at least in part on user provided priorities, one or more priorities from the content break parameters, and one or more parameters from the at least one new content audio file. For a successful attempt, the sequence is used and a production break audio file includes the at least one content audio file. For an unsuccessful attempt, the operations include returning to retrieving at least one content audio file and repeating attempting preparation of the at least one sequence using a number of breadth of content themes and content times that exceeds the breadth of content themes and content times of prior attempts.

In some embodiments, the operations comprise selecting at least one production break audio file, and blending the at least one production break audio file with at least one other content file. In some embodiments, the at least one other content file includes a song and/or a music audio file. In some further embodiments, the blending comprises an overlap between the at least one production break audio file and the at least one other content file. In some embodiments, the blending is based on a mood, and/or a specific voice override, and/or a style, and/or a genre of the at least one other content file. In some further embodiments, the production break parameters include a mood, and/or a specific voice override, and/or genre of the at least other content file. In some other embodiments, at least one other content file is selected based at least in part on an availability of production break audio file and the mood, a specific voice override, and genre of the at least other content file.

Some embodiments of the invention include a production content server system comprising a computing device comprising at least one processor, and a non-transitory computer readable medium, having stored thereon, instructions that when executed by the computing device, cause the computing device to perform operations. The operations include causing a content maker engine to couple to at least one content server or database, where the at least one content server or database includes at least one content audio file, and the at least one content audio file comprises content from at least one content source. The content includes audio and/or video. Further, the operations include receiving from a user content break parameters including a type of content, and/or a content age or currency, and/or a number of content articles to include, and/or a language, and/or a start time, and/or a volume, and/or a duration of a single content article or group of content articles. Further, the operations include retrieving at least one content audio file by accessing the production content database. The at least one content audio file is selected based at least in part on the content break parameters. The operations further include attempting preparation of at least one sequence including a timing to voice start using the at least one content file, where a successful attempt is based at least in part on user provided priorities, one or more priorities from the content break parameters, and one or more parameters from the at least one new content audio file. For a successful attempt, using the sequence, processing a production break audio file including the at least one content audio file, and for an unsuccessful attempt, returning to retrieving at least one content audio file and repeating attempting preparation of the at least one sequence using a greater number of breadth of content themes and content times than used in any one previous attempt, and blending the at least one production break audio file with at least one other content file.

In some embodiments, the at least one other content file includes at least one of a song and a music file. In some further embodiments, the at least one content source comprises at least one of a third-party server or database, at least one internal server or database of the production content server system, a JSON file, a POX file, a CSV file, a TEXT file, and an RSS feed. In other embodiments, the blending comprises an overlap between the at least one production break audio file and the at least one other content file. In some further embodiments, the blending is based on a mood, and/or a specific voice override, and/or a style, and/or a genre of the at least one other content file.

In some embodiments, the production break parameters includes a mood, and/or a specific voice override, and/or genre of the at least one other content file. In some embodiments, the at least one other content file is selected based at least in part on an availability of production break audio file and the mood, a specific voice override, and genre of the at least one other content file. In some embodiments, the content includes a news article, and/or a news brief, and/or a news event, and/or a news break, and/or a news announcement, and/or a current news event, and/or lifestyle related news, and/or social media news, and/or a past or historical news event. In some further embodiments, the content includes an article or event, and/or a commercial or ad, and/or announcer information, and/or DJ information, and/or at least a portion of a song, and/or music, and/or sound effect, and/or trivia information, and/or lifestyle related information, and/or social media information, and/or weather information, and/or interviewer or interviewee information.

DESCRIPTION OF THE DRAWINGS

FIG. 20 illustrates a transition determination between content items in accordance with some embodiments of the invention.

FIG. 21 illustrates a transition determination between content items in accordance with some embodiments of the invention.

DETAILED DESCRIPTION

Figure 1A:
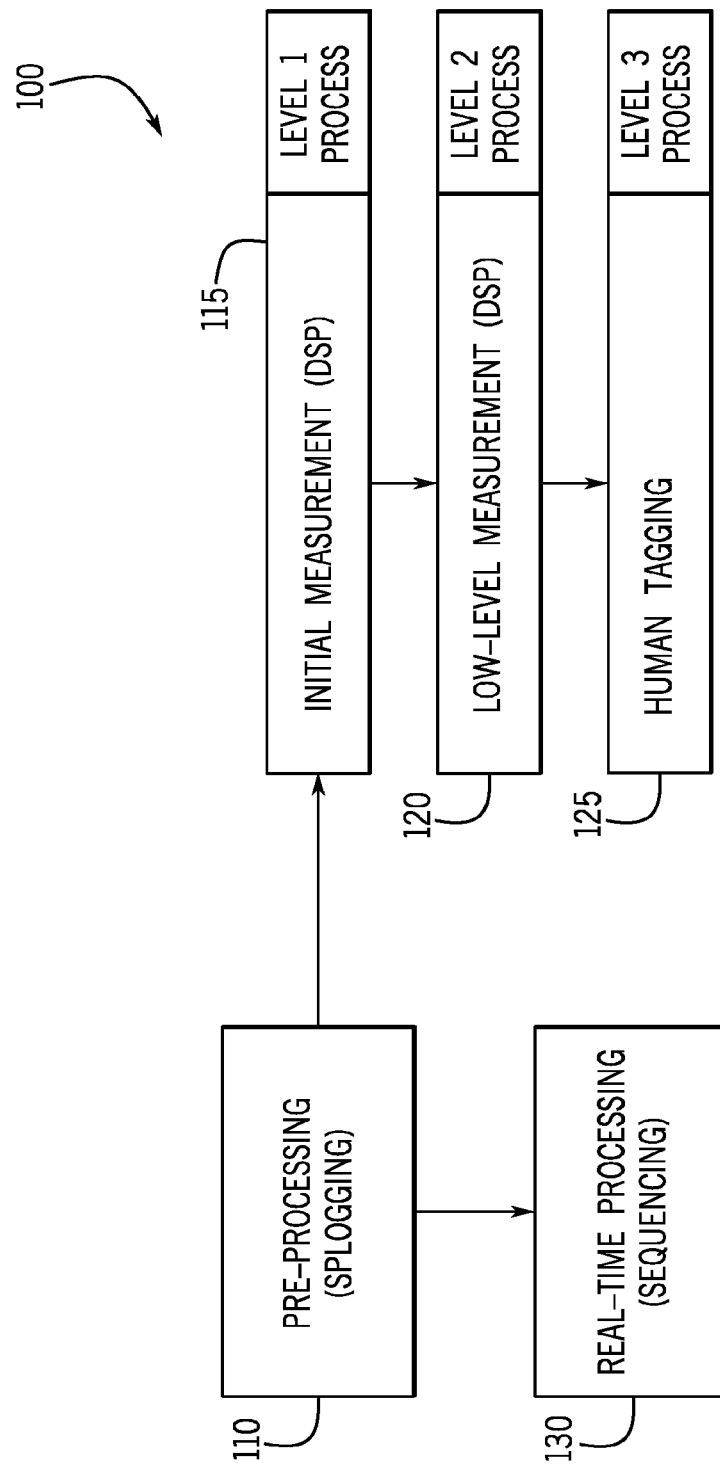
FIG. 1A depicts a process flow of an audio blending system and method according to some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention disclosed herein include systems and methods for transitioning one audio or audio-visual content to another audio or audio-visual content. Some embodiments of the invention disclosed herein include systems and methods for creation of audio or audio-visual content. The inventions described herein can apply to audio content, visual (e.g., video) content operating on fixed and/or mobile devices. For example, in one non-limiting example, the content can include one or more songs (or tracks). However, other embodiments can include audio content blocks (interstitials, ads, programs, features, etc.), or video elements such as video frames or images and/or movie content. Some embodiments of the invention described herein can be used with audio-only content and/or with audio-visual content. As used herein, the systems and methods with processes describing audio can apply to audio and video. Moreover, some embodiments can operate equally with different types of content (e.g., content that includes methods described as non-limiting embodiments for music can operate with other types of content such as songs, vocals, announcements, sound effects, commercials, and so on). Moreover, in some embodiments, for video content, the features of both the audio and the visual information can be used to determine transition behavior.

Some embodiments of the systems and method described herein can support any type of linear content experience where content elements (herein referred to as "elements") are played in a sequence. In some embodiments, non-linear behaviors (such as a user skipping content elements) can also be driven by the systems and methods to improve the interactive behavior of the experience. These linear content experiences can include, but are not limited to, algorithmic radio, human programmed radio, playlist playback, randomized shuffle playback, communally programmed experiences, news programming, and any combination thereof. In some embodiments, the content can comprise a plurality of content or elements, including, but not limited to, music files, general audio content (such as ads, interviews, podcasts, news, sound effects, etc.), video content, or any combination of the aforementioned elements. For example, some embodiments include a content that comprises a content item or a plurality of content items, each of which can comprise one or more elements. Further, in some embodiments, an element or plurality of elements can be a content item and/or content. As used herein, elements and content items can be used interchangeably. Further, in some embodiments, these content experiences can also be interactive (where the user can advance or rewind in the content), or can be non-interactive (like a traditional terrestrial radio broadcast).

Some embodiments include audio features extracted from the two content items that are being transitioned to make decisions. These audio features can be extended to additionally include video features (or a combination of audio and video features) for transitioning of video items. In some embodiments, this feature extraction can be performed using a combination of digital signal processing (DSP) and optionally can include a human analysis ("tagging"). As used herein, this analysis and feature extraction is termed "splogging", and the feature data can be called "splog data". In some embodiments, features gathered through DSP processes and/or human collection can enable the system and method engine derive a confidence about any specific content overlay, which can be used in deciding when and where to do the overlay process. In addition, these features also allow for the artful placement and timing of overlays in concordance with the salient temporal moments in the content (sometimes called "posts"). For example, an understanding of rhythmic, chordal and melodic content in a song over time can drive the system engine to appropriately overlay an announcer or advertising message (with a content-appropriate voice and mood) right up to the point where the song's vocals begin, and without overlapping over the vocals. Further, the understanding of amplitude information also important. As used herein, the DSP process is sometimes called "feature extraction."

In some embodiments, based at least in part on programmed heuristics, the systems and methods described herein can interject additional content between or over the transitioning content. This can improve the quality of the transition, and to satisfy a set of criteria that govern the branded experience (herein referred to as "Formatics"). Further, this can satisfy other factors that govern the experience (such as rate of advertising or inclusion of breaking newscasts). In some embodiments, these extended transitions can be crafted element by element, layer by layer in real time or near real time, and can be driven by a plurality of individual algorithmic decisions. In other embodiments, the transitions can conjoin several pre-produced content elements.

In some embodiments, the system and method can extract intrinsic attributes (such as those that are derived from the splogging process), metadata attributes (such as title, artist, voice, script/lyrics, theme, etc.), applied attributes (such as an arbitrary grouping), and user-specific attributes (e.g., such as when the user last experienced the content, and/or when the user last experienced a related attribute of the content such as voice talent, artist, album, genre, etc.). In some embodiments, the system and method can allow individual content elements to be spread out over time so that produced transitions are perceived by the user or listener as being fresh and entertaining.

Using one or more embodiments as described herein, content can be produced in real time by assembling each element based on those that surround it (and their inherent features), and/or the user's preferences and history, and/or the Formatics of the broadcast channel in which the content is being experienced. In some embodiments, this can enable advertisements to be "made native" with the content that surrounds them. These advertisements (as interjected content) can have dynamic voice talent, energy of read, underscore, content overlay, sound effects, that is custom-selected for the specific transition, user and content channel. The transition between elements can be used to produce content creating new elements that are either injected into the transition or become content items or elements in their own right. Using embodiments of the method as described here can enable the creation of an audio news broadcast operating essentially non-stop (24 hours per day, 7 days per week) that consists entirely of content assembled for the listener.

Some embodiments of the invention include an audio blending system and method capable of characterizing one or more parameters of a first content (e.g., such as one audio track), one or more parameters of a second content (e.g., such as another audio track), and blending at least a portion of the first content with the second content. In some embodiments, the audio blending can be based at least in part on one or more of the parameters of the first content and/or the second content. In some embodiments of the invention, the audio blending system and method can include at least one machine process such as a process performed by a computer system based on one or more software modules of the audio blending system and method. In some embodiments, the audio blending system and method can include one or more analysis methods performed by a human analyst. In some embodiments of the invention, the audio blending system and method can analyze one or more contents using at least one computer system based method and at least one human analyst or operator.

In some embodiments, the audio source can comprise recorded audio from a computer network or server. In some embodiments, the audio source can comprise recorded audio from a third-party computer network or server. For example, in some embodiments, the audio source can comprise a recorded audio downloaded or streamed from a third-party web server that includes one or more song recordings, one or more advertisers, and/or one or more news or weather announcements. In some embodiments, the one or more advertisers, and/or one or more news or weather announcements can comprise recordings of human announcers. In other embodiments, the one or more advertisers, and/or one or more news or weather announcements can comprise synthetic or machine speech generated from one or more text files.

The audio information processed by any of the audio blending methods described herein can derive audio information from any audio source originating from or owned by one or more individuals, any brand, and from any third party. In some embodiments of the invention, the audio source can comprise recorded audio, live audio, or mixture of recorded and live audio. For example, in some embodiments, the live or recorded audio can comprise audio produced by a singer, a vocalist, an actor, a member of the public, an instrument, and/or a band. In some embodiments, the live or recorded audio can comprise audio produced by an announcer such as a disc jockey (hereinafter referred to as a "DJ"), a news anchor, or other announcer.

In some further embodiments, the live or recorded audio can comprise at least one synthetic or computer-generated sound. In some embodiments, the audio source can comprise a live or recorded bit-stream (e.g., such as a streaming audio sent over the Internet). In some embodiments, the audio source can comprise a dual or other multichannel audio source comprising one or more mixed audio signals. In some embodiments of the invention, the audio source can include an overlaid or embedded audio. For example, in some embodiments, the overlaid or embedded audio can comprise a verbal announcement including, but not limited to, a DJ announcement, a news announcement, a weather announcement, or a commercial announcement. In some embodiments, the audio source can include overlaid or embedded data.

FIG. 1A depicts a process flow 100 of an audio blending system and method according to some embodiments of the invention, and covers content pre-processing (feature extraction and attribution) along with the real-time processing where the content is sequenced. In some embodiments, the audio blending system and method can comprise a pre-processing or "splogging" process or set of processes (shown as 110). For example, in some embodiments, a content item entering the pre-processing function of the audio blending system and method can be processed using one or more digital signal processes including, but not limited to, an initial measurement (hereinafter termed a "level 1 process" and shown as 115), and a low-level measurement (hereinafter termed a "level 2 process" shown as 120). In some embodiments, the pre-processing or "splogging" process can include at least one process or portion of a process performed by one or more humans. For example, in some embodiments, a human tagging process can be used (hereinafter termed a "level 3 process" and shown as 125). In some embodiments, using the human tagging process, a human analyst or operator can visually and/or audibly characterize a portion of a content item and assign one or more parameters to a content item or to a section of a content item. Embodiments of a tool used to implement the human tagging process are shown in FIGS. 14-24, and discussed further below. Any output from the pre-processing or "splogging" process can be sequenced substantially in real time (shown as 130). Real time and near-real time sequencing and content creation are described in more detail below. The audio blending system and method can perform a splogging of the features and generate stitch data (e.g., using the processes 115, 120) that includes a mechanism of analyzing extracted feature files (e.g., such as ~5 MB on average per song) and producing a record of stitch data, and the stitch data can include derived features required to perform stitch action on an element (which as an example, the record size may be approximately 2k per element).

In some embodiments, the audio blending system and method can perform an ingestion of content and feature extraction. In some embodiments, for each file to be ingested, the following steps can be performed: 1. Copy/download/move file into system, 2. Transcode file to from its source format to a common format, 3. Extract any metadata from the file or shared data packet, 4. Perform feature extraction using a. A standard analysis suite (see Essentia Basid dataset or Acoustic Brainz extractor), b. Extended loudness descriptors (lufs), c. Extended tonal and melodic descriptors (melodic pitch, chords and keys), d. Extended beat-based deltas (amplitude and harmonic deltas); and 5. Generate an acoustic fingerprint (optional; using Chromaprint) as a representation of the audio file (also known as perceptual hashing), 6. Create a waveform image (optional; using wave2png), 7. Store extracted files (audio features, fingerprint and waveform image) in storage, 8. Update database to reference extracted metadata and stored feature assets.

In some embodiments, the audio blending system and method can perform processes 115, 120 where for each file to be analyzed, steps can comprise: 1. Collect the stored feature assets and metadata for the item; 2. Identify the general mood of the content using features compared to profiled feature averages for content with a similar genre (including features for tempo, danceability, beats loudness, general loudness, etc.); 3. Scan for inset and outset of content using fine-grained amplitude data; 4. Identify if the content has a "hidden track" and truncate it (a hidden track is a bit of sound data after a large period of silence); 5. Identify fade out; 6. Identify the classified type of fade and if the fade is smooth or rhythmic based on duration and amplitude profiles; 7. Identify where a "blocking" prominent feature comes in at the beginning of the item (singing or prominent mid-range melodic element—like a saxophone); 8. Identify other moments of musical importance or change prior to the blocking prominent feature based on rhythmic, harmonic and amplitude-based features; 9. Classify the type of start for the content, if it fades in and if it is rhythmic or not; 10. Identify the specific mood of the start and end of the content compared to the general mood and driven by previously discovered features; 11. Update "genre norms" to contain this content's Features; and 12. Store in the computed feature database. In some embodiments, during a beat analysis, the beat position can be analyzed for spectra between each beat and including amplitude and distribution of spectrum between each beat. In some embodiments, the melody analysis can include a frame by frame analysis of melody with a confidence level analysis applied that can be used to identify a location to place a voiceover. "Genre Norms" can be calculated based on groupings of the content that are relevant to the deploying partner. They can be organized around genre or other groupings. The content in that grouping can be used to gain an understanding for the norm for the values of the genre that can be used for feature extraction (via machine and human listening, and subsequent analysis). This method can allow an understanding of how far outside of a collections norm a piece of content falls. For example, a "wild and crazy" classical piece will differ greatly from a "wild and crazy" punk rock anthem. In context, they will both be on extremes, but compared together and they are different, and this technique normalizes for these differences in perceptive scales.

Some embodiments include a "fusion" of level 3 splogged features with processes 115, 120 features and generation of new stitch data. For example, some embodiments include data fusion where for each file to be fused, a series of process steps include: 1. Data from processes 115, 120 (and keep the stored feature analysis data around); 2. Read in the level 3 process 125 splogged data; 3. Merge the two datasets with a priority on level 3 process 125 features; 4. Compute new range datasets based on level 3 process 125 ranges; and 5. Store in the computed feature database.

Figure 1B:
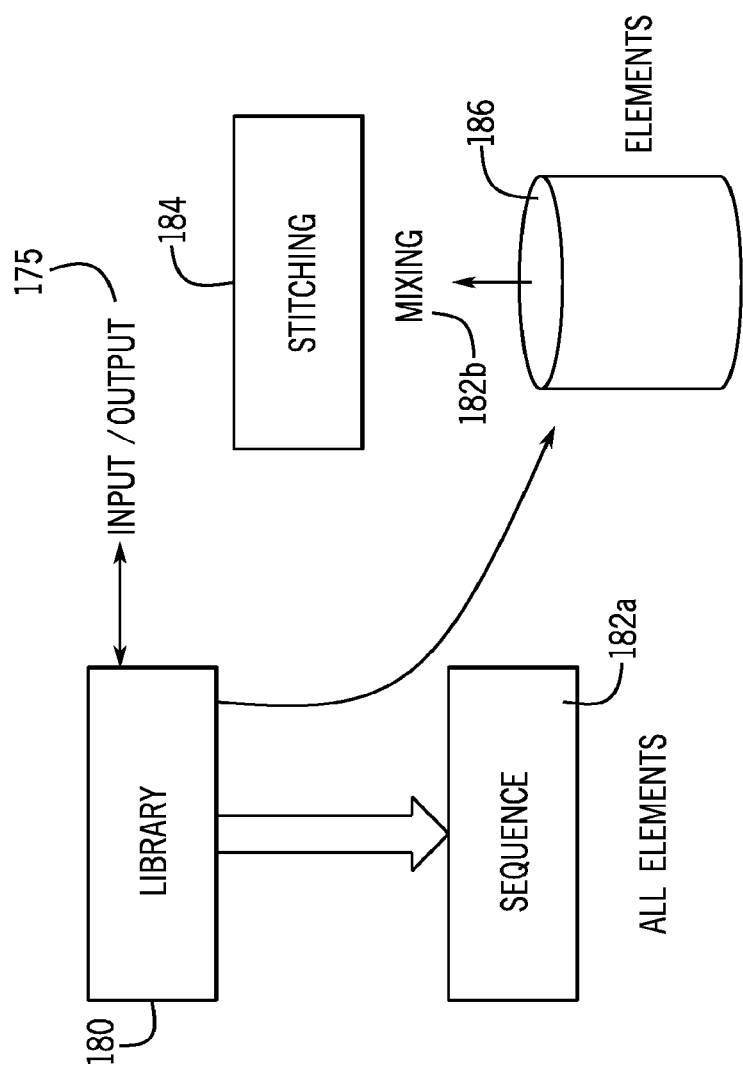
FIG. 1B illustrates a system overview of the audio blending system and method in accordance with some embodiments of the invention.

FIG. 1B illustrates a system overview 175 of the audio blending system and method in accordance with some embodiments of the invention. In some embodiments, any of the joining or blending processes described herein can be accomplished using the system illustrated in FIG. 29. In some embodiments, the audio blending system and method can build or process a library of elements 180 within a library database 186 that can be within the content pool for use with sequencing 182a and mixing 182b processes. The sequencing 182a can take into account all the elements of a constructed sequence, and using the content and order, stitching processes 184 can be used with any of the library content built by the audio blending system and method.

In some embodiments, the audio source can include an audio file format that can comprise an uncompressed audio format. In other embodiments, audio file format can comprise a compressed audio format. In some embodiments, the compressed file format can be a lossless compressed file format. In other embodiments, the compressed file format can be a lossy compressed file format. In some embodiments, the audio source can comprise an audio content element stored as an audio coding format characterized by a file extension. For example, in some embodiments, the audio content element can be stored as an MPEG layer III audio format and can comprise a digital file with a file extension of .mp3. In some further embodiments, the audio content element can be stored as an audio coding format characterized by a file extension including, but not limited to, "0.3gp", ".act", ".aiff", ".aac", ".amr", ".ape", ".au", ".awb", ".dct", ".dss", "dvf", ".flac", ".gsm", ".iklax", ".ivs", ".ivs", ".m4a", ".m4p", ".mmf", ".mpc", ".msv", ".ogg" ".oga" ".opus" ".ra" ".rm" ".raw" ".sln", ".tta", ".vcx", ".wav", ".wma", ".wv"., or ".webm".

In some further embodiments of the invention, the audio source can comprise an audio content element stored within a video coding format characterized by one or more codecs including, but not limited to, "libtheora", "Dirac", "x264", "Xvid", "FFmeg", "FFavs", "Blackbird", "DivX", "3ivx", "Nero Digital", "ProRes 422", "ProRes 4444", "Sorenson Video", "Sorenson Spark", "VP3", "VP4", "VP5", "VP6", "VP7", "VP8", "VP9", "DNxHD", "Cinema Craft Encoder SP2", "TMGEnc", "Windows Media Encoder", "Cinepak", "Indeo Video", "TrueMotion S", "RealVideo", "HffyLuv", "Lagarith", "MainConcept", "Elecard", and "Codec".

Figure 2:
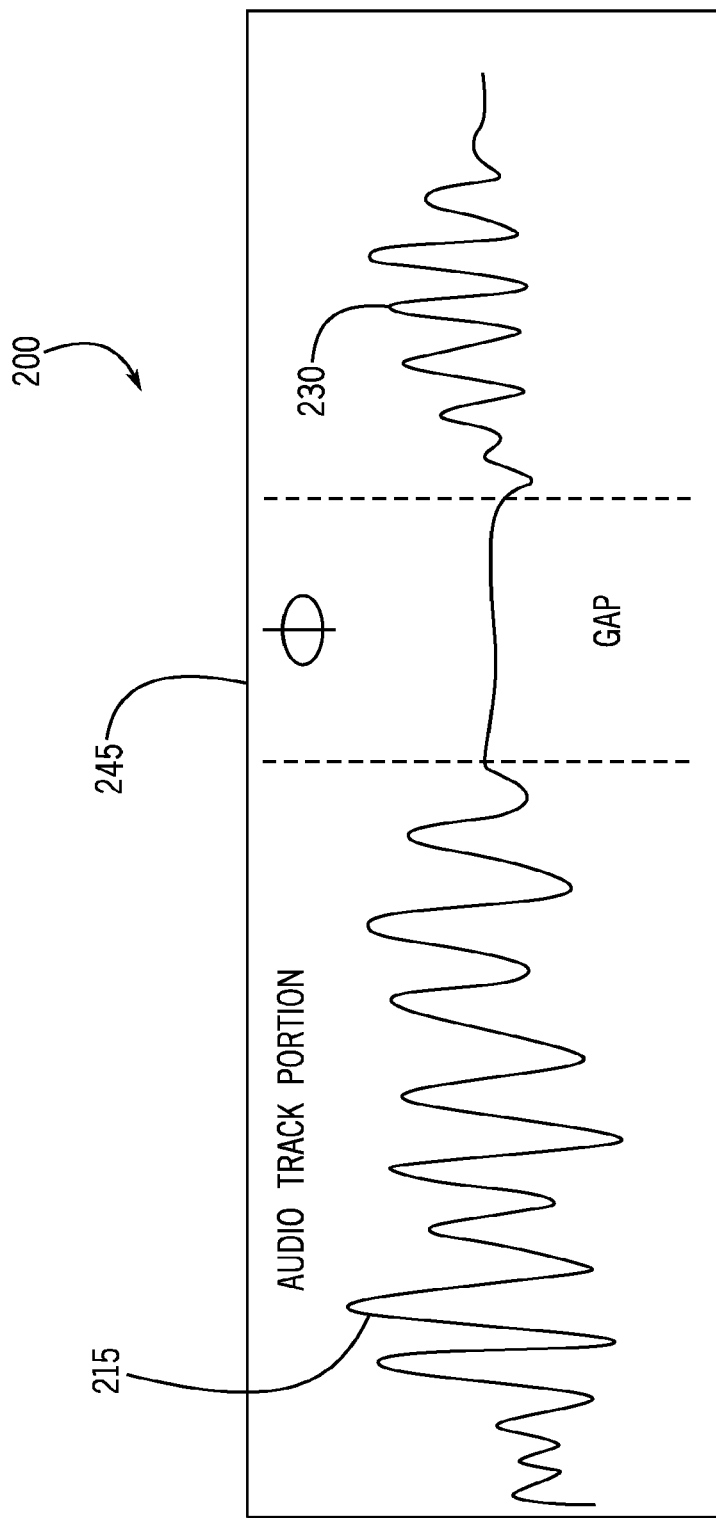
FIG. 2 illustrates application and use of an audio blending system and method for a content item illustrating gaps between items in accordance with some embodiments of the invention.

In some embodiments of the invention, a content item derived from any of the sources described herein can include one or more gaps or periods of silence or near-silence where the sound level may be about zero dB or any other sound level which is largely undetectable by humans without significant hearing damage. Using one or more of the methods described herein, gaps can be identified and removed, reduced, and/or replaced with other audio content. For example, FIG. 2 illustrates application and use of an audio blending system and method for a content item 200 illustrating gaps between items in accordance with some embodiments of the invention. In some embodiments, a user can use the audio blending system and method to analyze at least a portion of a content item 200 and determine the existence of one or more one or more gaps or periods of silence or near-silence (shown as 245 between a first segment 215 and a second segment 230 of the content item 200). In some embodiments, a user can use the audio blending system and method to remove, infill, or play audio during the identified gaps. In some further embodiments, a user can use the audio blending system and method to determine the location of one or more gaps or periods of silence or near-silence, and process a transition from about the beginning of the gap to at least partially through the gap. In some embodiments, the transition can comprise one or more portions of content from either side of the gap, or a portion of another content item such as a song or announcement as described herein. In some embodiments, the content item portion can be analyzed using a level 1 process and/or a level 2 process described earlier with respect to FIG. 1. In some further embodiments, the content item portion can be analyzed using a level 3 process. In some embodiments, of any pool of content (e.g., comprising 12 million audio files), 80-90% can be analyzed using a level 1 and/or a level 2 process, and 10-20% can be analyzed using a level 3 process. In some embodiments, a manual or auto set start and end points around dead-space (gap) can be defined. Any of the methods for transitions described herein can be used based on one or more audio features of content (e.g., such as the first segment 215 and a second segment 230 of the content item 200). Furthermore, any of the methods described herein can be varied based one or more audio features of content (e.g., such as the first segment 215 and a second segment 230 of the content item 200). As such, any of the methods for transitions described herein should be considered as non-limiting embodiments.

Figure 3:
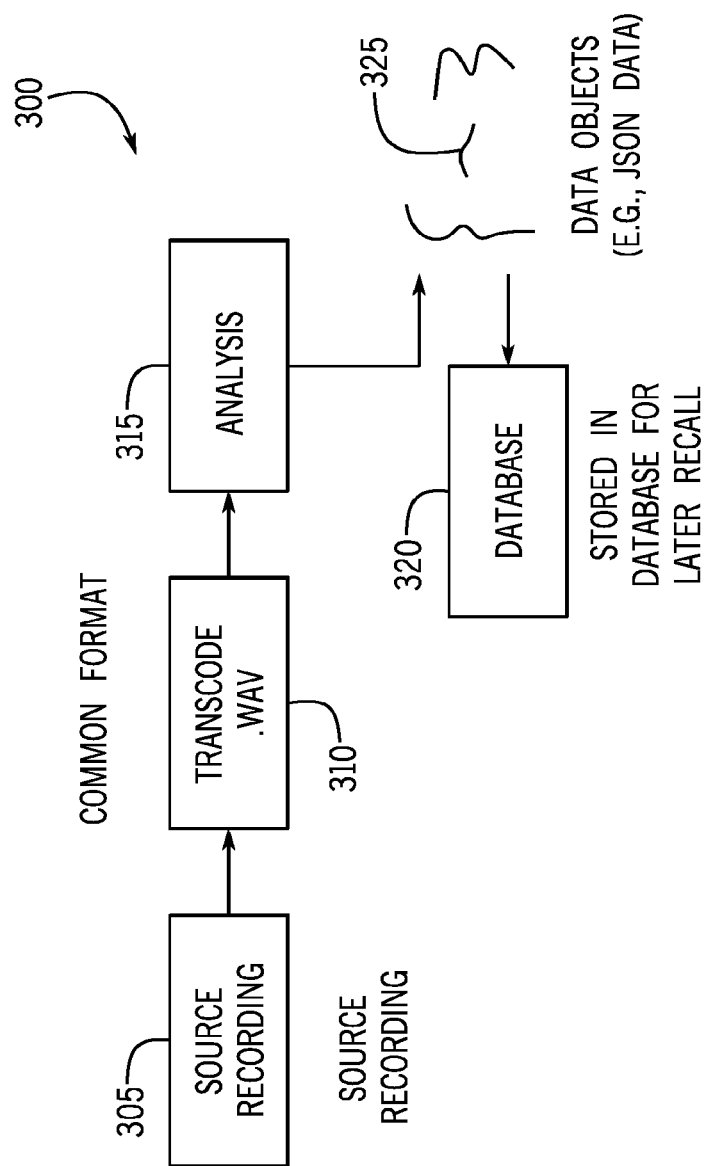
FIG. 3 illustrates a source track analysis and coding in accordance with some embodiments of the invention.

In some embodiments of the invention, audio content can be transcoded to an audio file format such as a .WAV file format. For example, FIG. 3 illustrates a source track analysis and coding 300 in accordance with some embodiments of the invention. In some embodiments, a production content creation server, system and method can perform an analysis of the audio file format (e.g., such as by using level 1, level 2, and/or a level 3 process). In some embodiments, the production content creation server, system and method can perform an analysis 315 using a source recording transcoded to a common format (e.g., such as a .WAV format 310), and output a series of data objects 325 (e.g., such as JSON data) which can be stored in a database 320 for later use and/or analysis. In this instance, the original source file 305 does not have to be re-analyzed each time the audio content is used for production content creation and/or playback. In some further embodiments of the invention, a source recording 305 can be transcoded to a .WAV file format with an acoustic fingerprint. In some embodiments, a HASH can be applied on the source (e.g., such as MD5, SHA1, 512), and an acoustic fingerprint added to the file as processed by the production content creation server, system and method. In some embodiments, audio files including fingerprints can enable the audio content system and method to use and reuse audio content without the need for reprocessing. In some embodiments, acoustic fingerprints can enable audio content identification using acoustic markers. Distinguishable from watermarks, such fingerprints can be derived from actual audio content and can survive some conventional destructive actions such as stereo to monaural conversion, lower bit rates, and the like. In one non-limiting example, one or more audio files from a compact disk or other digital format can be analyzed using at least one of the methods of the audio system and method (e.g., such as a level 1, level 2, and/or a level 3) and stored for playback or use by the audio system and method without audio analysis reprocessing. In this example, an identical song from another source (e.g., such as from an Apple iTunes® download) recorded as a FLAC digital file will have a different HASH than the .WAV file; however the fingerprint will be the same, and there is no need to reprocess. In some embodiments, the audio features can be used to align any temporal differences between the identically identified acoustically hashed files. iTunes® is registered trademark of Apple Inc.

Figure 4:
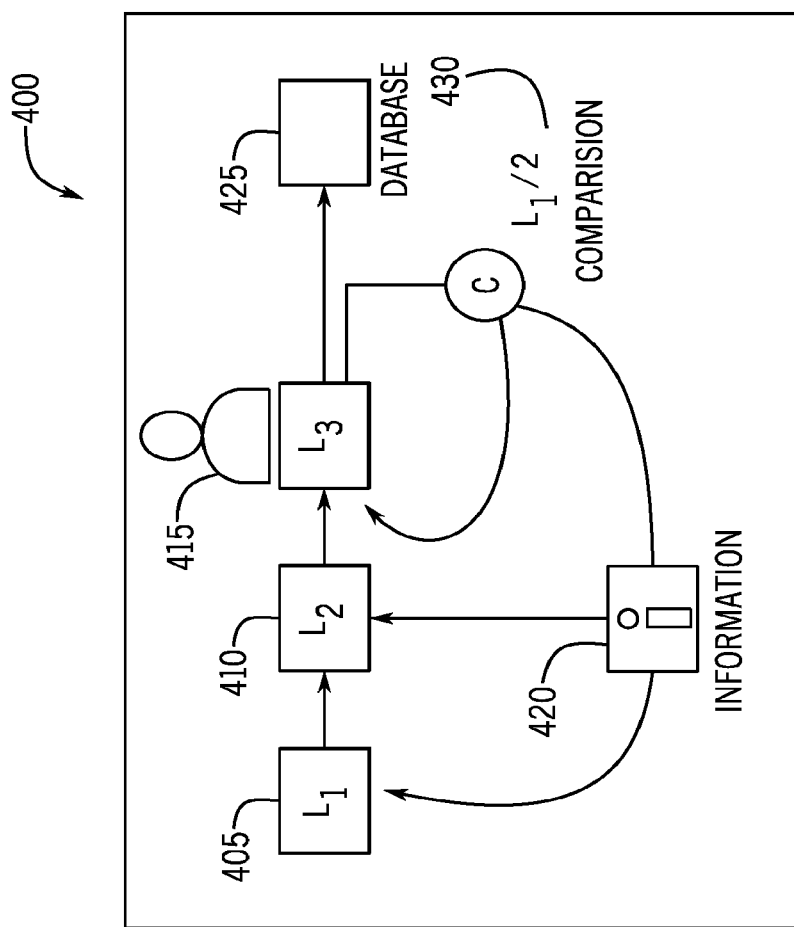
FIG. 4 is a content item processing method in accordance with some embodiments of the invention.

In some embodiments of the invention, the audio blending system and method can perform an analysis of the audio file format using a level 1 process, a level 2 process, and a level 3 process. Some embodiments include a comparison between the outputs of one or more processes and a subsequent revalidation. For example, FIG. 4 illustrates an example embodiment of a content item processing method 400 where audio analysis of level 1 (405) and level 2 (410) processes can be compared and re-validated using a level 3 (415) process. Further, in some embodiments, an output from a level 3 (415) analysis can include parameters that are analyzed and/or reused by level 1 and/or level 2 processes. In some embodiments, this process can be used to skip a level 3 (415) analysis. For example, an audio analysis of level 1 (405) and level 2 (410) processes can be compared and re-validated through comparison process 430 using a level 3 (415) processes. In some further embodiments, data 420 from a level 3 analysis can include information that can be reused in a level 1 (405) and/or level 2 (410) analysis.

In some embodiments, the level 1 data can comprise a JSON file generated by a third-party. For example, some embodiments include one or more JSON files comprising full file high level descriptors downloaded from AcousticBrainz (https:/acousticbrainz.org). The data can comprise sets of averaged analysis data across the entire audio file. The AcousticBrainz project includes crowd source acoustic information and describes the acoustic characteristics of music and includes low-level spectral information and information for genres, moods, keys, scales, etc. In some other embodiments, the JSON data can be downloaded from other third-parties including Echonest.com (the.Echonest.com). In some embodiments, the level 2 (410) analysis can comprise a detailed analysis beat by beat and/or millisecond of track verses millisecond of track including LUFS analysis with an overall loudness and a moment by moment view, a beat analysis, melody analysis, fade-in and fade-out analysis, harmonic analysis with harmonic progression and chord structure.

Figure 5:
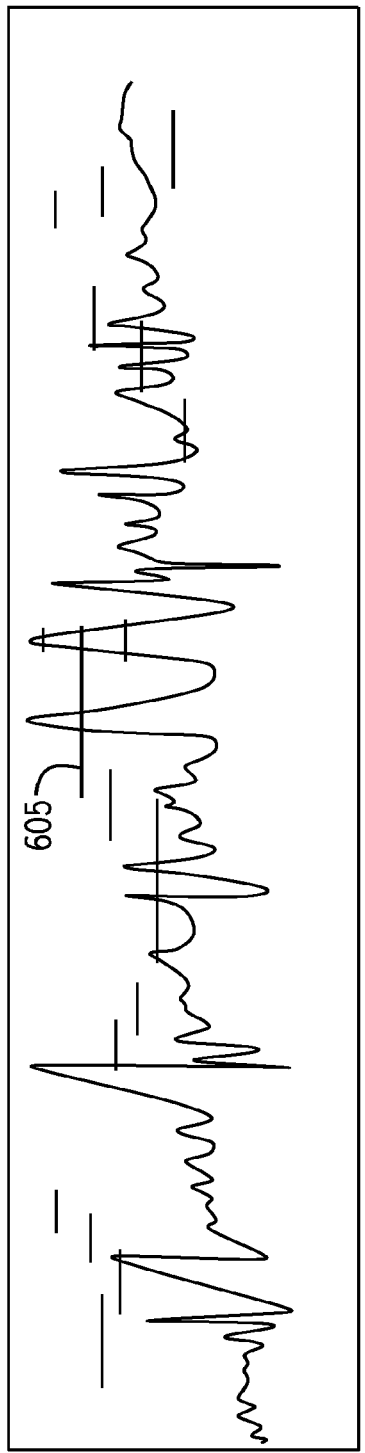
FIG. 5 represents a melody identification of a content item in accordance with some embodiments of the invention.
Figure 6:
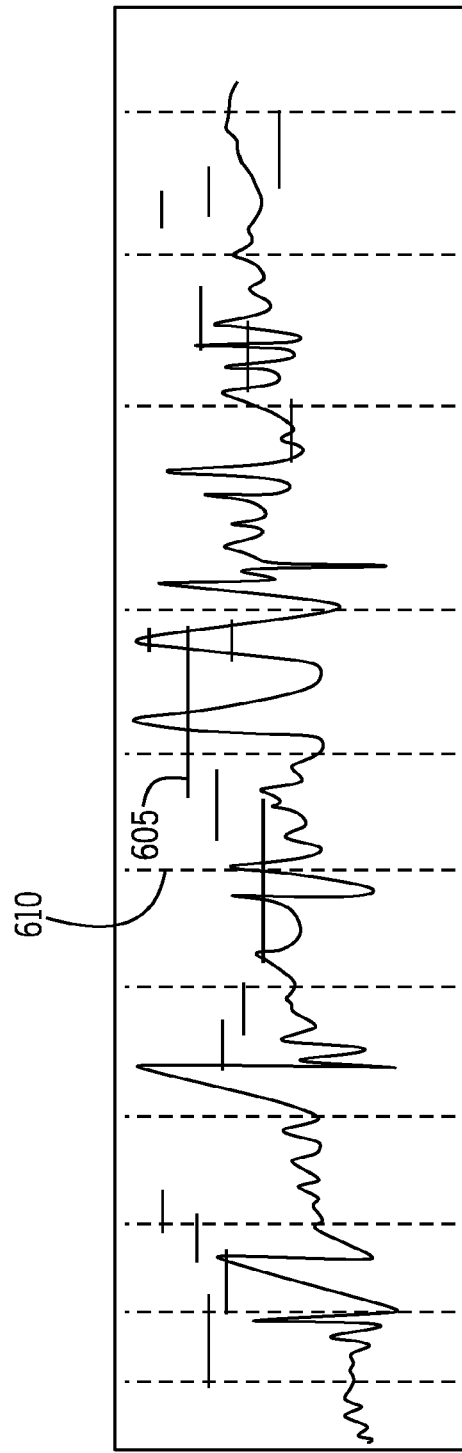
FIG. 6 represents a beat frame identification of a content item in accordance with some embodiments of the invention.

FIG. 5 represents a melody identification of the content item 600 in accordance with some embodiments of the invention. In some embodiments, the audio blending system and method can identify one or more melodies 605 from at least a portion of a content item. In some further embodiments, the audio blending system and method can perform a beat-frame analysis using at least a portion of an audio file. In some embodiments, beats or other position identifiers in audio spectra can be tagged or marked based on a frame number. In other embodiments, the position identifiers can be based on time. In other embodiments, position identifiers can be based on sections or segments of the audio, or other position markers that enable the audio to be divided into measureable intervals. For example, FIG. 6 represents a beat frame identification 650 of the content item 600 in accordance with some embodiments of the invention, and shows beat frames 610 and melodies identified as discussed for FIG. 5.

Figure 7:
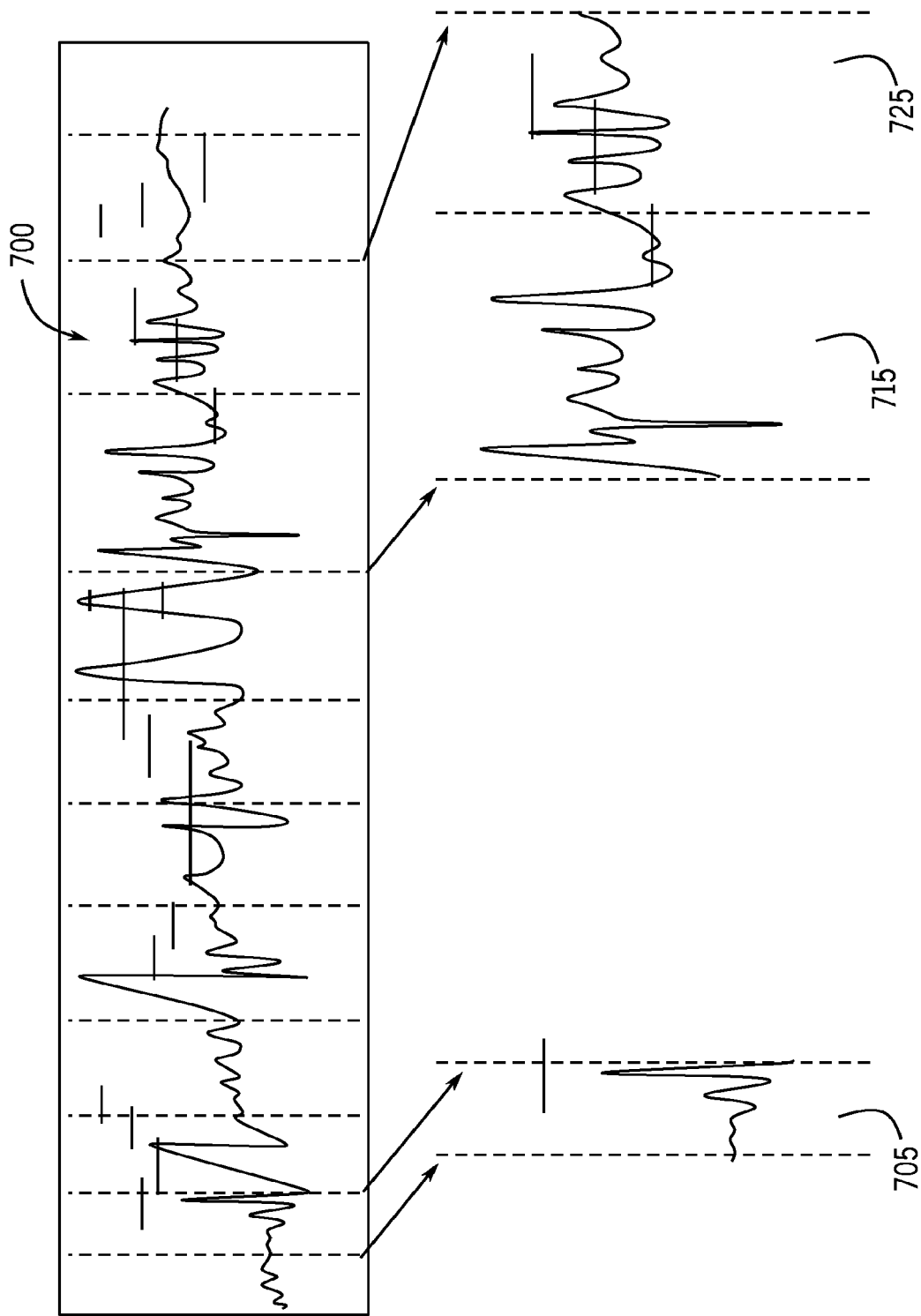
FIG. 7 illustrates a method of analyzing a portion of a content item including LUFS analysis in accordance with some embodiments of the invention.

In some embodiments, the audio blending system and method can perform a level of loudness analysis of a portion of an audio file. For example, in some embodiments, the audio blending system and method can perform a level of loudness analysis of a portion of an audio file by measuring a loudness intensity using a unit of measurement unit loudness full scale (hereinafter "LUFS") analysis of a portion of an audio file. The level of loudness in LUFS can be expressed in the value of an actual peak in dB (decibel). For example, FIG. 7 illustrates a method of analyzing a portion of a content item 700 including LUFS analysis in accordance with some embodiments of the invention. In some embodiments, the audio blending system and method can perform a LUFS analysis across one or more beat frames 705 of the content item 700. For example, some embodiments can include a LUFS analysis comparing beat frame 715 to beat frame 725. In some embodiments, the audio blending system and method can perform a level of loudness analysis delta between beat frames (e.g., between beat frames 715, 725). In some further embodiments, the LUFS analysis of one or more frames of the audio file can be characterized by the audio blending system and method by identifying and compressing the spectra of the audio file into frequencies by frequency (e.g., from a low to high frequency range). In some embodiments of the invention, the audio blending system and method can analyze or compare the LUFS of one or more frames of the audio file.

In some embodiments, a portion of an audio file can comprise an analysis by spectrum, amplitude and melody. In some embodiments, using this analysis, the audio blending system and method can determine opportune moments to blend other audio across one or more frames of any portion of the audio file following a characterization that can include analysis by spectrum, amplitude, melody, and/or LUFS. For example, in some embodiments, using the earlier described methods of analyzing a portion of an audio file, the audio blending system and method can blend one or more audio files that can comprise an announcer and/or another content item (e.g., such as a song) audio file. In some further embodiments, based on a LUFS analysis, a volume number can be extracted to set a specific transition based on the volume of an announcer or another content item. Further, some embodiments include a method of analyzing a portion of a content item and automatically adjusting the LUFS of at least a portion of a first content itemand/or adjusting the LUFS of at least a portion of a second content item to achieve a desirable blending of portions of the two content items where the amplitudes are about the same.

In some embodiments, based on a LUFS analysis, a volume number can be extracted to set a transition based on the volume of an announcer and a content item. For example, in some embodiments, the audio blending system and method can automatically adjust the LUFS of at least a portion of a song or the announcer to achieve a desirable blending of portions of the song with the announcer. For example, based on an analysis of the song, if the target cuepoint in a song is −6 dB, and the LUFS of an announcer segment is −18 dB, the audio blending system and method can perform a multiplication to reach or approach a target LUFS value for blending of the song and the announcer.

Figure 8:
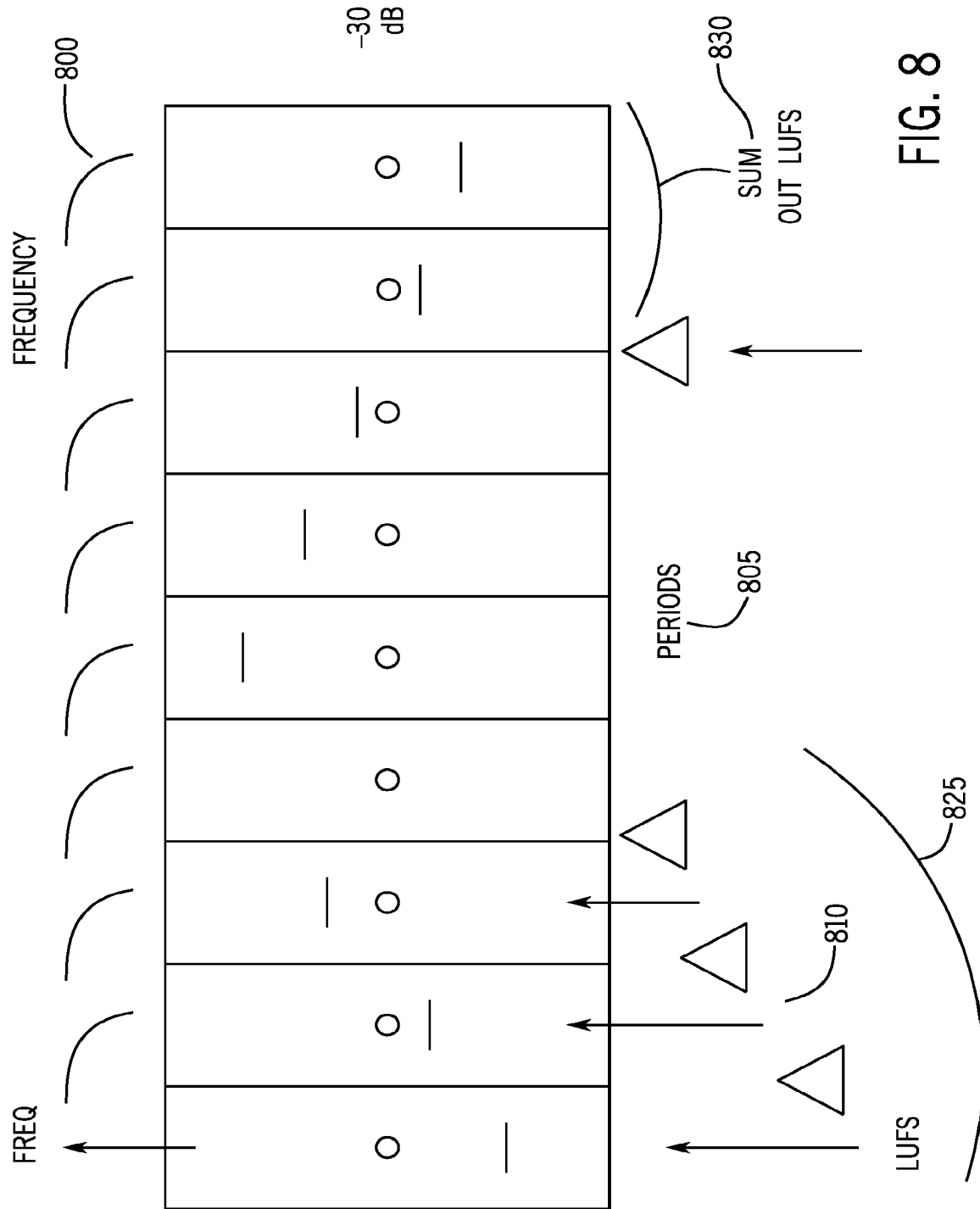
FIG. 8 illustrates a LUFS and frequency content analysis in accordance with some embodiments of the invention.

Referring to FIG. 8, in some embodiments, for any given content item, the audio blending system and method can implement a beat analysis engine for a rhythmic beat analysis. For example, two types of analysis can be applied to the defined blocks, and individual volume measures for each period can be measured, where deltas and periodic shaping deltas can be identified, and differences between successive frames/groups of frames can be identified. Further, the audio blending system and method can implement a frequency analysis engine for the analyzing a simplified frequency spectrum 800 and for comparing deltas 810 between the periods 805. For example, in some embodiments, the LUFS and frequency data can be quantified within a period or multiple periodics 825 and used to analyze for opportunities for joining or blending. For example, in some embodiments, the LUFS deltas of the final two periods can be summed and compressed 830 to be used to identify an out or fade out of the content item. Similarly, this analysis can be used to identify LUFS stair-steps to enable the system to identify an in or fade-in of the content item. In some further embodiments, the audio blending system and method can implement a beat analysis engine for a rhythmic beat analysis with melody analysis. For example, two types of analysis can be applied to the defined blocks, and individual volume measures for each period can be measured, where deltas and periodic shaping deltas can be identified. In some embodiments, the audio blending system and method can implement a frequency analysis engine for the analyzing a simplified frequency spectrum and for comparing deltas between the periods, and can further analyze melody within and across the periods. In some embodiments, the melody analysis can identify melodic patterns, and can identify where the melody is initiated. In some embodiments, the melodic analysis can be used to identify where the vocalist starts within a content item. In some embodiments, the process can then position hard posts for use in future joining and blending processes. In some embodiments, the audio blending system and method can generate a plurality of both hard and soft points, and can prioritize based on the prominent features which are an amalgam of melody and rhythmic and harmonic contrasts, which is used to prioritize and order them. In some embodiments, the system also employs fade identification algorithms that augment the stair step approach. In some embodiments, these can be used to help identify in and out characteristics, as well as moments of dynamic change (for our "posts").

In some embodiments of the invention, the audio blending system and method can include an adjustable level of confidence for overlay or mixing of one or more audio files. In some embodiments, confidence is driven by the specifics of the analyzed features in their concordances. For example, in some embodiments, a toggle or level selection can be used for content item analysis. Further, some embodiments include a selection for content item analysis in accordance with some embodiments of the invention, where each of the level 1, level 2, and level 3 processes can use or be controlled by one or more attributes.

Some embodiments of the invention enable the audio blending system and method to dynamically align one or more versions of an audio file such as a song. For example, some embodiments include dynamic alignment methods of content item analysis where if the audio blending system and method identifies two content items where one song includes a one second offset, the audio blending system and method can identify the offset and temporarily or permanently remove the offset from the file. In one non-limiting example, with two versions of the same song and with a substantially identical fingerprint, with an alignment mismatch of one second, the audio blending system and method can dynamically align the audio files by identifying and correcting the misalignment.

As described earlier, in some embodiments, a level 3 process (human tagging process) can be used to characterize a portion of a content item and assign one or more parameters to the content item or to a section of the content item. In some embodiments of the invention, when there is any gap between two content items, and/or if two content items are to be joined or blended, the audio blending system and method can make decisions about joining the items. In some embodiments, the audio blending system and method can review the contents to calculate a decision for how the content can be blended or joined. In some embodiments, a break or join can start with an analysis using one or more pieces of specific information provided by the client user (such as preferences). The information can comprise information comprising an "out" element (which element is being exited) and an "in" element (which element is being entered). Further, in some embodiments, the accompanying information can include one or more client user preferences. In some embodiments, the "in" and "out" can be the in and out of any audio item or element comprising information that be used, at least in part to guide or direct the blending of the items. For example, in some embodiments, the audio item or element can include a song, an announcement, a DJ announcement, a news announcement or break, a weather announcement, or a commercial announcement, or a combination thereof. For example, in one example embodiment, an audio segment could comprise an "out" element comprising a news announcement or break, and the "in" element could comprise a song or music item. In this instance, the audio blending system and method can analyze the information as described above to determine a joining or blending of the "in" element and the "out" element so that any joined or blending audio is preferred or deemed audibly acceptable or desirable to a listener.

Figure 9:
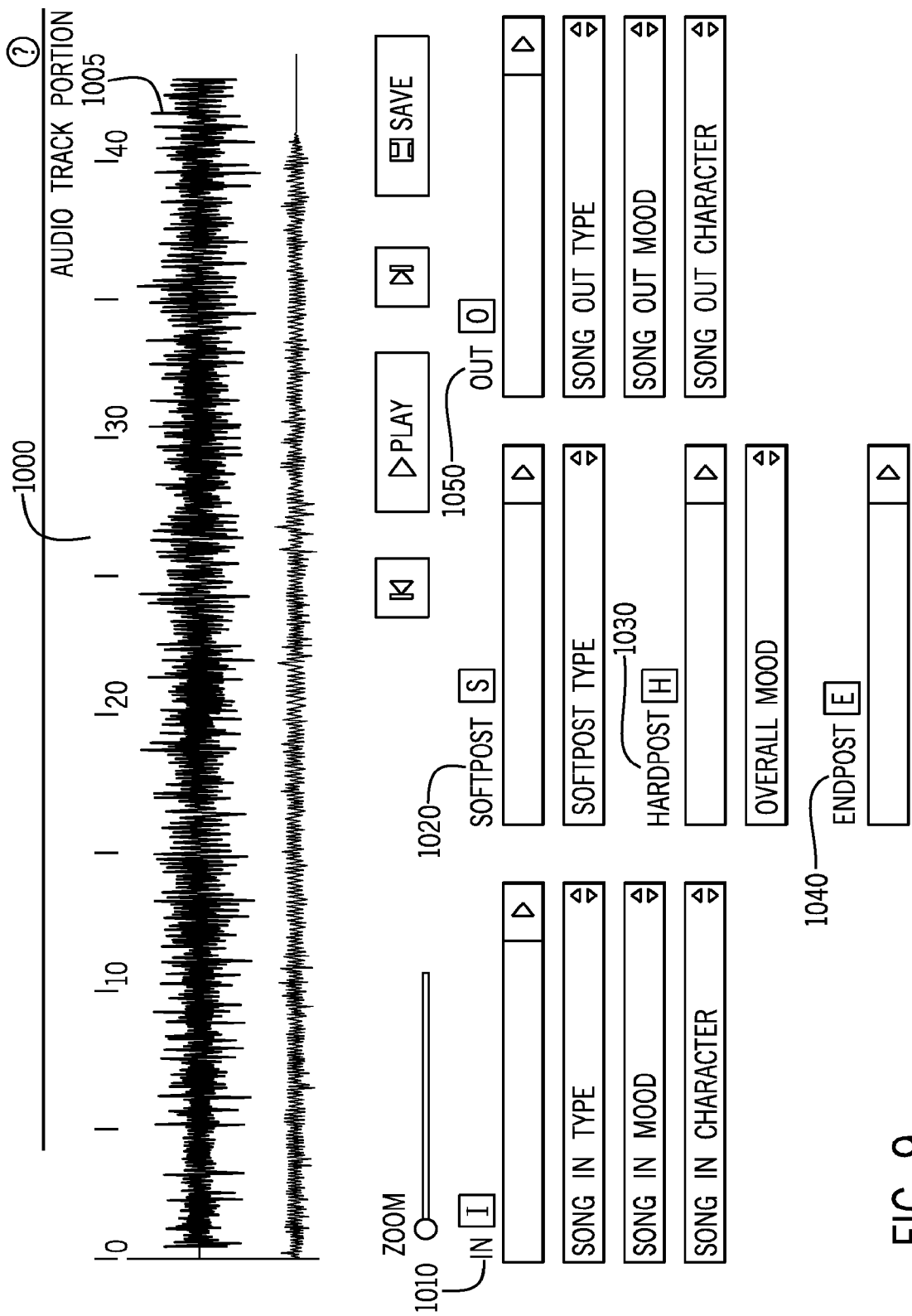
FIG. 9 illustrates a GUI interface of a level 3 content item analysis system in accordance with some embodiments of the invention.
Figure 10:
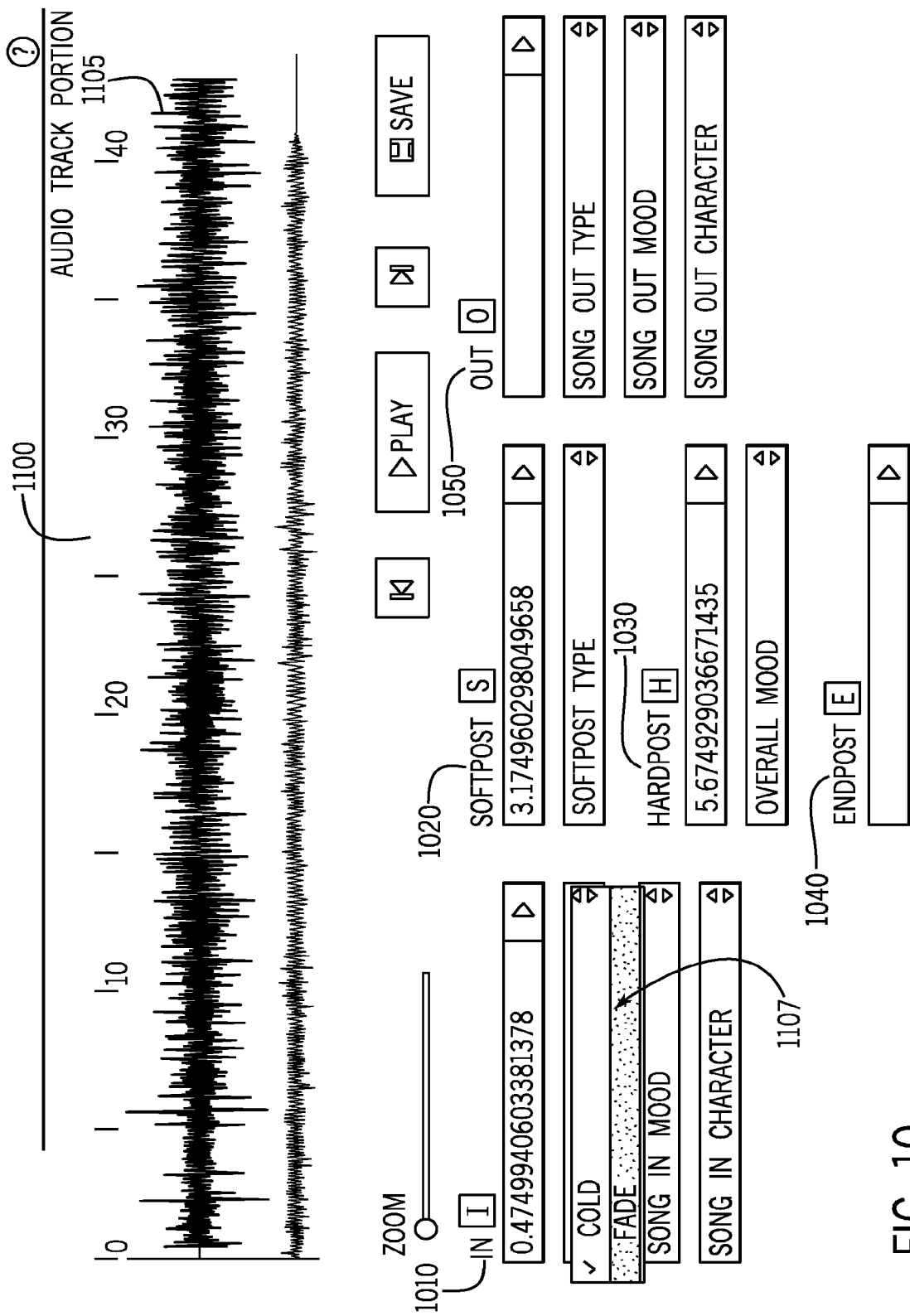
FIG. 10 illustrates a content in type selection in a GUI interface of a level 3 content item analysis system in accordance with some embodiments of the invention.
Figure 11:
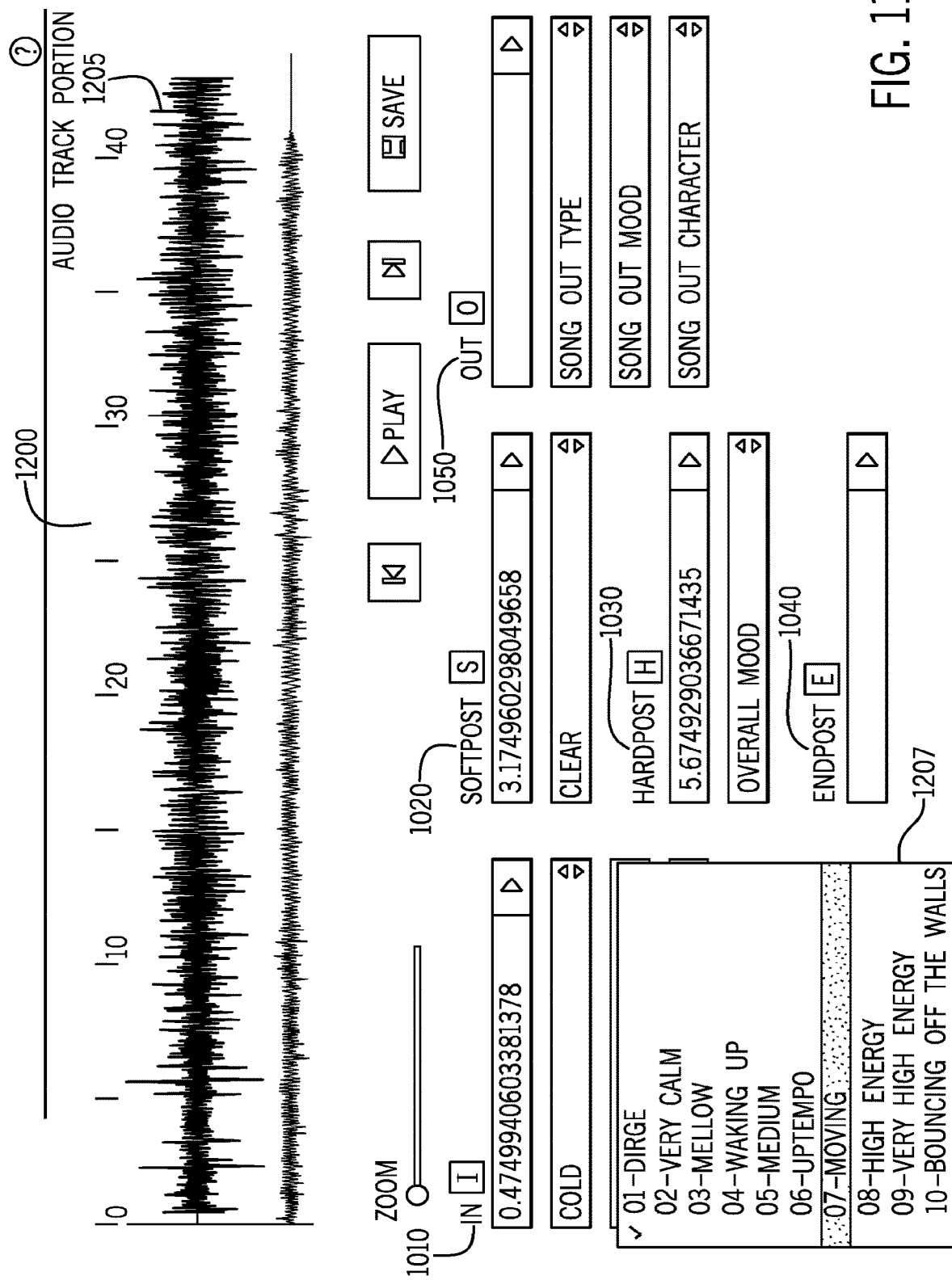
FIG. 11 illustrates a content in mood selection in a GUI interface of a level 3 content item analysis system in accordance with some embodiments of the invention.
Figure 12:
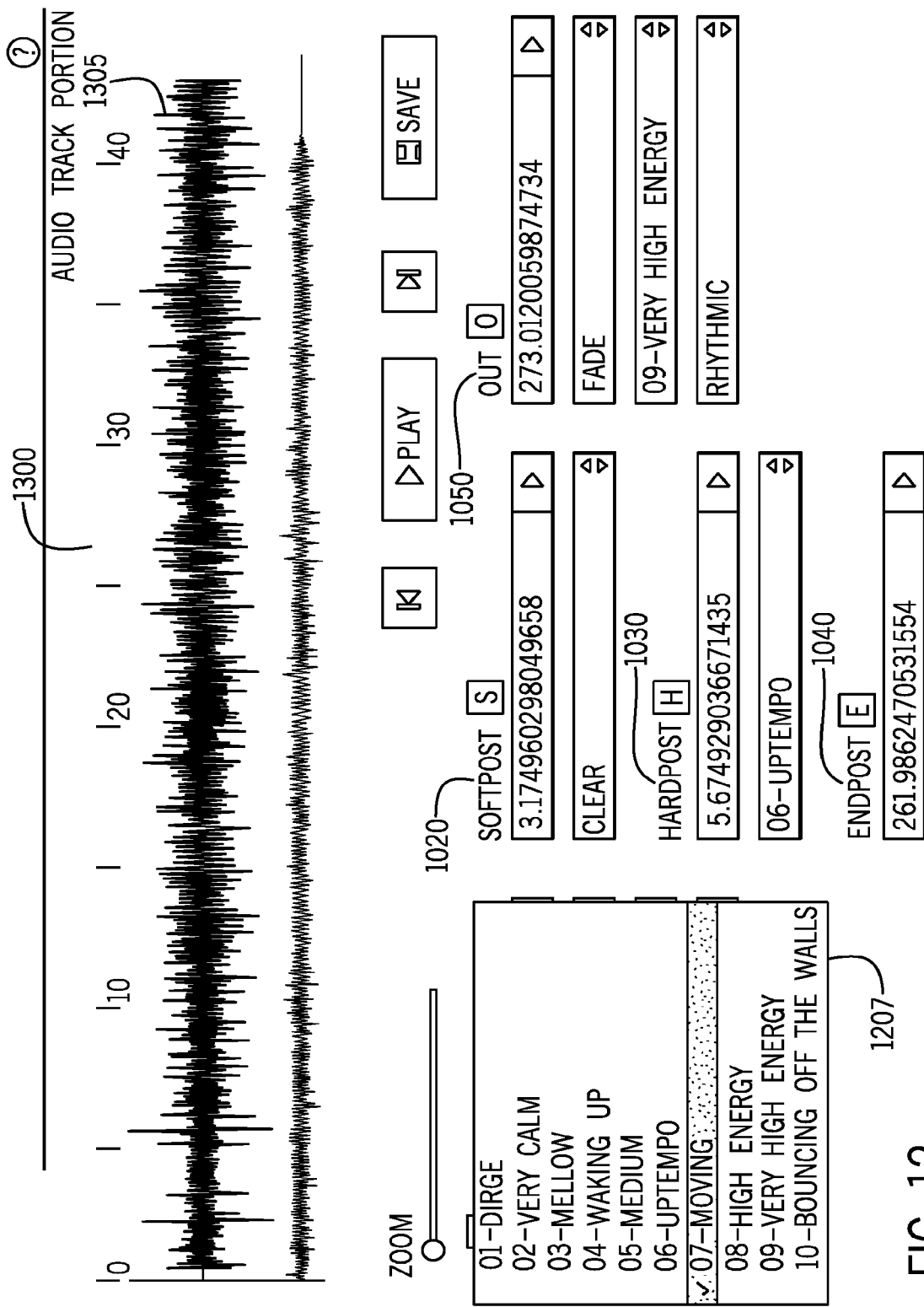
FIG. 12 illustrates a content in mood selection in a GUI interface of a level 3 content item analysis system in accordance with some embodiments of the invention.

Some embodiments of the invention can include an audio blending system and method that includes a tool for implementing the level 3 process as shown in FIGS. 9-19 and discussed further below. For example, FIG. 9 illustrates a GUI interface 1000 of a level 3 content item analysis system in accordance with some embodiments of the invention. In some embodiments of the invention, the GUI interface 1000 can display one or more portions of a content item 1005 (displayed as a sound spectra). In some embodiments, the GUI interface 1000 can include one or more "Song In" parameters and one or more "Song out" parameters (selectable parameters 1010). Further, in some embodiments, the GUI interface 1000 can also include post assignments including "soft post" 1020, "hard post" 1030, and "end post" 1040 assignment options. In some embodiments of the invention, the "Song In" 1010 options can include "Song in type", "Song in mood", and "Song in character" options. Further, in some embodiments, the "Song out" options can include "Song out Type", "Song Out Mood", and "Song out Character".

Figure 13:
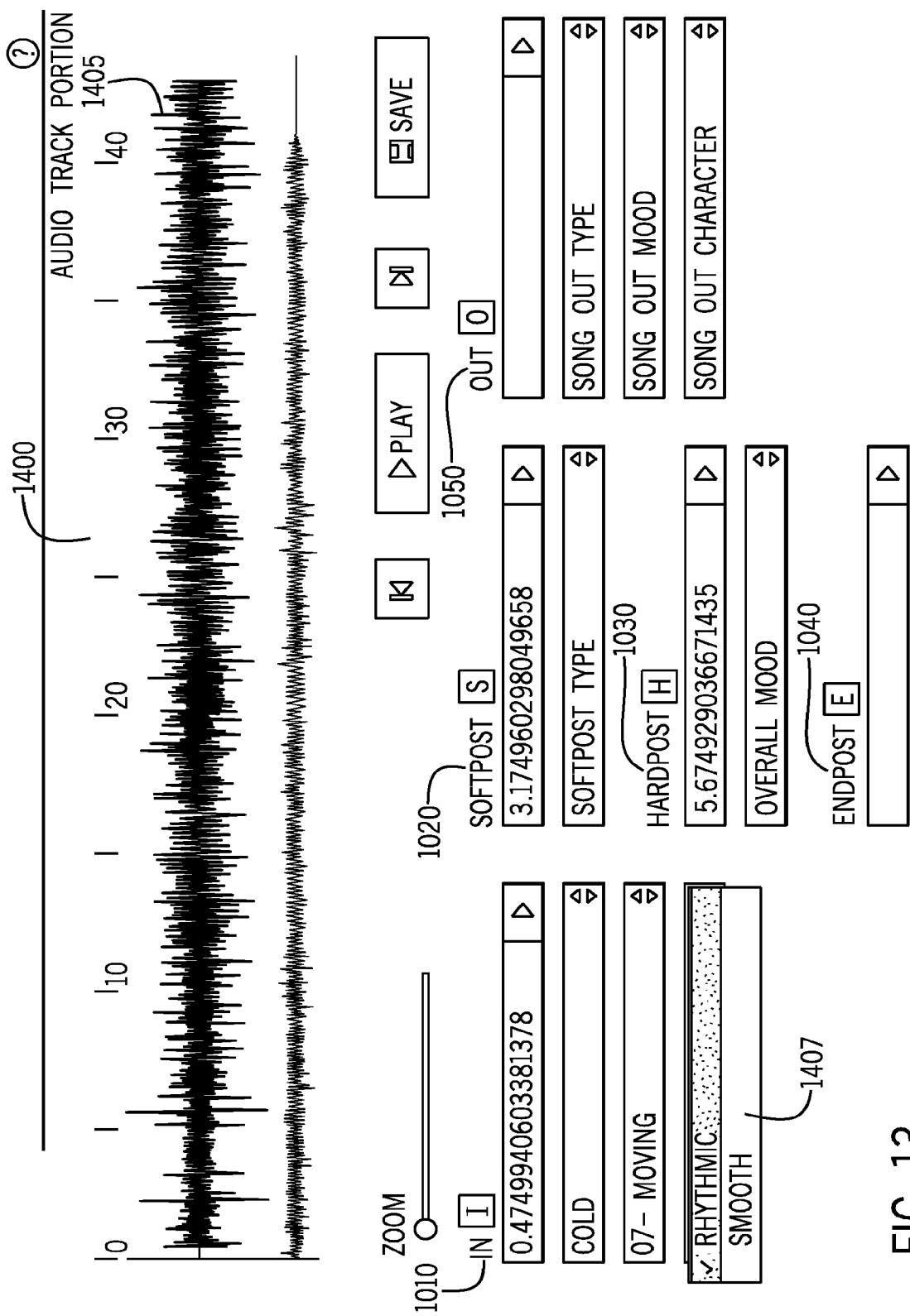
FIG. 13 illustrates a content in character in a GUI interface of a level 3 content item analysis system in accordance with some embodiments of the invention.

In some embodiments of the invention, based at least in part on an audible analysis of the audio and/or a visual analysis of the spectra of the audio visual analysis, an operator can assign one or more parameters to one or more frames of the content item portion (or the whole content item). For example, FIG. 10 includes an example GUI interface 1100 with a display one or more portions of a content item 1105, and in this non-limiting embodiments, illustrates a song in type selection in a GUI interface of a level 3 content item analysis system in accordance with some embodiments of the invention. In some embodiments, the user can select from a drop-down menu 1107 to set a song in type. In some embodiments, the options in the drop-down menu 1107 can comprise a cold and/or fade option. Further, FIG. 11 (showing GUI interface 1200 with a display of one or more portions of a content item 1205) and FIG. 12 (showing GUI interface 1300, displaying one or more portions of a content item 1305) illustrate a song in mood selection of a level 3 content item analysis system in accordance with some embodiments of the invention. In some embodiments, the GUI interface can include a song in mood selection 1207 with a scale of 1-10, and optionally including, but not limited to, "dirge", "very calm", "mellow", "waking up", "medium", "uptempo", "moving", "high energy", "very high energy", and "bouncing off the walls". Further, FIG. 13 illustrates a song in character in a GUI interface 1400 of a level 3 content item analysis system in accordance with some embodiments of the invention. In some embodiments of the invention, the operator can use the GUI interface 1400 (displaying one or more portions of a content item 1405) to select a song in character parameter such as "Rhythmic" and/or "Smooth" (shown as drop-down menu 1407). In some embodiments, the mood can be defined on a 1-10 scale with helper descriptors that work to normalize the values across individuals providing the features. Other scales descriptors can be used including other numbers or letters that provide differentiation and/or scale.

Figure 14:
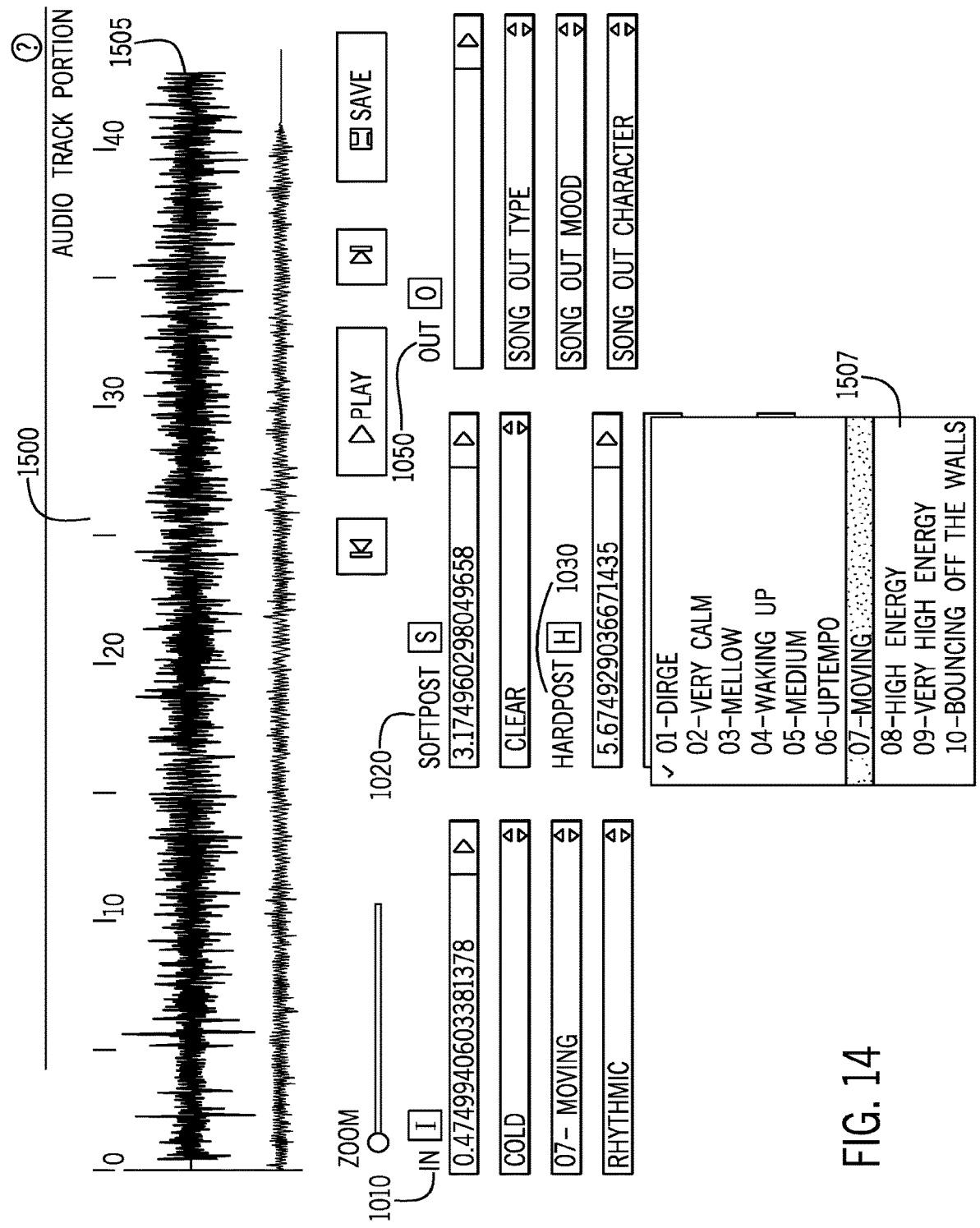
FIG. 14 illustrates an overall mood selection in a GUI interface of a level 3 content item analysis system in accordance with some embodiments of the invention.
Figure 15:
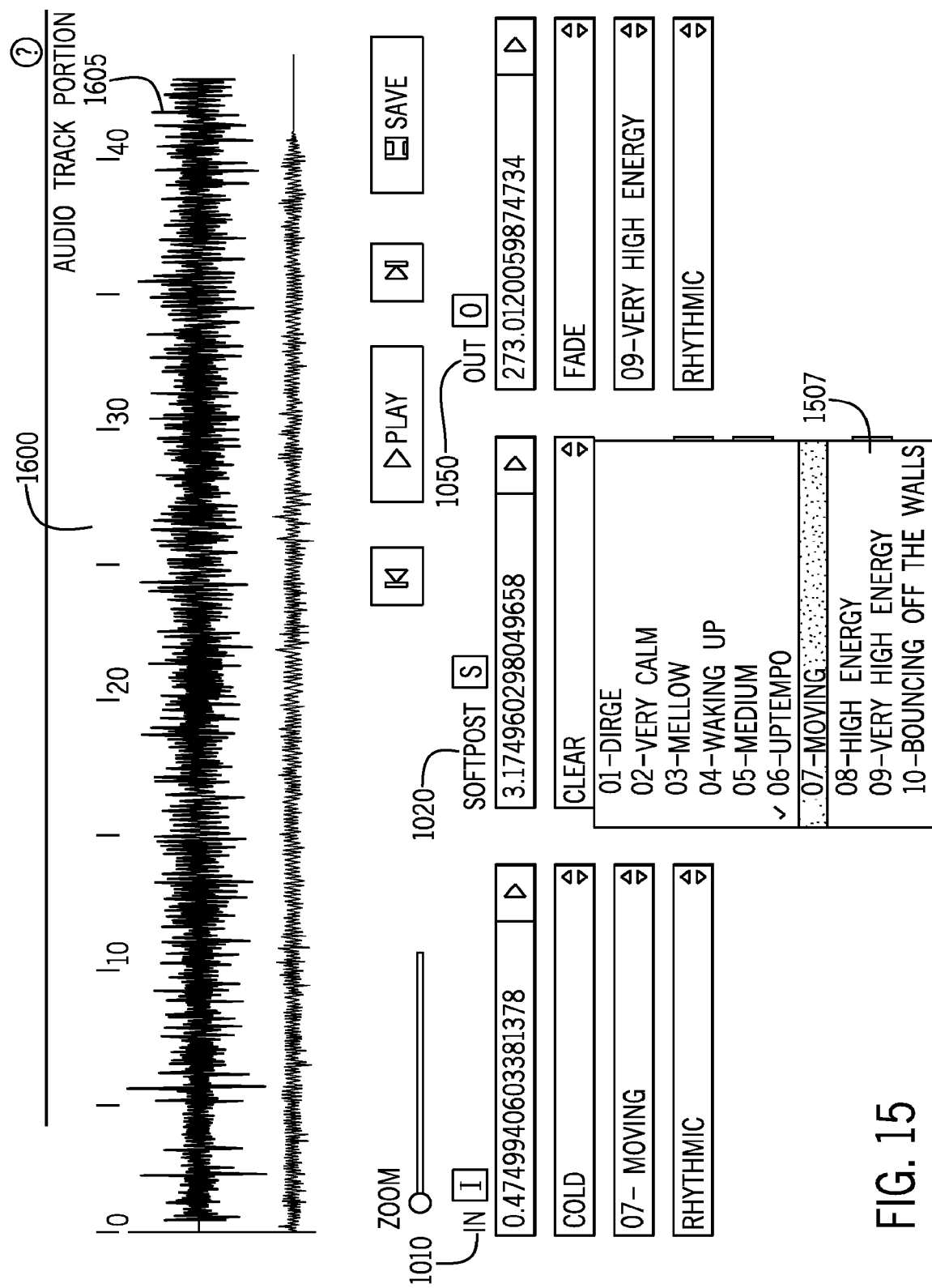
FIG. 15 illustrates an overall mood selection in a GUI interface of a level 3 content item analysis system in accordance with some embodiments of the invention.
Figure 16:
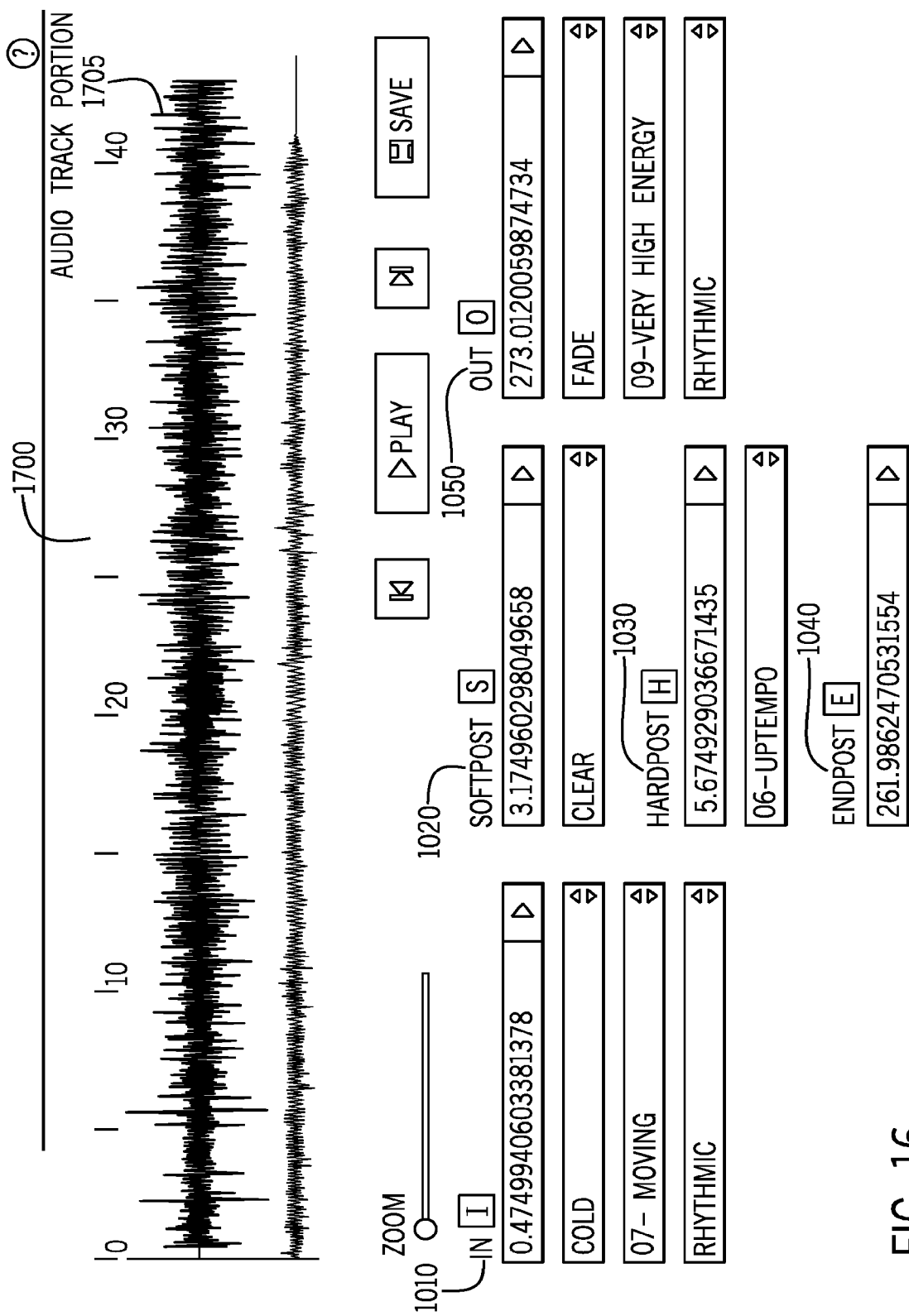
FIG. 16 illustrates hard and soft post selections of a content item portion in a GUI interface of a level 3 content item analysis system in accordance with some embodiments of the invention.

In some embodiments, the overall mood of the content item can be assigned. For example, FIG. 14 (GUI interface 1500 displaying one or more portions of a content item 1505) and FIG. 15 (GUI interface 1600 displaying one or more portions of a content item 1605) illustrate an overall mood selection of a level 3 content item analysis system in accordance with some embodiments of the invention. In some embodiments, the operator can select from a drop-down menu 1507 comprising overall mood assignments including, but not limited to, "dirge", "very calm", "mellow", "waking up", "medium", "uptempo", "moving", "high energy", "very high energy", and "bouncing off the walls". For example, FIG. 14 shows a pre-selection of "moving", and FIG. 15 shows a pre-selection of "uptempo". FIG. 16 illustrates hard and soft post selections of a content item portion in a GUI interface 1700 (displaying one or more portions of a content item 1705) of a level 3 content item analysis system in accordance with some embodiments of the invention. In some embodiments, hard and soft post assignments can be adjusted by the operator based at least on part on audio and/or visual characteristics of the content item.

Figure 17:
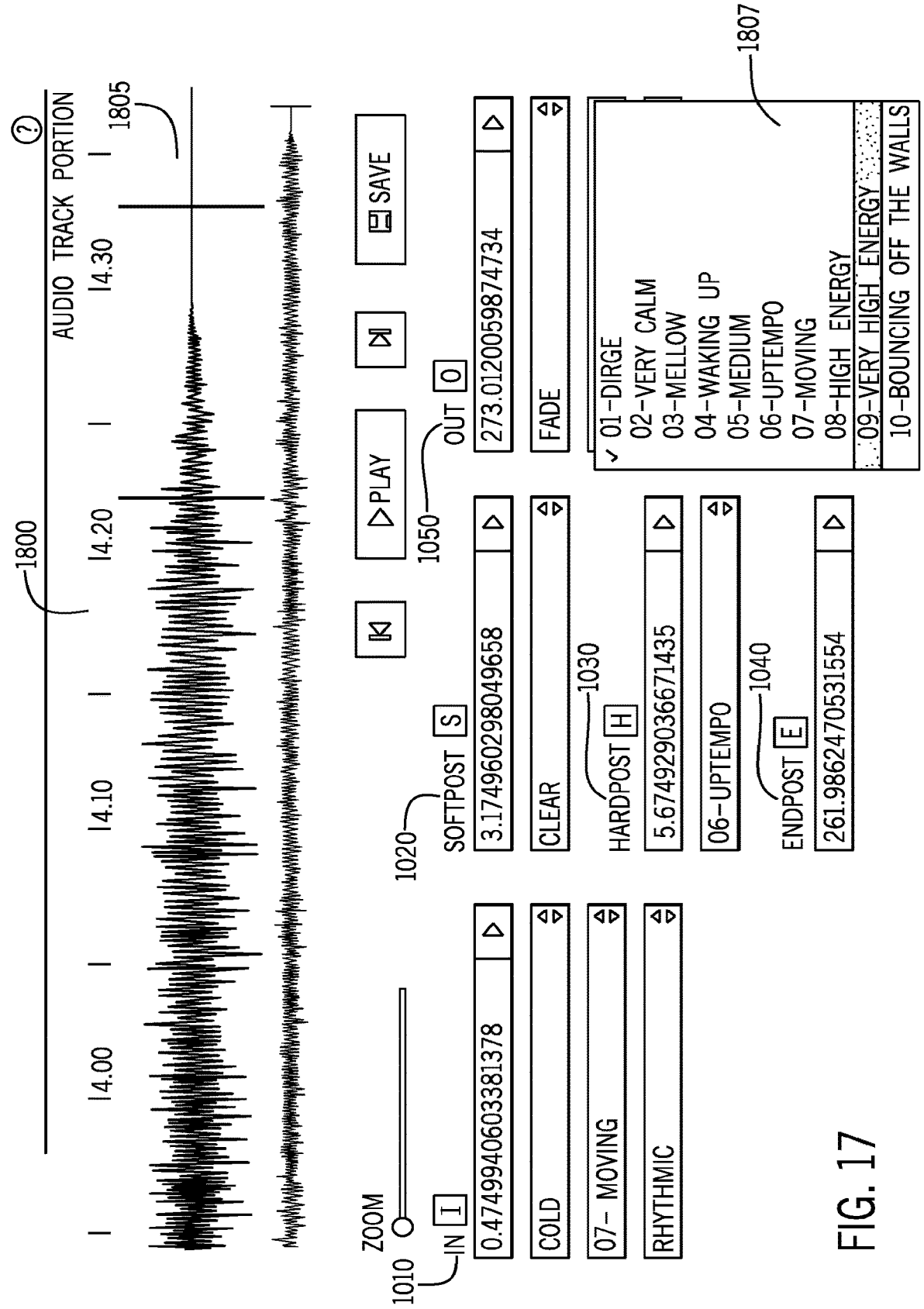
FIG. 17 illustrates content out mood selection in a GUI interface of a level 3 content item analysis system in accordance with some embodiments of the invention.

FIG. 17 illustrates a song out mood selection in a GUI interface 1800 (displaying one or more portions of a content item 1805) of a level 3 content item analysis system in accordance with some embodiments of the invention. In some embodiments, similar to previously described embodiments, an operator can select and assign a song out mood using a drop-down menu 1807 including, but not limited to, "dirge", "very calm", "mellow", "waking up", "medium", "uptempo", "moving", "high energy", "very high energy", and "bouncing off the walls".

Figure 18:
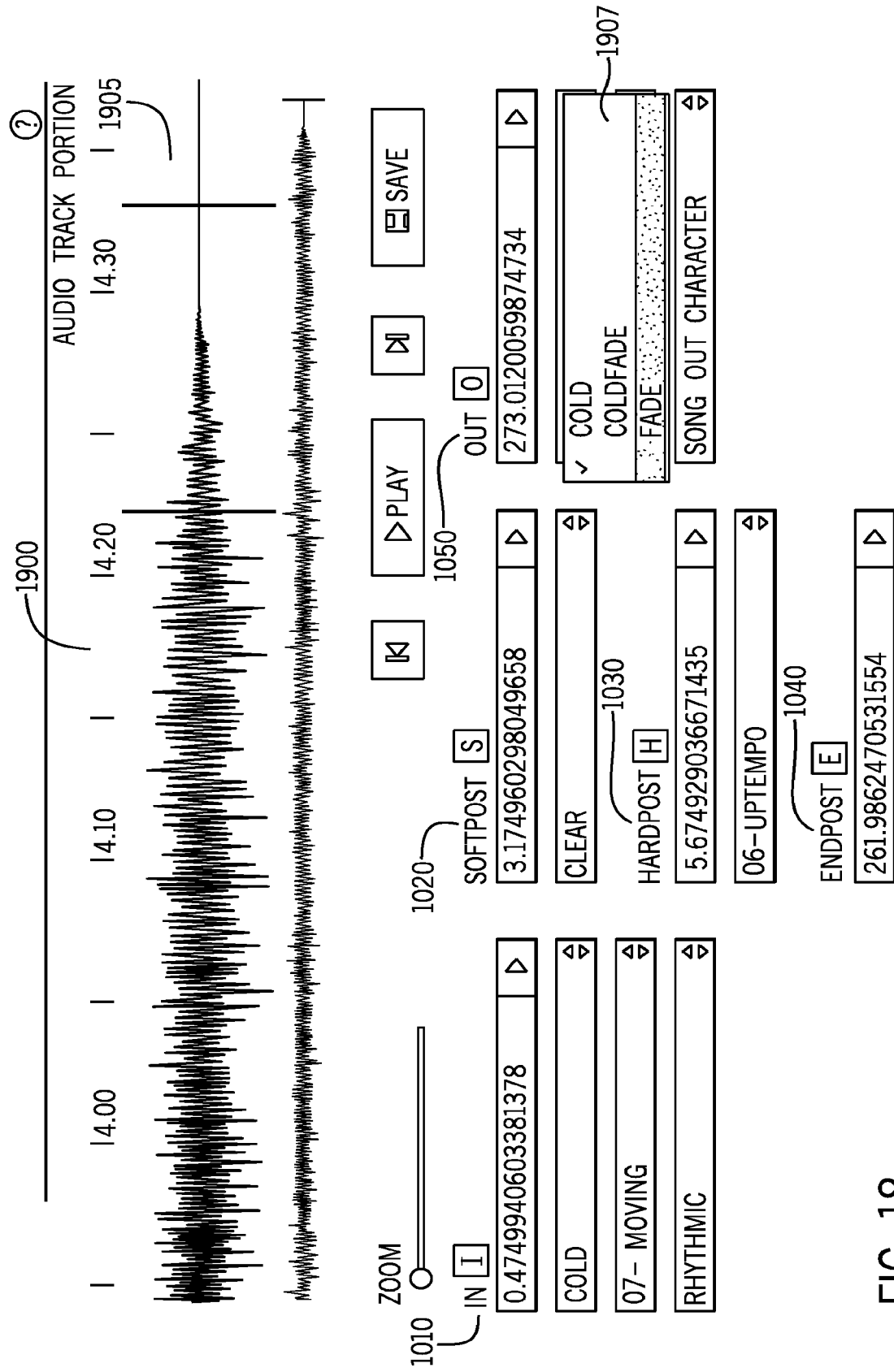
FIG. 18 illustrates a content out type in a GUI interface of a level 3 content item analysis system in accordance with some embodiments of the invention.
Figure 19A:
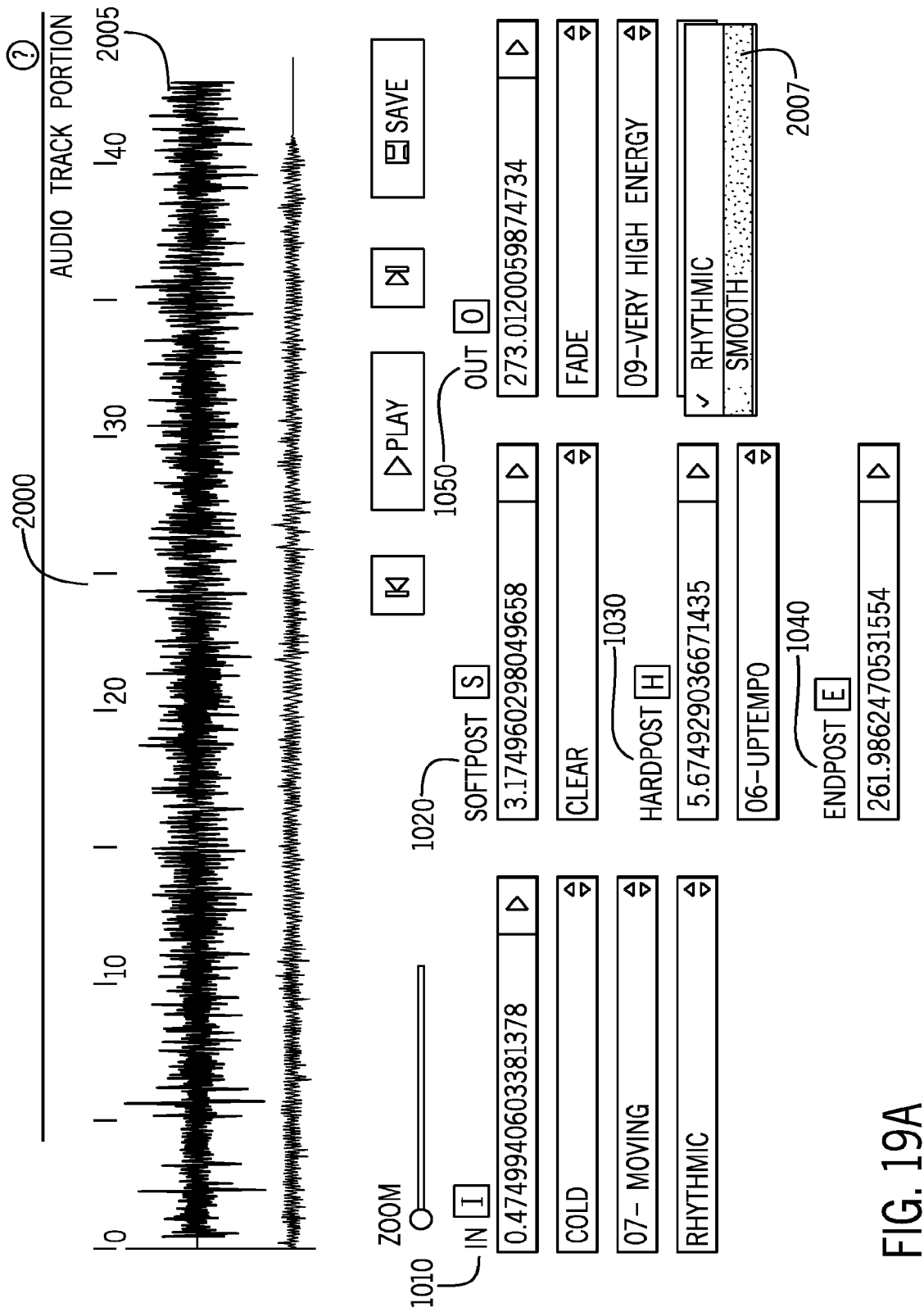
FIG. 19A illustrates a content out character selection in a GUI interface of a level 3 content item analysis system in accordance with some embodiments of the invention.

FIG. 18 illustrates a song out type in a GUI interface 1900 (displaying one or more portions of a content item 1905) of a level 3 content item analysis system in accordance with some embodiments of the invention. In some embodiments, an operator can select and assign a song out type using a drop-down menu 1907 including, but not limited to, "cold", "coldfade", and "fade". Further, FIG. 19A illustrates a song out character selection in a GUI interface 2000 (displaying one or more portions of a content item 2005) of a level 3 content item analysis system in accordance with some embodiments of the invention. In some embodiments, an operator can select and assign a song out character using a drop-down menu 2007 including, but not limited to, "Rhythmic" and "Smooth".

Figure 19B:
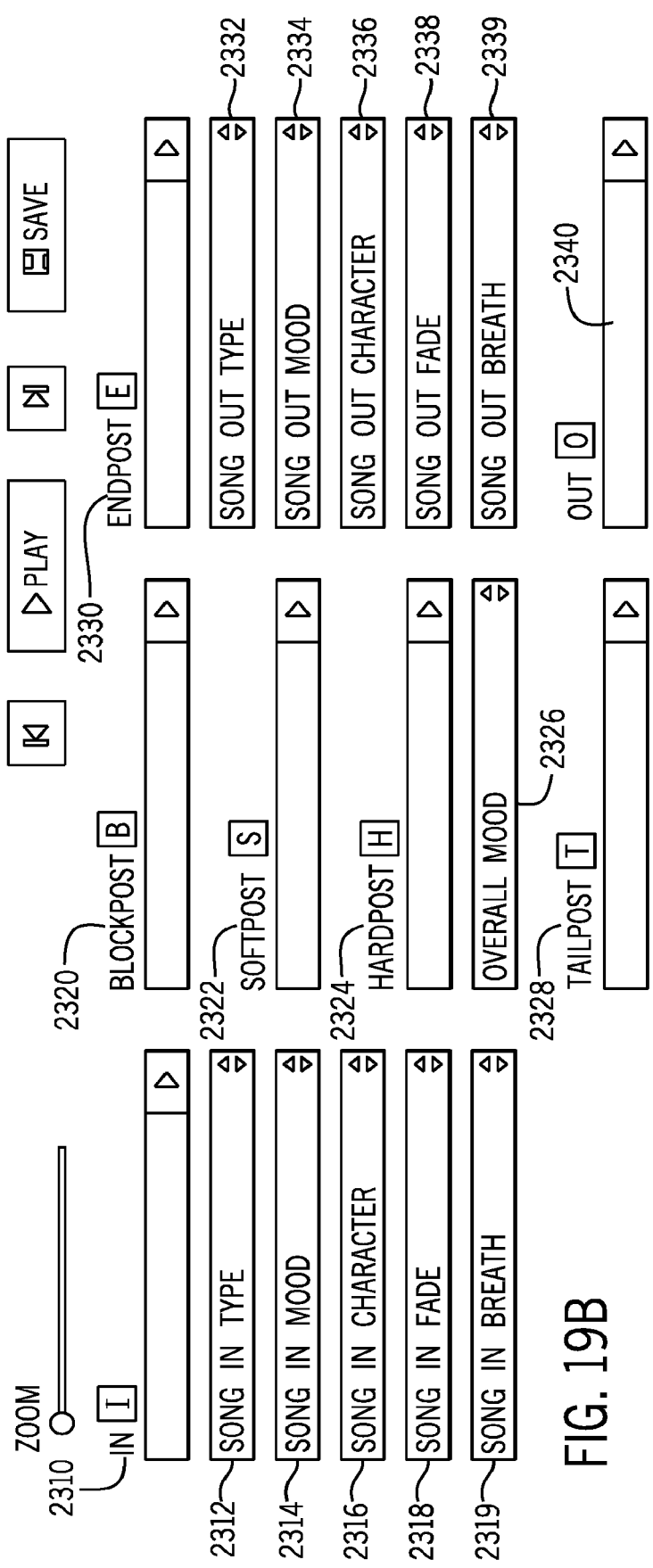
FIG. 19B illustrates a GUI interface of a level 3 content item analysis system in accordance with some further embodiments of the invention.

FIG. 19B illustrates a GUI interface 2300 (displaying one or more portions of a content item 2305) of a level 3 content item analysis system in accordance with some further embodiments of the invention. Some embodiments include in element menu 2310 and associated assignment selections "Song in Type" 2312, "Song in Mood" 2314, "Song in Character" 2316, "Song in Fade" 2318, and "Song in Breath" 2319. Further, some embodiments include a "BlockPost" menu 2320, "SoftPost" menu 2322, "HardPost" menu 2324, "TailPost" menu 2328, and an overall mood selection 2326. Some embodiments include an "EndPost" menu and associated assignment selections "Song out Type" 2332, "Song out Mood" 2334, "Song out Character" 2336, "Song out Fade" 2338, and "Song out Breath" 2339, and an "Out" menu 2340. In some embodiments, the "Song In Fade" 2318 can force a short, medium or long fade at the in point (used to start songs later and have them skillfully fade in at the in point). In some further embodiments, the "Song In Breath" 2319 can force a gap before this song of short, medium and long amounts, which can be used to help thoughtfully set as song apart if it is appropriate to the material. Some other embodiments include a "Block Post" 2320 that can comprise a time in the front of the song where, before it, no overlays are allowed (e.g., creating a scenario where the song will play for a short period, and then an announcer overlay can be triggered). Some embodiments include a "Soft Post Type" 2322 omitted due to the previous setting being added. Some embodiments include a "Tail Post" 2328 comprising a point in the song at the end where, after which, it would be acceptable to overlay an announcer. Some embodiments include an "End Post" 2330 comprising the point at which to stop playing the audio. Some further embodiments include "Song Out Fade" 2338 that can force a short, medium or long fade at the out point (used to end songs earlier and have them skillfully fade in at the out point). Other embodiments include a "Song Out Breath" 2339 that can be used to force a gap after this song of short, medium and long amounts. In some embodiments, this can be used to help thoughtfully set as song apart if it is appropriate to the material (e.g., to take a moment after Heart's cover of stairway to heaven before starting the next item).

In some embodiments, there can be one or more factors that influence scheduling decision making by the audio blending system and method. In some embodiments, these factors can be accessed by one or more databases. In some embodiments, a factor used to influence, calculate or adjust scheduling decision making by the audio blending system and method can include the user's history, such as for example the user's previously played audio content and selections. In some embodiments, the user's history can include the user's previous play history defining the user's like or dislike for content that includes at least one break. For example, in some embodiments, a user's previous play history can include play time, content or preferences that demonstrate the user does not tolerate a significant number of news breaks, DJ announcer breaks, weather breaks, and so on. In some further embodiments, another factor can be metadata about the content item (i.e., the L1, L2, L3 information), the understanding of the content including human and machine splog characteristics as described earlier. In some embodiments, the system and method can measure their behavior and use that to alter the Formatics for their specific experience.

Further embodiments of the invention include factors comprising brand preferences. For example, each brand can control blending of one or more elements. For example, in some embodiments, a brand can provide a preference that includes a directive to include only a single break within an hour where the audio content between the break can comprise stitched or blending content items. In another example embodiment, a brand can provide a preference that includes a directive to include a plurality of breaks within an hour where the audio content between the break can comprise stitched or blending content items inter-dispersed with breaks every two, three, four, or more content items. In some embodiments, one or more brand content pools can be linked to the brands preferences. For example, in some embodiments, a brand content pool can comprise pieces of audio, music beds, sound effects (hereinafter "sweepers"), and other factors that are being combined that define a sound that is the content pool including liners, sweepers, news, produced features, artist interviews, etc. In some embodiments, any number or combination of elements from the pool, that when used together to construct a stitch, can at least partially define the brand. Some embodiments include a preference controlling whether the system allows announcers to speak over the ends of songs.

In some embodiments, the audio blending system and method use a multistep process, where initially, an analysis of pieces of content of the elements that are being stitched is performed, and the analysis is co-mingled with user preferences and brand preferences as a template that is used to perform the stitch. For example, the template can comprise a series of guidelines for one or more specific breaks, and include instructions for what can be scheduled in a future segment. In some embodiments, from the template, a multi-pass scheduling is processed by selecting elements in a forward direction, and from selected elements, a reverse process is used to sequence the elements. In some embodiments, this process can be used to determine if there is a fit with available content (i.e., to pick elements to put in, and then perform a reverse process to sequence). In some embodiments, the content is picked and a meta content playlist has been created based at least in part on factors such as user history, and the next step can comprise moving backwards through the sequence to create blended list of elements. In some embodiments, the content can include a flag to define a specific overlay or join. In some embodiments, the flag cannot be overridden. In other embodiments, the audio blending system and method can override the flagged item. In some embodiments, the audio blending system and method can then search for elements that are not available. In some embodiments, the process is "self-healing" on the fly (e.g., substantially in real time) to get as close as possible to the template even if some intent has to be abandoned based on the original template instructions. For example, in some embodiments, a preference or directive from a brand can include positioning and blend an interview of a band or singer just prior to playing the band or singer's song. In instances where the audio blending system and method cannot find or determine the location of an interview for a selected song or band or other content from at least one of the brand content pools, the audio blending system and method can abandon the specific intent to blending or join the interview for any specific song or band or other content. In another example embodiment, if a selected song or band is of a specific high energy, and the audio blending system and method cannot find an announcer with a similarly matching energy level, the audio blending system and method can automatically abandon the original intent. For example, if the original intent was for matching energies of an announcer and a band or song, the audio blending system and method can abandon the intent and select a lower energy announcer.

Other embodiments can include automatic override of intent based on an analysis of the content. For example, in some embodiments, a brand preference can include placing an announcement at the beginning or partway through a content item (e.g., such as a song). However, in some embodiments, based at least in part on the availability of the announcer element, and/or an audio influencing characteristic of the announcement and/or song, the audio blending system and method can perform an override action. For example, the override action can include determining another location of the announcement, selecting a different announcement, selecting a different location to blend or join the announcement, and/or selecting an alternative audio item or element such as a sweeper. In some embodiments, the audio blending system and method can enable the user or brand to select or adjust the level of override or behavior. In some embodiments, other factors can be the actual voice being used and the messages that they are conveying in the announcement. In some embodiments, these can be linked to or excluded from specific content pairings in order to better serve the experience.

In some embodiments, the audio blending system and method can use a weighted precision system to dial in the behavior of the system when processing a template. For example, in some embodiments, a client user or brand can select a weighted precision factor to increase the likelihood that the audio blending system and method will override a user or brand intent. In some embodiments, the audio blending system and method can use multiple factors including the user's history, the meta-data, and use, client, and/or brand preferences during the selection and scheduling.

In some embodiments, the behavior of the audio blending system and method can be directed by the audio characteristics of the "in" and the "out" portions of the elements. For example, FIG. 20 illustrates a transition determination between content items in accordance with some embodiments of the invention. In some embodiments, a content item (e.g., song) processing where the "out" song 2500 goes out "cold", and the "in" song 2510 comprise a fade in, the audio blending system and method can determine the gap 2525 that would be created by joining the two elements, and can decide to place an item between the "out" song and the "in" or "fade" song (i.e., to replace gap 2525). In this instance, the audio blending system and method can include a very high probability of fixing the gap (e.g., >95% likelihood of being fixed).

Referring to FIG. 21 illustrating a transition determination between content items (e.g., a song) in accordance with some embodiments of the invention, if a song 2600 ends cold and a second song 2610 starts cold, there can be an increase in odds (such as 33% likelihood) of being fixed (e.g., to reduce or eliminate the gap 2625). In another example embodiment comprising a fade out and fade in example, if the fade out song is rhythmic and the fade in song is rhythmic, they generally cannot overlap, and the likelihood of the audio blending system and method processing the blending of the fade out and fade in can increase. Similarly, other examples, where there is a large gap in mood there can be a higher likelihood, or a mismatch of genre, or place in song where there is an area of a song that can accept a liner or talking. Further, where there is a large gap at beginning (and/or if there are preferences for placing interview), the audio blending system and method can assess the best opportunities. For example, if there is a large gap in mood between content items, the likelihood of the audio blending system and method processing the blending of the two content items can increase. In another example embodiment, if a start portion of a start of a song can be more easily blending with an announcement, the likelihood of the audio blending system and method processing the blending of the announcement with the start of the song can increase. In some embodiments, the audio blending system and method can include base odds, and specific odds, and specific directives, any one or combination of which can be adjustable.

Some embodiments include timing, pool of content, and other factors that affect selection such as mood, genre, etc. In some embodiments, with respect to timing factors, the system can be instructed or biased to stagger starts. In some embodiments, the audio blending system and method can often hit items on beat markers (posts), and do actions on beats. In some embodiments, the music bed and announcer can be staggered to allow an item to get established. In some embodiments, the audio blending system and method can be instructed or biased so that the ending of the items can be substantially synchronized. For example, in some embodiments, the audio blending system and method can introduce about a 0.25 microsecond delay so that a music bed and an announcer are not started at the same time. In some embodiments, the actual delay time can be specified by a user or brand and/or by a characteristic of the audio content. In some embodiments, the delay time can be increased or reduced.

In some embodiments, combinations of mood and genre can interplay with respect to which type of announcer and/or events for the break can be scheduled by the audio blending system and method. In some embodiments, the audio blending system and method can recognize the difference between genres and types of moods (such as high-energy jazz and high-energy rock) by a spectrum balancing process.

In some embodiments, the audio blending system and method can be configured to recognize the instance of the smallest available item to make decisions about how the items can be blended. In some embodiments, various factors or parameters of an item such as a quote, liner, or interview segment can be analyzed and used to define blending, joining, or overlap behavior. For example, in some embodiments, the audio blending system and method can analyze and/or receive data for a quote based on the quotes content (e.g., such as the use of certain words that may not may not be acceptable to play during a broadcast). In other embodiments, the audio blending system and method can select or de-select (e.g., apply an override) based on the nature of the quote and the current environment (e.g., such as understanding if the quote relates to a specific public holiday and not to play the quote outside of the holiday period). In some further embodiments, the audio blending system and method can include overlay or join factors for defining the behavior of the audio blending system and method when blending or joining with another element. In some other embodiments, the audio blending system and method can include genre blocks defining whether the audio blending system and method can or can't play an overlay based on genre (e.g., in general the audio blending system and method can be configured so that a hip-hop quote won't be played over a country song).

Some embodiments include a separation metric that uses a damping and logarithmic factors to increase in probability over time. For example, it would be generally undesirable to play the same content item back to back and/or to repeat a content item too frequently within a specific time period. In some embodiments, the audio blending system and method can dampen or lower the probability a specific item (such as a song, or other audio item such as a news item, weather item, specific DJ announcement, etc.) is played during a specified or calculated period of time since the item was last played. Using this method applied to a plurality of user or brand content, the audio blending system and method can essentially distribute content items through any period of time that is substantially random, and/or appears to a listener (independent of the listeners continuous listening period) to be within periodicity or repetition. In some embodiments, the audio blending system and method can apply a Simpsons index of diversity approach to understanding a pool of content and schedule a segment comprising a series of items that appear diverse over time. In some embodiments, this can also apply to sound effect, music bed, tags for the announcer's content (message, specific words, theme, concept, etc.). Further, in some embodiments, it can also work in reverse to ensure that there is a specific frequency for things (like branded messages or advertisements).

In some embodiments, content items can include voice over, musical clips, sweepers, and other content items as described earlier. In a conventional production for radio, various combinations of these types of items can be produced (as a pre-produced package). In the invention described herein, the audio blending system and method can use the same or similar types of content items, and create a produced show substantially real time. For example, for any production produced by the system in real time, the system is loaded with all constituent elements (which can represent a plurality of elements). In some embodiments, substantially in real time, a decision engine component of the audio blending system and method can process decisions to combine various elements (e.g., into a digital version of a pre-production show of the conventional art described above). In some embodiments, content delivered to a user can be processed using a mix engine on the user's device or platform by pulling content and following customized content. In other embodiments, a server can build in real time that is representative of a customized break for delivery to the user. For example, in some embodiments, music bed, sweep, voice-over, can be selected and pulled so that in real time, selections can be based on the characteristics and user driven preferences and/or brand preferences. In this instance, the engine can cascade priorities in real time to produce a pre-produced package that is being combined by a mix engine or by a server that builds the audio file in real time representative of the customized break as a single file. With regard to advantages of approaches, the mixed engine approach is low on server resources. However, the mixed engine approach requires a higher bandwidth. The server approach requires more server CPU cycles.

In some embodiments, the audio blending system and method can break apart existing elements of available content, label and make variable the elements, and driving the construction of a break based on surrounding elements and any use experiences and preferences and preferences of the brand. In some embodiments, the audio blending system and method can perform or process a join analysis by processing one or more primary and overlay elements. For example, primary elements (which can includes sweepers), can comprise songs, music beds, block (such as interviews with play). In some embodiments, sweepers can bridge between primary and overlay elements. Overlay content can comprise principally voice content.

In some embodiments, the audio blending system and method can include join analysis to define content between elements as generally defined earlier. In other embodiments, another type of join analysis can be performed later in the process. For example, in some embodiments, the audio blending system and method can determine whether sweepers are needed and/or if "tamping" is needed (e.g., where "tamping" is defined as where the audio blending system and method can damp down the volume of an end of a song or sweeper to accelerate exit). In some embodiments, the audio blending system and method can include an analysis of how the element ends, how the next element starts, whether binding is needed (e.g., with special effects), and whether tamping of previous element is required to get a better match. In some embodiments, some analyzed characteristics include the rhythmic nature of the transition, and/or the type of key transition (e.g., transitioning from a tri-tone to a semi-tone). In some embodiments, volume adjustment can include fades of either direction, either to an inaudible level (we called tamping) and thus ending or starting the content at a different time, or to a different audible level so that it can blend better with other content (known as "ducking").

In some embodiments, the audio blending system and method can include a timing analysis. For example, in some embodiments, the system can extend or reduce distance between elements. In some embodiments, the audio blending system and method can include an analysis to perform a characterization of transition (whether smooth, attractive), and does it maintain or manage energy (or mood). In some embodiments, the audio blending system and method can include the use of tempo, amplitude, and/or harmonic factors in the analysis to characterize the mood or a multi-variant mood over a period of time. In some other embodiments, the audio blending system and method can include a sentiment analysis to control blending of content items. For example, some embodiments can include an analysis of positive or negative words or emoticons to define a sentiment of a content item (e.g., song) or a portion of a song. This is a sentiment analysis on the content of the content (song lyrics, announcer message, news item, etc.) and can be used to drive blending (e.g., so as not to put a super-positive announcer over a super-negative piece of content).

Figure 22:
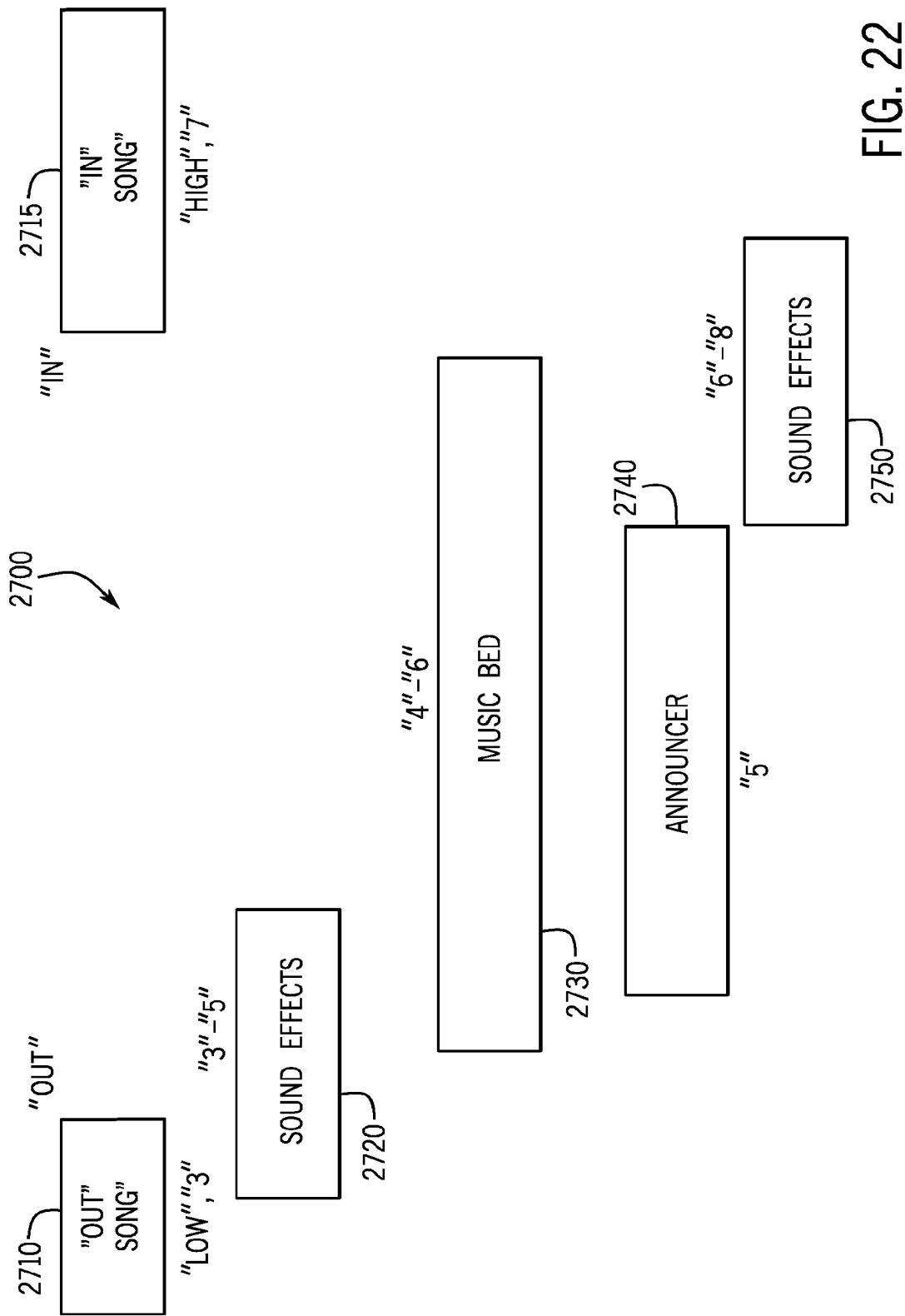
FIGS. 22-24 illustrate example break constructions in accordance with some embodiments of the invention.

FIG. 22 illustrates an example break construction 2700 in accordance with some embodiments of the invention. In some embodiments, mood constraining parameters can be applied by the audio blending system and method. The example embodiment can include a break for blending between an "out" element 2710 (e.g., such as a first song) and an "in" element 2715 (e.g., such as a second song). In some embodiments, the break can be constructed by the audio blending system and method to comprise a selection of items including, but not limited to, a first sweepers item 2720, a music bed 2730, an announcer item 2740, and a second sweepers item 2750. In some embodiments, the first and second sweeper items 2720, 2750 can be the same. In some further embodiments, the first and second sweeper items 2720, 2750 can be different. In some embodiments, the energy levels of the first and second content items 2710, 2715 bounding the break can be about the same. In some other embodiments, the energy levels of the first and second content items 2710, 2715 can be different. For example, in some embodiments, the first content item 2710 can comprise a low energy, and the second content item 2715 can comprise a high energy. In some embodiments, in real time, the audio blending system and method can apply a selection process that uses constraining criteria to select the items with different energy levels and arrange the items to smoothly bridge the energy levels of the first and second content items 2710, 2715. For example, for a first content item 2710 with an energy level of 3, and a second content item 2715 with an energy level of 7, a constructed break can be comprise a sweepers 2720 at a level of 3-5, blending with a music bed 2730 of 4-6, and overlaid and/or blended with an announcer 2740 of a level of 5, and finally a second sweepers 2750 with a level of 6-8.

In some other embodiments, the musical key of the first and second content items 2710, 2715 bounding the break can be about the same. In some other embodiments, the musical keys of the first and second content items 2710, 2715 can be different. For example, in some embodiments, the first song 2710 can comprise a "C" key, and the second content item 2715 can comprise an "A flat major" key. In some embodiments, in real time, the audio blending system and method can apply a selection process uses constraining criteria to select the items with different musical keys and arrange the items to smoothly bridge the musical keys of the first and second content items 2710, 2715. In some embodiments, the system includes an understanding of harmonious relationships and transitions and less harmonious relationships and makes decisions accordingly, (for example: A minor+C major is more harmonious than C major and C #major, which is very dissonant.)

In some other embodiments, the rhythms of the first and second content items 2710, 2715 bounding the break can be about the same. In some other embodiments, the rhythms of the first and second content items 2710, 2715 can be different. In some embodiments, in real time, the audio blending system and method can apply a selection process uses constraining criteria to select the items with different rhythms and arrange the items to smoothly bridge the rhythms of the first and second content items 2710, 2715. Further, in some embodiments, the audio blending system and method can dynamically adjust tempo and pitch during blending to align, match, and/or transition rhythms between items.

Figure 23:
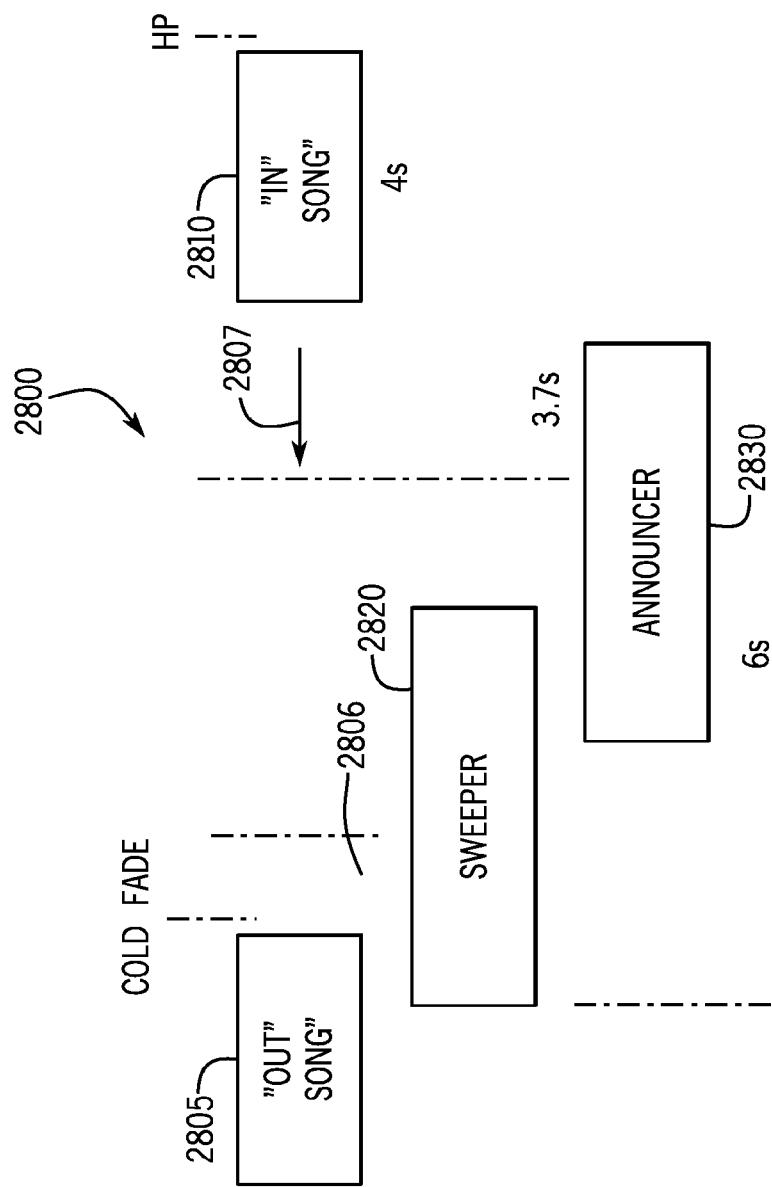

FIG. 23 illustrates an example break 2800 construction in accordance with some embodiments of the invention and illustrates a tightening up break example, where adjustments can be made to shim or shimmy (adjust) positions of blendings to produce either tight or loose joints. In some embodiments, the actual adjustments can be at least partially based on the genre and/or the first content item and/or the second content item. In some embodiments, best practice rules (e.g., parameters that can define an optimal listening experience) can be coded into the model. In some embodiments, they are adjustable. In some embodiments, the best practices are defined by the audio blending system and method based at least in part on the user, the user's history, the brand, or a combination thereof. The example embodiment can include a break for blending between an out element (e.g., such as a first content item 2805) and an in element (e.g., such as a second content item 2810). In some embodiments, the break 2800 can be constructed by the audio blending system and method to comprise a selection of items including, but not limited to, a sweeper 2820, and an announcer item 2830. In some embodiments, the out transition of the first content item 2805 and in transition of the second content item 2810 bounding the break can be about the same. In some other embodiments, the out transition of the first content item 2805 and in transition of the second content item 2810 bounding the break can be different. For example, in some embodiments, the first content item 2805 can comprise a slow fade, and the second content item 2810 can comprise a gap 2807 (e.g., such as a four second gap before a hard post). In some embodiments, in real time, the audio blending system and method can apply a selection process uses constraining criteria to select the items and arrange the items to smoothly bridge the fade out 2806 and in gap 2807. In some embodiments, the audio blending system and method can move the in gap 2807 (e.g., the opening of the next song) to shape and tighten the break and provide a constructed break with an improved listening experience. In some embodiments, the level of shimming of the break items can be adjustable. In some embodiments, the shimming level can be defined by the brand.

Figure 24:
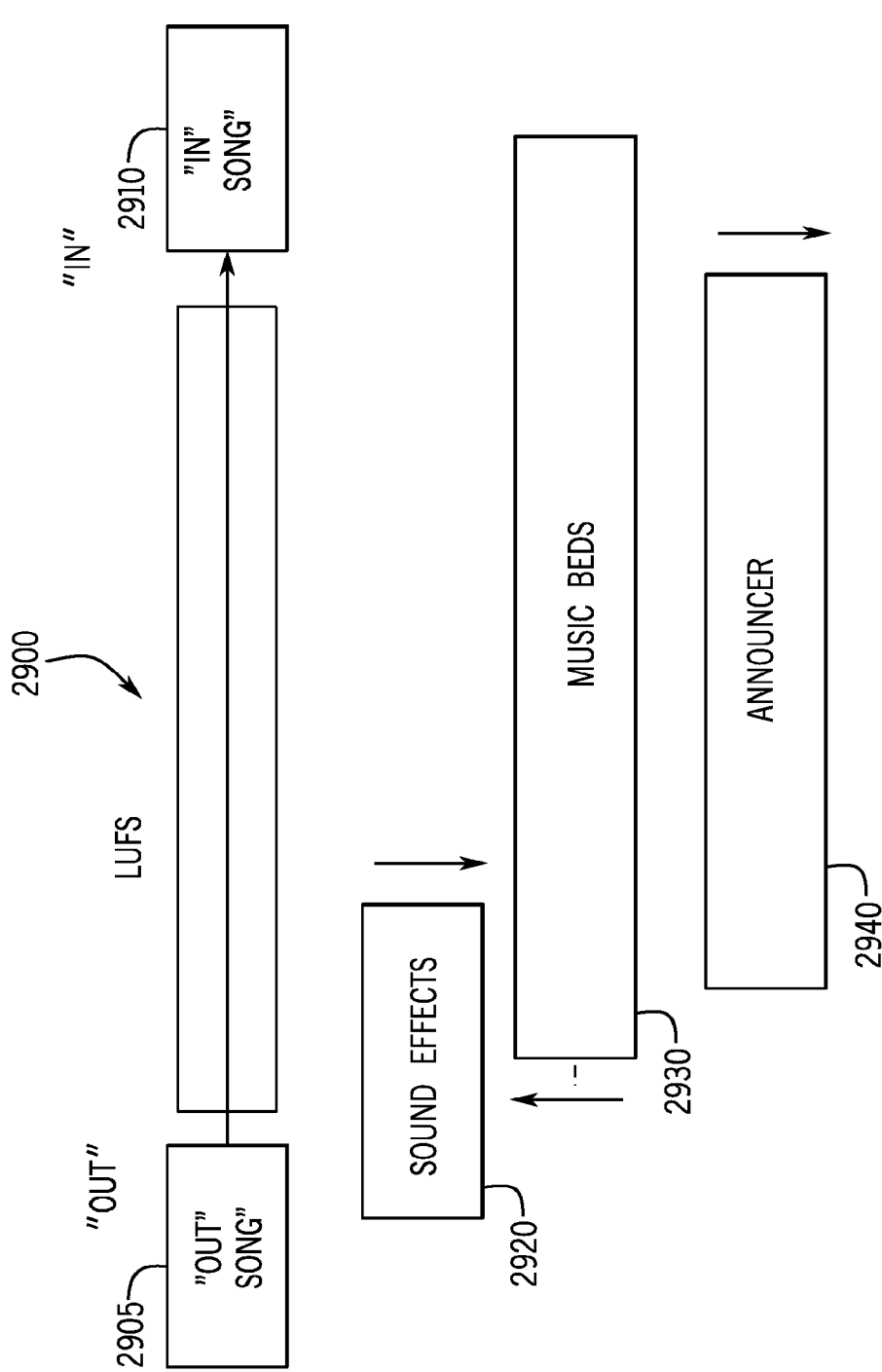

FIG. 24 illustrates an example break construction 2900 in accordance with some embodiments of the invention. In some embodiments, the amplitude (LUFS) in dB, levels of elements are measured, for overlays, and the audio blending system and method can include targets for overlay amplitude. For example, in some embodiments, the break can be constructed by the audio blending system and method to comprise a selection of items including, but not limited to, sweepers 2920, music beds 2930, and an announcer item 2940. In some embodiments, the out transition of the first content item 2905 and in transition of the second content item 2910 bounding the break can be about the same. In some other embodiments, the out transition of the first content item 2905 and in transition of the second content item 2910 bounding the break can be different.

In some embodiments, in real time, the audio blending system and method can apply a selection process uses constraining criteria to select the items and arrange the items to smoothly bridge the two content items. In embodiments, where the LUFS of the first content item 2905 and second content item 2910 is different, the audio blending system and method can adjust volumes to get close to target for blending. In this example, embodiments, the audio blending system and method can include stair-steps across inner elements to transition from one LUFS of the out content item 2905 to the LUF of the in content item 2910.

In some embodiments, to schedule a transition, the audio blending system and method, a transition request can comprise an out element, an in element, and a collection of "Formatics". The "Formatics" can contain flags that specify pools of content to use for voiceover branding and content, allowance of voiceover branding, and allowance of extended content (interviews, quotes, trivia, news, ads, etc.). In some other embodiments, the other flags can set voiceover and content style (loose, tight, allow front overlay, allow tail overlay, etc.), force data-source for transition (level 1, level 2, and/or level 3) trust percentage for content item overlays using splogged data. Further, the flags can specify album protection, content and/or feature to include frequency, separation rules for content transition quality sensitivity, and gapless genres, etc. In some embodiments, the Formatics can override default values and behaviors, for example, to allow announcers to talk on the ends of songs or other content.

In some embodiments, the audio blending system and method can select or process a pool of content that can be specified (specified by service, station, genre, etc.) to include, but not be limited to, voiceovers, music beds, sweepers, interviews, quotes, trivia features, listener call-ins news, and/or ads etc.

In some embodiments of the invention, the audio blending system and method can define frequency and/or separation rules for content categories. For example, some embodiments can specify how frequent a particular category of content should be included. Further, these rules can refer to a class of content, like a voiceover, or be more specific and refer to a category of content within a class (e.g., a voiceover that include the phrase " . . . simply the best music." tags can also include other elements such as the name of the announcer, topic of interview, source of quote, etc.)

In some further embodiments, global rules can also be in effect that apply to elements in aggregate. For example, a global rule can specify: "go at least 3 content items or twelve minutes (whichever is longer) between interjecting content between content items". In some embodiments, this rule can also have a strength (on a scale of 0 to 100) to indicate how important it is that the rule be followed compared to other rules and compared to the "need" of a particular in/out pairing.

In some embodiments, element pairings can have an intrinsic transition need based upon the analyzed quality of an unaided transition. In some embodiments, the "transition quality sensitivity" from the formats above can refer to utilizing the analyzed metric to determine the propensity to "aid" a transition with additional content. This can work with global and content/class rules for transitions in order to make decisions about when to step in and aid a particular transition with content.

In some embodiments, content can be tagged with one or more known attributes that are used to identify these classes and categories. For example, in some embodiments, each category or class rule can specify how frequently to play this category and/or class of content, and when to schedule/play this category and/or class of content. Further, each category or class rule can specify a minimum time to exhaust a particular piece of content once played.

In some embodiments of the invention, the audio blending system and method can process a transition building sequence. In some embodiments, the transition setup and initial element selection can include determining the portion where to determine the primary elements to be used in the transition. In some embodiments, the audio blending system and method can process a transition building sequence that includes: 1. gather information on in and out elements (genre, album, disc and track #, artist, fusion/meatware/robo data, etc.), and 2. gather information based on Formatics (lists of content that could be used for voiceover, music beds, sweepers, interviews, ads, etc.). This content can be merged with a user's play history in order to understand its eligibility for play (based on separation rules in the Formatics). The sequence can further include the following steps: 3. determine the need to perform gapless playback (for content that is sequential on the same album, for particular genres of content or for content or for content that prohibits overlays), and 4. determine the volume adjustment for the two tracks that are playing (the current track will already have had a volume adjustment). The sequence can further include step 5. if not gapless and the algorithm is given latitude to decide what it does for this transition, perform some calculations based on factors to generate the odds of creating a particular type of break. These focus on the in and out points of the two items and can include match between fade profiles, rhythmic nature of the transitioning items, mood difference between the items, genre distance between the items, key compatibility of the two items, type and duration of overlay space on the incoming item, what content is available, etc. Further, a further sequence can include step 6. based on the type of break (driven by Formatics and by algorithmic analysis), filter and pick the content based on the construction of the break. For example, the announcer, the type of message to use, and the specific read (matching energy and length). This can include all elements being used in the break construction, and is not limited to announcer, fixed production elements, news, weather, ads, interviews, trivia, etc. Some embodiments can design a transition for interactive systems when the user hits the "next" button prior to the end of the previous content to create a more artful interactive skip.

In some embodiments of the invention, the audio blending system and method, a sequence building engine can process additional elements and determine the structure of the break for basic element sequencing. Some embodiments utilize look-ahead and look-behind techniques to evaluate both sides of a break, and characterize the time used from a last-element perspective. This can enable overlay of content on top of incoming and outgoing elements when there is space available, but without attempting to overlay too much content that may overstep the area that is determined to be safe for overlay. In some embodiments of the invention, each item is added to a list that represents the sequence of primary elements. This drives the next step in the process, i.e., the actual scheduling. Each item is only done if scheduling that particular element in the break. In some embodiments, each item that composes the break is analyzed backwards and it is determined if it is placed on the incoming content item, a music bed or on the outgoing content item (all based on Formatics).

In some embodiments of the invention, the audio blending system and method, a sequence building engine can determine if any particular elements are being forced based on the juxtaposition of the two elements (e.g., if using a sweeper with voice over the top to bridge a gap between two items that don't support overlap). In one non-limiting sample sequence process, the a sequence building engine can determine placement on top of the incoming content or in the front of that content and add it to the sequence if scheduling an announcer. Further, the sequence building engine can determine placement on top of the incoming content or in front of that content and add it to the sequence if scheduling a quote, or scheduling an interview.

In some embodiments of the invention, the audio blending system and method, a sequence building engine can process a sequence schedule. In some embodiment, the sequence building engine can loop through each element in the ordering and employ logic to schedule that element with precise timing. In some embodiments, additional glue elements (sweepers, etc.) in the phase can be used to aurally stitch the flow together, and can be processed in any particular arrangement.

In some embodiments of the invention, the audio blending system and method, a sequence building engine can analyze two particular elements and identify how they stitch together. In breaks with other added elements such as music beds or produced elements, each transition point can be evaluated. The characteristics of two elements can drive the decision process on how to perform a particular join. In some embodiments, the resultant parameters can be information on the need to fade out the outgoing item, and/or fade in the incoming item, and/or what pace should the fade be performed at, and/or do the need to inject a sweeper to bridge the transition, and if injecting the sweeper, what is the shape, and so on. In some embodiments, elements can be "scheduled" at a particular timing based on a number of characteristics of the audio. In some embodiments, overlaps are identified based on compatible central keys, and/or rhythmic profiles, and/or fade in/out types, and/or tightly analyzed amplitude windows, and many more criteria. In some embodiments of the invention, the audio blending system and method, a sequence building engine can determine when it needs to separate elements versus when it needs closely couple or join elements. The extreme case of the latter includes scheduling a "gapless" transition, where the engine uses an understanding of the characteristics of that type of transition to overlap the two pieces of content just enough so that there seems to be no audible gap between the items at all.

In some embodiments, for each two elements, the audio blending system and method can make decisions regarding timing and gaps in order to create an organic, artistically metered flow between elements. Other decisions can include the scheduling of force fade-outs of previous elements (especially in song to song transitions or music bed to song transitions). In some embodiments, fades and ducking behavior are inserted in to the ordering as "control messages". In addition, amplitudes of each individual element can be adjusted based on the needs of its position in the sequence.

In some embodiments, the scheduling order can include the outgoing content item added to the final playlist recipe. For example, in one non-limiting example, for each item (based on its type) in the element sequence order (from previous step), the following can be processed in order (with each a numbered step as an if statement): 1. Do we need a music bed? If so, evaluate the join and: (a). If required, select and schedule an appropriate sweeper (with the right shape and energy level), (b). Schedule the music bed; and 2. Determine if we need to schedule the incoming element for this break? If so, evaluate the join and: (a). If required, select and schedule an appropriate sweeper (with the right shape and energy level), and (b). Schedule the incoming content item; and 3. Are we inserting an item that needs a formatted setup, like an interview, then schedule the elements required. For example, an interview requires the feature announcement followed by the artist's name followed by the interview. These multiple items are scheduled in sequence and added to the ordering, and can include step 4. Are we scheduling an announcer element? If so, place it in. In some other embodiments, there can be more elements than the four listed above based on the unique content requirements of a particular transition (like playing a commercial between two songs). The end result of this process is what is called a "recipe"- or a playlist of all of the elements and control messages that make up a break. It is timed starting at a certain point in the outgoing element and governs behavior until the final control message that might occur after the incoming element has been started.

In some embodiments of the invention, the audio blending system and method can process one or more types of transitions of content items. For example, in some embodiments, two types of transitions can include a song-to-song transition and a multi-element interview break type transition. In one non-limiting example embodiment, an application programming interface (API) of the audio blending system and method can make an outgoing item and an incoming item and orchestrate the transition, returning a "Recipe Response" JSON document. This document can include a transition that is timed from a certain predefined point in the outgoing item's playback (which is correlated into the "zero" in a transition timer). Each element in the transition sequence has a specific time at which it is started, initial amplitude and subsequent control messages that may affect its amplitude up or down later in the sequence. In some embodiments, the basic JSON response package can include two primary objects such as a details object and a sequence object. In some embodiments, the details object can include details about the scheduled transition. In some embodiments, these details can include the type of transition that was scheduled (0=song to song; 1=multi-element break; etc.) In some embodiments, these details can include a start time in seconds from the beginning of the outgoing content to normalize the sequence's timer to (considering that moment to be "time zero" for the transition timer that is referenced by each item in the sequence object below).

In some embodiments, these details can include a sequence object that contains a timed playlist of elements to be triggered or control messages to be enacted in order. There are a number of types of items that break into two buckets including an item that triggers the playback of an audio file and an item that signals a control over the volume of a playing audio file. In some embodiments, each list item that indicates the playback of an audio file can include the time for the event to be triggered in seconds (relative to "zero time" as referenced in the details overview), and a shared GUID identifier for the content object. In some embodiments, the file can also include the type of the element that is being played. This can include (but is not limited to): song, sweeper, bed, announcer, interview, etc. In some embodiments, the file can also include the duration of the element in seconds; this value does not take into account any perceived shortening that may be caused by later control messages and is more a function of the file duration. In some further embodiments, the file an include the adjustment to be made to the given items volume; see "Notes On Volume Adjustments" below for more details on this value. In some further embodiments, the file can include a url of the audio element for items that are sourced from a server or database audio repository of the audio blending system and method. In some embodiments, processed items that are control messages primarily target the adjustment of volume levels. In some embodiments, the control messages can include the time for the control event to be triggered in seconds (relative to "zero time" as referenced in the details overview). Some embodiments include a type that indicates the control message by using the string "control". Some embodiments include an action that comprises the type of control action to employ. For example, a single action type "fade" can refer to both increases and decreases in an individual element's amplitude. Some further embodiments include a duration value that indicates the time to execute the fade operation in seconds. Some further embodiments include an end value—the end adjustment value for the target item's volume.

Some further embodiments include a target that comprises a zero-index sequence index of the target object for the control message (as an integer). In some embodiments, for volume adjustments, both the individual elements in a sequence as well as the control messages that fade in and out content alter the volume of audio elements in the sequence. In some embodiments, this alteration is done for a number of factors, primarily to manage the relative volumes of individual content items (e.g., for song to song transitions) and to appropriately level any items that are overlade in multi-element transitions. In some embodiments of the invention, volume leveling can be calculated using amplitude measurements based on a LUFS/LKFS scale (see ITU-R BS.1770, ITU-R BS.1770-2, ITU-R BS.1770-3, and EBU R128). In some embodiments, an end-state can adjust values for outgoing and incoming balance to these specifications. In some embodiments, this compensates for content with reduced dynamic range and increased perceived loudness to perform a "volume leveling" like effect. Some embodiments include volume adjustments that are represented as linear multipliers where no decibel (dB) conversions are necessary as they are already performed by the transition engine. In some embodiments, volume adjustments are performed relative to any "headroom" that is carved out on the playback side, which is specific to the rendering device's playback architecture. In some embodiments of the invention, volume adjustments primarily contain values that are less than one (values that reduce the amplitude of the item being played back from its original full volume.)

Some embodiments include instances where there will be a value greater than 1 for a volume adjust. In some embodiments, the way this is handled depends on the capabilities of the playback mechanism and whether they have been introduced headroom into the soundstage. For example, in some embodiments, the audio blending system and method can increase the volume of the entity up to the minimum of either a) the value indicated by the multiplier or b) the maximum available headroom, whichever is smaller. In some embodiments, control messages that are type "fade" alter the amplitude of an item up or down over a timed duration. These operations are relative to the current volume level and expect a linear transition over the duration period to the "end value" of the targeted item.

Figure 25:
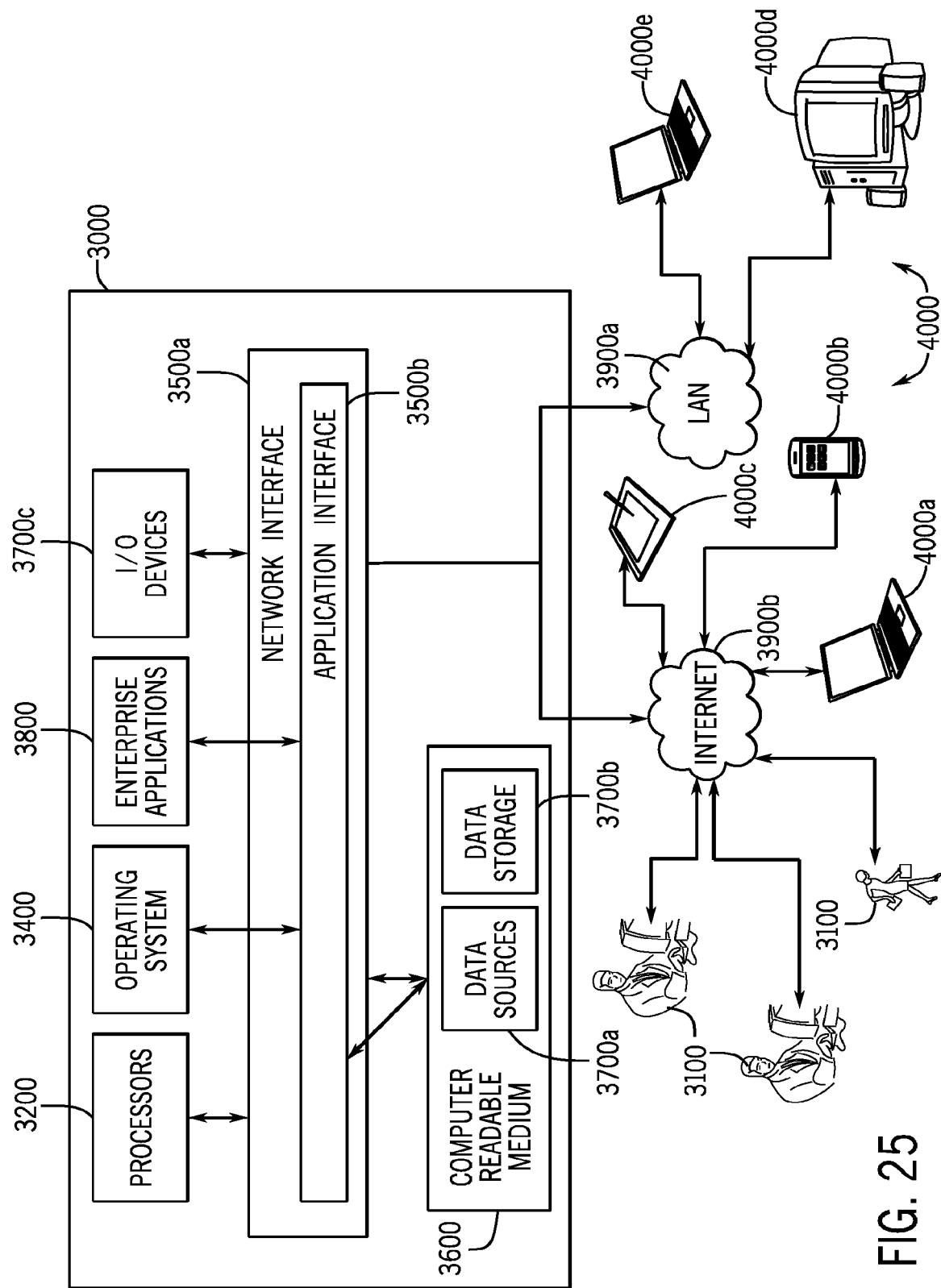
FIG. 25 illustrates a computer system configured for operating and processing components of the audio blending system and method in accordance with some embodiments of the invention.

FIG. 25 illustrates a computer system 3000 configured for operating and processing components of the audio blending system and method in accordance with some embodiments of the invention. In some embodiments, the computer system 3000 can process one or more software modules of the previously described audio blending system and method applications to transform unblended audio content to blended audio content and/or display information related to the transformation of unblended audio content to blended audio content within a graphical user interface. Further, in some embodiments, the system framework of the audio blending system and method shown in FIG. 1A can use the computer system 3000 to process one or more audio blending system and method application services. The system framework can also manage the organization of data and data flow between the audio blending system and method application services, the front-end systems, and external (third party) computer systems.

As shown, the system 3000 can include at least one computing device, including one or more processors 3200. Some processors 3200 can include processors 3200 residing in one or more conventional server platforms. The system 3000 can include a network interface 3500*a* and an application interface 3500*b* coupled to at least one processor 3200 capable of running at least one operating system 3400. Further, the system 3000 can include a network interface 3500*a* and an application interface 3500*b* coupled to at least one processors 3200 capable of running one or more of the software modules (e.g., enterprise applications 3800). The software modules 3800 can include server-based software platform that can include audio blending software modules suitable for hosting at least one user account and at least one client account, as well as transferring data between one or more accounts.

With the above embodiments in mind, it should be understood that the invention can employ various computer-implemented operations involving audio blending data stored in computer systems. Moreover, the above-described databases and models throughout the audio blending can store analytical models and other data on computer-readable storage media within the system 30 and on computer-readable storage media coupled to the system 3000. In addition, the above-described applications of the audio blending system can be stored on computer-readable storage media within the system 3000 and on computer-readable storage media coupled to the system 3000. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated.

Some embodiments include the system 3000 comprising at least one computer readable medium 36 coupled to at least one data storage device 3700*b*, and/or at least one data source 3700*a*, and/or at least one input/output device 3700*c*. In some embodiments, the invention embodied by the audio blending system can be embodied as computer readable code on a computer readable medium 3600. The computer readable medium 3600 can be any data storage device that can store data, which can thereafter be read by a computer system (such as the system 3000). Examples of the computer readable medium 3600 can include hard drives, network attached storage (NAS), read-only memory, random-access memory, FLASH based memory, CD-ROMs, CD-Rs, CD-RWs, DVDs, magnetic tapes, other optical and non-optical data storage devices, or any other physical or material medium which can be used to tangibly store the desired information or data or instructions and which can be accessed by a computer or processor (including processors 3200).

In some embodiments of the invention, the computer readable medium 3600 can also be distributed over a conventional computer network via the network interface 3500*a* so that the audio blending system embodied by the computer readable code can be stored and executed in a distributed fashion. For example, in some embodiments, one or more components of the system 3000 can be tethered to send and/or receive data through a local area network ("LAN") 3900*a*. In some further embodiments, one or more components of the system 3000 can be tethered to send or receive data through an internet 3900b (e.g., a wireless internet). In some embodiments, at least one software application 3800 running on one or more processors 3200 can be configured to be coupled for communication over a network 3900a, 3900b. In some embodiments, one or more components of the network 3900a, 3900b can include one or more resources for data storage, including any other form of computer readable media beyond the media 3600 for storing information and including any form of computer readable media for communicating information from one electronic device to another electronic device.

In some embodiments, the network 3900a, 3900b can include wide area networks ("WAN"), direct connections (e.g., through a universal serial bus port) or other forms of computer-readable media 3600, or any combination thereof. Further, in some embodiments, one or more components of the network 3900a, 3900b can include a number of client devices which can be personal computers 4000 including for example desktop computers 4000d, laptop computers 4000a, 4000e, digital assistants and/or personal digital assistants (shown as 4000c), cellular phones or mobile phones or smart phones (shown as 4000b), pagers, digital tablets, internet appliances, and other processor-based devices. In general, a client device can be any type of external or internal devices such as a mouse, a CD-ROM, DVD, a keyboard, a display, or other input or output devices 3700c. In some embodiments, various other forms of computer-readable media 3600 can transmit or carry instructions to a computer 4000, including a router, private or public network, or other transmission device or channel, both wired and wireless. The software modules 3800 can be configured to send and receive data from a database (e.g., from a computer readable medium 3600 including data sources 3700a and data storage 3700b that can comprise a database), and data can be received by the software modules 3800 from at least one other source. In some embodiments, at least one of the software modules 3800 can be configured within the system to output data to at least one user 3100 via at least one digital display (e.g., to a computer 4000 comprising a digital display). In some embodiments, the user 3100 can comprise a customer or a sales associate. In some embodiments, the computer 4000 can be embodied by an in-car entertainment system, and video playback devices (e.g., such as AppleTV®). AppleTV® a registered trademark of Apple Inc.

In some embodiments, the system 3000 as described can enable one or more users 3100 to receive, analyze, input, modify, create and send data to and from the system 3000, including to and from one or more enterprise applications 3800 running on the system 3000. Some embodiments include at least one user 3100 coupled to a computer 4000 accessing one or more modules of the audio blending system including at least one enterprise application 3800 via a stationary I/O device 3700c through a LAN 3900a. In some other embodiments, the system 3000 can enable at least one user 3100 (through computer 4000) accessing enterprise applications 3800 via a stationary or mobile I/O device 3700c through an internet 3900a.

Some of the embodiments described herein include a production engine for creating customized and contextualized content for a produced element or audio or other production. In some embodiments, a production content creation server, system and method can select and join a plurality of content elements to create the produced element. In some embodiments, produced elements from the production engine can be applied to a variety of broadcast types including, but not limited to, a show or feature, a commercial, a newsbreak, an announcer or DJ break, an interview, and/or a documentary. Some embodiments of the invention include a production content creation server, system and method capable of selecting and characterizing audio content to create a produced element substantially in real time. The production engine can enable all parts of a broadcast to be variable. In some embodiments, produced elements can be created using a production engine for a produced element (e.g., such as a newsbreak) that can include intros, and/or outros, and/or auto-generated text, and/or multiple synthesized voice that connects with audio actuality.

In some embodiments, produced content or elements can include a content element such as one or more songs that have been assembled using any one of the methods described earlier with respect to the audio blending system and method. In some embodiments, the produced content or produced element can be implemented as a standalone broadcast, or within a produced element that includes content element such as one or more songs that have been assembled using any conventional assembly methods. For example, in some embodiments, the created produced element can be inserted into a broadcast at any time. In some further embodiments, the created produced element can be faded or blended into a broadcast at any time. In some embodiments, the insertion, fading or blending can be timed based on the broadcast content, the produced element content, user preferences or behaviors, and/or brand preferences.

In some embodiments of the invention, the production content creation server, system and method can include at least one machine process such as a process performed by a computer system or specially configured server (referred to herein as a "computer system") executing one or more software modules of the production content creation server, system and method. In some embodiments, the production content creation server, system and method can also include one or more analytical methods performed by a human analyst. In some embodiments of the invention, the production content creation server, system and method can analyze one or more audio content elements using at least one computer system based method and at least one human analyst or operator. In some embodiments of the invention, a production engine operating and processing components of the audio blending system and method using the computer system 3000 configured can ensure that a content item (e.g., such as a newsbreak or news feature) is played with specific content (e.g., such as music) for a broadcast station (such as a rock station). In other words, the system can produce content that is contextualized (e.g. analyzed and assembled in ways that ensure the content is consistent with the mood or other characteristics of other content.) Moreover, in some embodiments, the creation of produced elements can be personalized (e.g., can be personalized by a user and/or can be modified based on the user behavior). In some embodiments, the one or more characteristics of the audio content can be based at least in part on one or more of the parameters of the content, a listener's preferences, a listener's behavior, branding preferences, produced element, style or genre. In some embodiments, the system can be based on demographic of the user, clicking or selection experience (behaviors) with the interface, and/or browsing behaviors. In some embodiments, the production content creation server, system and method can include an interface that can enable interaction to access or initiate a newsbreak, skip a news element of a newsbreak, control content of the newsbreak. In some embodiments of the invention, the content can be varied based on prior play history.

In some embodiments, in addition to any content elements such as one or more announcements and/or text-to-speech content, the content element or segment can include voice overs (including announcers), news items, text-to-speech items, music, song, or vocalist clips, sweepers, or other content items including voice and/or music, or other types of sounds. In a conventional production for radio, various combinations of these types of items can be produced (as a pre-produced package). In the invention described herein, the production content creation server, system and method can use the same or similar types of content items, and can create a produced show in real time or substantially real time. For example, for any production generated by the production content creation server, system and method in real time, the production content creation server, system and method can be loaded with all constituent content elements (which can represent a plurality of content elements). In some embodiments, substantially or completely in real time, a decision engine component (i.e., the production engine) of the production content creation server, system and method can process decisions to combine various elements (e.g., into a digital version of a pre-production show of the conventional art described above). In some embodiments, various levels of analyses can be performed in near real time using look-ahead techniques or delays, eliminating the need for pre-analysis of content elements.

In some embodiments, using a news element or newsbreak creation as a non-limiting example, where the end goal is the creation of a news feature, starter elements can be one or more rss feeds. In some embodiments, the rss feeds can be text and audio actuality, where the text describes the audio actuality. In one non-limiting example embodiment, the text can be manipulated to create intros and outros, or if there is no audio actuality, and there is one block of text, then there is a news element. Following this, the production content creation server, system and method can download and analyze the audio actuality, and re-encode and manipulate the information using a process called "dynamic compression". Dynamic impression can allow a field recorded interview or sound to have a greater overall loudness by reducing the difference between the loud and soft portions of the audio segment. Further, in some embodiments, the production engine of the content creation server, system and method can process noise reduction, equalization adjustment, and pitch modification of the produced element. In some embodiments, it can be any type of data feed; textual or even, in some versions, audio. Some embodiments include using speech to text to convert an audio or video news feed into text that is then translated and then re-rendered using text to speech technology.

In some embodiments, the production engine of the content creation server, system and method can process files comprising text information. In some embodiments, text can be passed through a text to speech process to create audio files that are varied based on voice and language. The resulting audio file can then be passed through an analysis and modification to create a broadcast-ready file. The text can also be translated to other languages as desired. For example, in some embodiments, the text portion can be analyzed using a translator to produce one or more alternative language versions.

In some embodiments, the production content creation server, system and method can create a library of content or news features related to news content. The user can decide on the topics, the format of the sound, and the content can depend on the branding or on user preferences. In some embodiments, the new features can be used with or between content from a library of announcers that can perform branding and/or music beds of various lengths that can have areas marked with LUFS. In some embodiments, the production content creation server, system and method can create real-time dynamic news features using these methods. In some embodiments, the production content creation server, system and method can select content based on user preference and/or past preference or listening behavior, target duration, and can assemble music beds, announcer introductions, intros and outros, news feature, and adjust gaps and style of the news content based on the content (fast, slow, laid-back, etc.) The production content creation server, system and method can use synthesized voice or human recorded sound. In some embodiments, the feature can be generated based specifically on where it is being used, brand, context of current music theme or genre, and the listener. For a commercial or advertising element example, the production content creation server, system and method can vary voices, music, sweepers, etc. In some further embodiments, content tags can drive the selection of accompanying and supporting content. For example, content tagged as "breaking" can cause a different set of supporting elements to be used.

Some embodiments of the invention can provide produced elements for cutting-in and cutting-out of live broadcast feeds as defined by the production content creation server, system and method, and/or the listener, and/or the listener's preferences and/or interactions with the system and/or the brand, and/or based on the parameters of the broadcast content, including, but not limited to genre, mood, temp, beat, etc. In some embodiments of the invention, the audio source can include overlaid or embedded audio files. For example, in some embodiments, the overlaid or embedded audio can comprise a verbal announcement including, but not limited to, a DJ announcement, a news announcement, a weather announcement, or a commercial announcement. In some embodiments, other overlaid or embedded data can be used.

In some embodiments of the invention, the production content creation server, system and method includes a newsreader engine that connects to news sources, renders audio, processes actualities, robosplog files, and registers the details in a database. Further, in some embodiments of the invention, the production content creation server, system and method includes a newsmaker engine that creates and crafts a recipe for a news break that is rendered for a user. First, in reference to the newsreader engine, for each news feed that the newsreader is coupled to, newsreader reads the metadata for each news article, identifying the headline, text of the article, byline, categories and keywords, any related audio actualities, and any related image assets. In some embodiments, the production content creation server, system and method can download any audio actualities, and download any related image assets. Further, the production content creation server, system and method can process the audio actuality to modify dynamic range, equalization, duration, etc., and transcode audio actualities to the required delivery formats. Further, in some embodiments, the production content creation server, system and method can translate the headline and article text into any needed target languages. For example, the production content creation server, system and method can render the various translations of the headlines and article text to speech using a speech to text engine. This process can render each element into multiple voices (of potentially different genders, personalities and tempos) that also correspond to their target languages. Further, the production content creation server, system and method can process the rendered speech to text audio files to modify dynamic range, equalization, duration, etc., and transcode the rendered speech files to the appropriate required delivery formats. In some further embodiments, the production content creation server, system and method can generate waveforms (optional), and store the audio assets in a server or database. Using level 1 and/or level 2 analysis, the production content creation server, system and method can process the audio files using a subset of the full analysis suite targeted for non-musical data, and upload the data to the database with all of the corresponding details.

In reference to the newsmaker engine, when a news break is requested to be scheduled by the server, the client can send a collection of parameters for processing by the production content creation server, system and method. In some embodiments, these can include, but not be limited to, what "genre" of audio styling to use. This can control the use of musical bumpers and backgrounds in order to better fit the news broadcast into a branded experience or musical context. In some further embodiments, the parameters can include what "Mood" of audio styling to use. This can also help select the appropriate musical beds, voices and stylistic affects of the reads (like tempo and amplitude) to better fit the news broadcast into a branded experience or musical context. In some further embodiments, the parameters can include any specific voice overrides, such as if particular voices are desired for pre-produced or dynamically produced elements, these can be selected here. In some other embodiments, the parameters can include what categories of content to include in the news broadcast. From a large collection of categories and keywords, those delivered can be prioritized and can indicate what content to target to the end user. These can be derived from brand preferences (the access channel), by individual user preference (derived or explicitly selected) or a combination of both. In some further embodiments, the parameters can include a window of time to search for stories, which can indicate how current the news needs to be. For example, the last 2 hours, last 24 hours, last week, etc. In some embodiments of the invention, the parameters can include how many stories or how long of a broadcast to produce. This value can indicate the duration of the expected news broadcast or the number of unique stories to produce for the news broadcast.

In some embodiments of the invention, the parameters can be used by the production content creation server, system and method to build out the recipe for the news broadcast. For example, in some embodiments, in a first step, the production content creation server, system and method can retrieve the stories that match the categories and window of time to be included in the broadcast. In another, step, the production content creation server, system and method can distill the identified stories into time and theme correlated bundles. In a another step, the production content creation server, system and method can attempt to compose the news broadcast using the most current representations of the various content themes, driven by any shared priorities or by priorities indicated in the content itself (e.g. breaking news prioritized selection). In a further step, if a break cannot be composed for the number of articles or time requested, the production content creation server, system and method can expand the search both in breadth of themes and time and try again until either successful or, after a number of passes, failing and retuning an error code. In another step, the production content creation server, system and method can collect the audio features for the assets that are to be used (including music beds, bumpers, announcers, news reads, audio actualities, etc.). In a another step, the production content creation server, system and method can calculate the sequence, timings and amplitudes the news break based on the audio features. In some embodiments, breaks can be composed a number of ways, interacting with music and actualities, alternating between voices, etc. For example, one non-limiting embodiments of the playlist can include: start news bumper music fade down bumper music, transition to looped music bed, and overlay pre-produced announcer introduction, and play tts announcer 1 story 1, and play related audio actuality for story 1 play tts announcer 1 byline for story 1 play tts announcer 2 story 2. Further, the playlist can include play tts announcer 1 story 3, play related audio actuality for story 3 play tts announcer 1 byline for actuality 3 transition to end news bumper music fade up bumper music, and queue pre-produced announcer outtro return the recipe to the client for playback.

In some embodiments, the behavior of the production content creation server, system and method can be directed by the audio characteristics of the "in" and the "out" portions of content elements. For example, similar to that described earlier with respect to FIG. 20, in some embodiments, during content processing for creation of a produced element for a broadcast segment, the production content creation server, system and method can determine if a gap would be created by insertion of the content elements. The production content creation server, system and method can decide to place a content item between an "out" content and the "in" content of a broadcast to include a very high probability of fixing any gap between content items (e.g., >95% likelihood of being fixed). In some embodiments, in real time, the production content creation server, system and method can apply a selection process using constraining criteria to select the content items and arrange the content items to smoothly bridge a fade out and fade in gap within the produced element. In some embodiments, the production content creation server, system and method can move a fade in gap (e.g., the opening of another content element) to shape and tighten the produced element with an improved listening experience.

In some embodiments, the processing of a produced element can start with an analysis using one or more pieces of specific information provided by the client user (such as preferences). The information can comprise information comprising an "out" element and an "in" element. Further, in some embodiments, the accompanying information can include one or more client user preferences. In some embodiments, the "in" and "out" can be the in and out of any audio item or content element comprising information that be used, at least in part to guide or direct the production content creation of the items. For example, in some embodiments, the content element can include a news announcement or break, a song, an announcement, a DJ announcement, a weather announcement, or a commercial announcement, or a combination thereof. In one example embodiment, an audio content element can comprise an "out" element comprising a news announcement or break, and the "in" element can comprise a song or music item. In this instance, the production content creation server, system and method can analyze the information as described above to determine a joining or production content creation of adjacent "in" element and "out" elements so that any produced element is preferred or deemed audibly acceptable or desirable to a listener when inserted into a broadcast segment.

In some further embodiments, the production content creation server, system and method can perform a beat-frame analysis of the audio content using at least a portion of an audio content file. In some embodiments, beats or other position identifiers in audio spectra can be tagged or marked based on a frame number. In other embodiments, the position identifiers can be based on time. In other embodiments, position identifiers can be based on sections or segments of the audio or other position markers that enable the audio to be divided into measureable intervals.

Some embodiments include the influence of one or more factors used to calculate or adjust scheduling decision making by the production content creation server, system and method For example, some embodiments include a factor of the user's history, such as for example the user's previously played audio content and selections. In some embodiments, the user's history can include the user's previous play history defining the user's like or dislike for content that includes at least one break. For example, a user's previous play history can include play time, content or preferences that demonstrate the user does not tolerate a significant number of news breaks, DJ announcer breaks, weather breaks, etc.

Some embodiments of the invention enable automated and fully customizable brand modifications as market needs or desired market penetration change. In some embodiments, the production content creation server, system and method can use a multistep process to create a produced element, where initially, an analysis of pieces of content of the elements that are being assembled is performed, and the analysis is co-mingled with user preferences and brand preferences as a template that is used to perform the content assembly.

In some embodiments of the invention, the production content creation server, system and method can search for content elements that are not available. In some embodiments, the process is "self-healing" on the fly (e.g., substantially in real time) to get as close as possible to the template even if some intent or preferences are abandoned based on the original template instructions. For example, in some embodiments, a preference or directive from a brand can include positioning and blending various content elements. In instances where the production content creation server, system and method cannot find or determine the location of a relevant and properly contextualized content element from at least one of the brand content pools, the production content creation server, system and method can abandon the specific intent to production content creation.

Some embodiments include automatic override of intent based on an analysis of the content. In some embodiments, the override of intent based can be based on any of the aforementioned Formatics, including, but not limited to, specific pools of content for voiceover branding and content, allowance of voiceover branding, and allowance of extended content (interviews, quotes, trivia, news, ads, music beds, sweepers, etc.). For example, in some embodiments, a brand preference can include placing a content element the beginning or at least part way through produced content. In some embodiments, based at least in part on the availability of the content element, and/or an audio influencing characteristic of the content element, the production content creation server, system and method can perform an override action. For example, the override action can include determining another location of the content, selecting a different content, selecting a different location, and/or selecting an alternative audio content item or element such as a sweeper. In some embodiments, the production content creation server, system and method can enable the user or brand to select the level of override or behavior.

Some embodiments include a weighted precision system to dial in the behavior of the production content creation server, system and method when processing a template. For example, in some embodiments, a client user or brand can select a weighted precision factor to increase or decrease the likelihood that the production content creation server, system and method will override a user or brand intent. In some embodiments, the production content creation server, system and method can use multiple factors including, but not limited to, the user's history, meta-data such as splog data, and use, client, and/or brand preferences during the production content assembly.

In some embodiments, the production content creation server, system and method can be configured to recognize the instance of a small or the smallest available item to make decisions about how the items can be assembled. In some embodiments, various factors or parameters of an item such as a quote, a liner, an interview, a commercial, and/or a news feature or newsbreak segment can be analyzed and used to define production content creation, joining, or overlap behavior into a produced element. For example, in some embodiments, the production content creation server, system and method can analyze and/or receive data for a quote based on the content (e.g., such as the use of certain words that may not be acceptable to play during a broadcast). In other embodiments, the production content creation server, system and method can select or de-select (e.g., apply an override) based on the nature of the content and the current environment (e.g., such as understanding if the content relates to a specific public holiday and not to play the content outside of a corresponding holiday period). In some further embodiments, the production content creation server, system and method can include overlay or join factors for defining the behavior of the production content creation server, system and method when content elements are assembled into a produced element.

Some embodiments include a separation metric that uses a damping and logarithmic factors to increase a probability of broadcast over time. In some embodiments, the production content creation server, system and method can reduce the probability a specific content element (such as a specific news item, weather item, specific DJ announcement, etc.) is played during a specified or calculated period of time since the content item was last played. Some embodiments allow dampening to be adjusted using a GUI. In some embodiments, the production content creation server, system and method can essentially distribute content items through any period of time that is substantially random, and/or appears to a listener (independent of the listeners continuous listening period) to be within periodicity or repetition. In some embodiments, the production content creation server, system and method can apply a Simpsons index of diversity approach to understanding a pool of content and schedule a segment comprising a series of items that appear diverse over time.

In some embodiments, content delivered to a user can be processed using the production engine on the user's device or a coupled server platform by pulling content and following customized content from a pool of content elements. In other embodiments, a specially configured server can build in real time content that is (or is representative of) a customized produced element (e.g., such as a newsbreak) for delivery to the user. For example, in some embodiments, audio content elements produced by a newsreader, a broadcaster or brand anchor, an announcer such as a disc jockey a singer, a vocalist, an actor, a member of the public, an instrument, and/or a band, music beds, sweeps, voice-overs, or the like, can be selected and pulled and assembled in real time based on the characteristics and user driven preferences and/or brand preferences. In this instance, the engine can cascade priorities in real time to produce a pre-produced package that is being combined by the production engine or by a specially configured server that builds the audio content file in real time representative of the customized break as a single produced content element file.

In some embodiments, the audio blending system and method and/or the production content creation server, system and method can be coupled to or controlled using an autonomous, artificially intelligent, or pseudo artificially intelligent device controlled or interfaced with the user. For example, in some embodiments, the production content creation server, system and method can be coupled to or controlled through an internet connected device such as Amazon Echo™. In other embodiments, the production content creation server, system and method can be coupled to or controlled through an automotive entertainment system.

In some embodiments, the production content creation server, system and method can dissect content elements of available pooled content, label and make variable the elements, and drive the construction of a produced element based on possible surrounding elements, and any user experiences and preferences, and/or preferences of a brand. In some embodiments, the production content creation server, system and method can perform or process a join analysis by processing one or more primary and overlay content elements. For example, primary elements (which includes sweepers), can comprise songs, music beds, block (such as interviews with play). In some embodiments, sweepers can bridge between primary and overlay elements. Overlay content can comprise principally voice content in some embodiments.

In some embodiments, the production engine can process a music bed that can be extended to fit any length as needed through a) initial selection of an appropriate bed with a close duration and b) the looping of or cutting certain known, marked sections to morph the bed to a more exacting length. The spacing between overlaid elements can be adjusted in order to have the various points of synchronization within the music element matched almost exactly.

Some embodiments include the production content creation server, system and method performing a join analysis to determine whether sweepers are needed and/or if volume reduction at the end of a content element or sweeper is needed. In some embodiments, the production content creation server, system and method can include an analysis of how the content element ends, how the next content element begins, whether binding is needed (e.g., with special effects), and whether volume reduction of a previous content element is required to get a better match between content elements. In some embodiments, it can also "duck" the volume around overlays (to reduce the music volume when an announcer is speaking and then return it to a default level).

In some embodiments, the production content creation server, system and method can extend or reduce distance between content elements. Some embodiments include a characterization of transition (whether smooth, attractive), and determination if energy or mood is maintained or managed. In some embodiments, the production content creation server, system and method can include the use of tempo, amplitude, and/or harmonic factors in the analysis to characterize the mood or a multi-variant mood over a period of time. Some embodiments include the production content creation server, system and method performing an analysis of positive or negative words or emotions to define a sentiment of a produced element or a portion of a produced element or element.

In some embodiments, a produced content element can be processed by the production engine of the production content creation server, system and method to include mood constraining parameters. In some embodiments, content elements including, but not limited to, one or more announcements, one or more news items, one or more weather items, one or more specific DJ announcements, one or more newsbreak items or features, or at least a portion of a commercial, text-to-speech content, at least one sweeper, a music bed, etc., can be included to alter mood. For example, in some embodiments, a first audio file can comprise a low energy portion, and the second audio file can comprise a high energy portion. In some embodiments, in real time, the production content creation server, system and method can apply a selection process uses constraining criteria to select the content items with different energy levels and arrange the items to smoothly bridge the energy levels of the first and second audio files when the produced element is inserted into the broadcast. In some embodiments, time compression/expansion can be applied to constrain a production content to a specified period of time without any change in pitch of any portion of the production content. Time compression/expansion is a DSP process that would be done at time of ingestion of the content to be adjusted. This is a technique that is used to subtly alter the length of some items (voice overs, music beds, sound effects, etc.) to create far more variants than were originally provided by the talent and/or producers. Using this method, time can be stretched without altering pitch by small amounts. For example, a five second announcer read can be compressed and expanded to the following durations: 4.5, 4.6, 4.7, 4.8, 4.9, 5.1, 5.2, 5.3, 5.4, 5.5. These variants are used to better fit the time available in song overlays and music beds, enabling very precise timing without having to force human talent to generate all of the needed variants.

Figure 26:
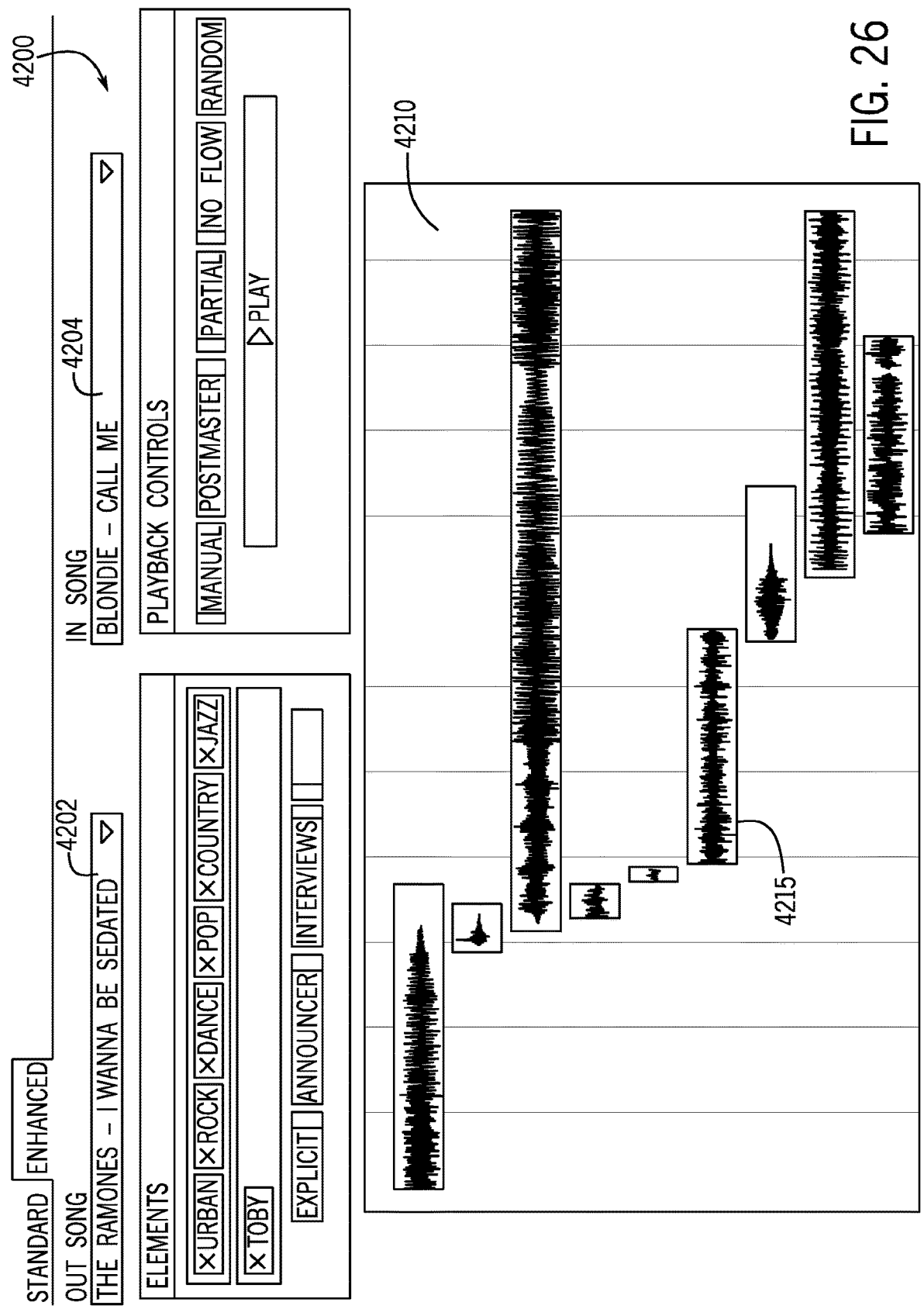
FIG. 26 illustrates a production engine interface of the production content creation server, system and method in accordance with some embodiments of the invention.
Figure 27A:
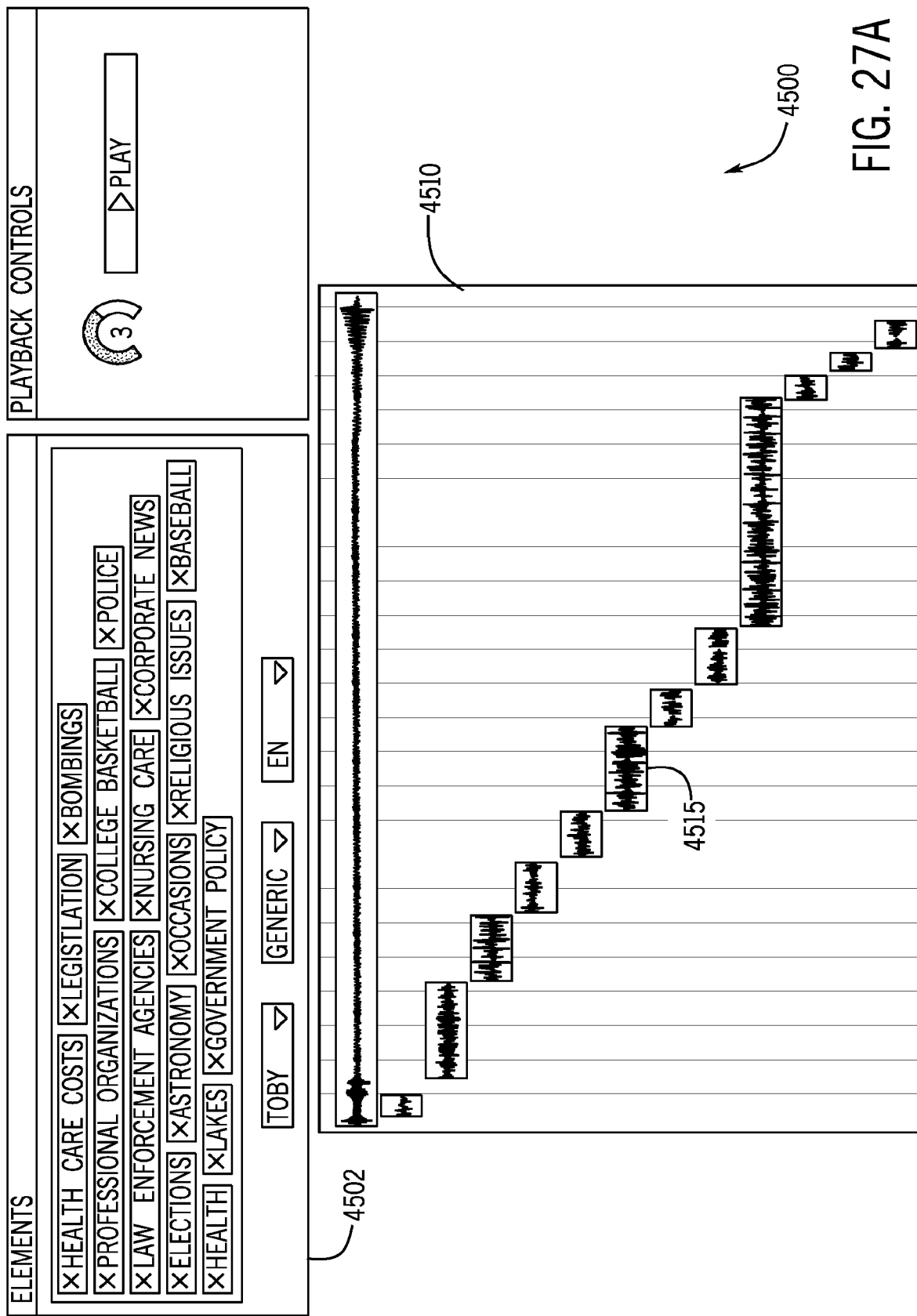
FIG. 27A illustrates a produced element interface of the production engine interface of FIG. 26 in accordance with some embodiments of the invention.
Figure 27B:
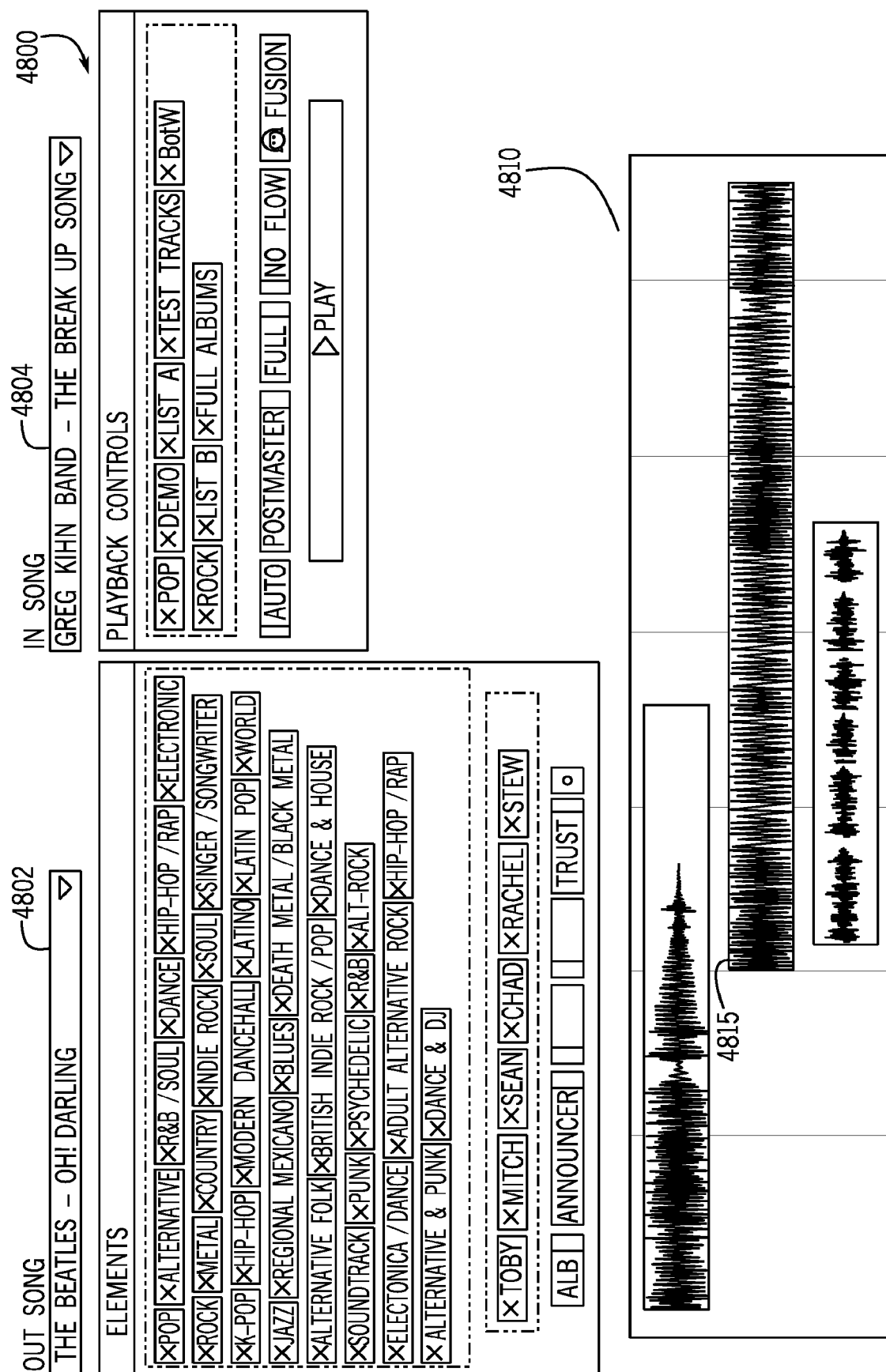
FIG. 27B illustrates a production engine interface of the production content creation server, system and method in accordance with some further embodiments of the invention.

In some embodiments, one or more of the above described methods of the production content creation server, system and method can be controlled through a dedicated GUI. For example, FIG. 26 illustrates a production engine interface 4200 of the production content creation server, system and method in accordance with some embodiments of the invention, and FIG. 27A illustrates a produced element interface 4500 of the production engine interface of FIG. 26 in accordance with some embodiments of the invention. Referring to FIG. 26, in some embodiments, the interface 4200 can enable selection and assembly of a produced element between an out content item 4202 and an in content item 4204. FIG. 27A shows an interface 4500 for selection and assembly of a produced element 4510 using a pool of news or informational content elements 4502 as shown. In some embodiments, the interface 4500 can enable visualization of a cascade of content elements 4515 within the produced element 4510. In some embodiments, the produced element 4515 shown in FIG. 27A can be stitched to the produced element 4215 of FIG. 26. In other embodiments, the produced element of FIG. 27A can be integrated between the in and out content items shown in FIG. 26. FIG. 27B illustrates a production engine interface 4800 of the production content creation server, system and method in accordance with some further embodiments of the invention. FIG. 27B shows an alternative interface 4500 for selection and assembly of a produced elements 4815 in a produced content display 4810 for out song 4802 and in song 4804.

In any of the embodiments described earlier, content can be pre-sequenced. Some further embodiments of the invention include creating pre-sequenced content for a broadcast segment or audio production. In some embodiments, using selected content elements, sequence content can be created that can then be used alone or in combination with one or more other sequenced content and/or other selected content for production of a produced element using a production engine. The technology can be applied to a variety of broadcast types including, but not limited to, a music and/or song show or feature, a commercial, a newsbreak, an announcer or DJ break, an interview, and/or a documentary. Some embodiments of the invention include an audio sequence system and method capable of selecting and characterizing audio content to create a broadcast segment in a defined sequence substantially in real time or near real time using a sequencing engine. In some embodiments, the audio sequence system and method can select and join a plurality of content elements in a defined sequence to create the broadcast segment. All parts of the broadcast can be variable, and content segments can be created using the sequencing engine for a broadcast segment such as a broadcast of a plurality songs or music defined in the playback in a specific sequence, songs or music with news, clips, interviews, commercials, announcements, or virtually any audio content including spoken words or text to speech items, sweepers, or other audio sounds.

In some embodiments, the sequencing engine can produce a sequenced content element that can be assembled using the methods as described earlier. For example, some embodiments include one or more sequenced content elements that can be assembled or "stitched" using the methods as described. In some embodiments, the produced content or broadcast segment can include content elements such as one or more songs. In other embodiments, the produced content or broadcast segment can be implemented as a standalone broadcast, or within a broadcast segment that includes content element such as one or more songs that have been assembled using any conventional assembly methods. For example, in some embodiments, the created content segment can be inserted into a broadcast at any time. In some further embodiments, the created content segment can be faded or blended into a broadcast at any time. In some embodiments, the insertion, fading or sequencing can be timed based on the broadcast content, the content segment content, user preferences, and/or brand preferences.

Some embodiments of the invention include an audio sequencing system and method capable of characterizing one or more parameters of a first content item, one or more parameters of at least one other content item, and preparing a content segment with a defined sequence or arrangement of content items. In some embodiments, the one or more characteristics of the audio sequencing can be based at least in part on one or more of the parameters of the first content item and/or any number of other content items in the content segment. In some embodiments of the invention, the audio sequencing system and method can include at least one machine process such as a process performed by a computer system or specially configured server (referred to herein as a "computer system") executing one or more software modules of the audio sequencing system and method. In some embodiments, the audio sequencing system and method can also include one or more analytical methods performed by a human analyst. In some embodiments of the invention, the audio sequencing system and method can analyze one or more content items using at least one computer system based method and at least one human analyst or operator.

Figure 28:
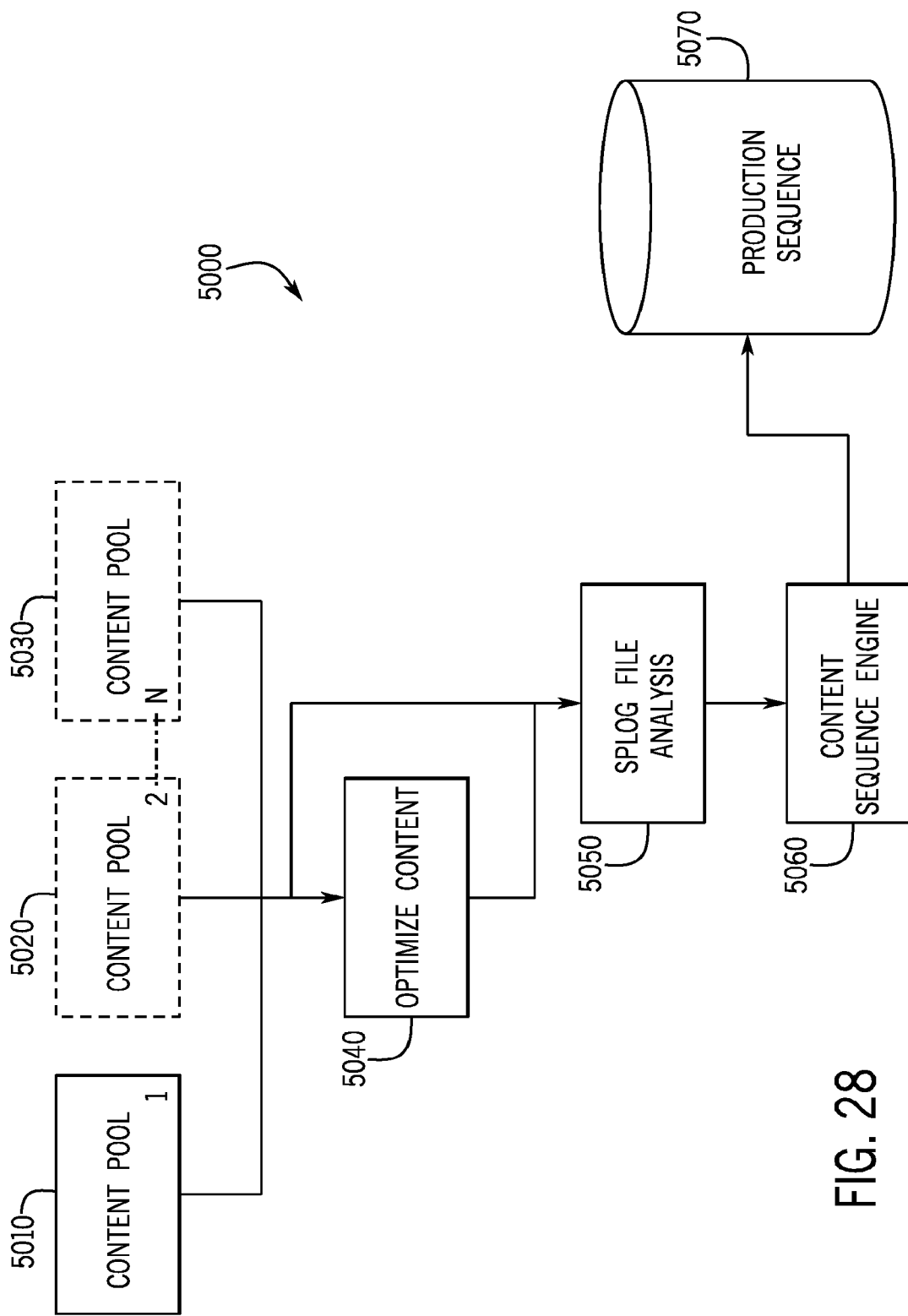
FIG. 28 depicts a production sequencing method according to some embodiments of the invention.

FIG. 28 depicts a production sequencing method 5000 according to some embodiments of the invention. In some embodiments, one or more content pools 5010, 5020, 5030 can be used by the sequencing engine to produce one or more sequenced content elements. In some embodiments, content retrieved from one or more of the content pools can used to create an optimized pool of content. The content can comprise any type of content and associated metadata. For example, non-limiting examples as described below can include songs as types of content. In other embodiments, the content can comprise any audio and/or audio-visual content described herein. For example, in the case of voice over content, the content can comprise the voice, and/or the mood of read, and/or the length of the read, and/or the core message of the read, and/or the exact text of the read, and/or the category of message, and/or the appropriate genre(s) for the voiceover, and/or the related content for the read (artist, album, track, genre, channel, brand).

In some embodiments, optimization can include screening and selecting content elements by genre, artist, popularity, sales volume, mood, energy, etc. In other embodiments, the content can be accessed and used un-optimized, or the content pool provider can provide pre-optimized content. In some embodiments, the sequencing engine can access parameters or attributes associated with the content element. These parameters can be stored in a splog file that is accessed or calculated by the audio sequencing system and method. In some embodiments, the splog file can include how one content item relates to another song, the mood, energy level, etc. In some embodiments, the splog file data can be applied to the pool of content to determine the order. The splog file can be used to create an order or sequence of content items based on a rules engine and/or one or more definable parameters. This can be used to create a mood or energy of a production sequence such as a natural feel. The experience selection can be based on user preferences, brand preferences, an algorithm, and/or system preferences. In some embodiments, the splog file can be used as a final filter to optimize the pool so that the pool can be filtered based on the energy attributes of all the content items so that playlist has the most natural feel. The splog file data can help to provide sequencing decisions to enable the audio sequencing system and method to define the content order to produce a desired or specific listening experience. Using a sequencing engine 5060, a production sequence 5070 can be generated using content elements from one or more pools of content (e.g., 5010, 5020, 5030) and processed using a splog file analysis 5050. Pools of content including optimized pools of content can be used, and are widely known and used in the broadcasting industry. In some instances, the pools of content can be provided by a third party. In some embodiments, the pools can be used raw (e.g., as provided and unoptimized), or can be optimized pools. In some embodiments, the system and method can optimize 5040 any accessed and/or accumulated content 5010, 5020, 5030. In some embodiments, the audio sequencing system and method can build or process a library of elements within a library database that can be within the content pool for use with sequencing. In some embodiments, the sequencing can take into account all the elements of a constructed sequence, and using the content and order, the audio sequencing system and method can use sequencing processes with any of the library content built by the audio sequencing system and method.

In conventional content creation (e.g., for a radio station), content sequencing is generally created using a selection process based on a sequence order (e.g., based on positions on a clock face) where a specific sequence is selected based on the position on the clock face (e.g., where specific times or ranges of times can specify playing from a specific content pool such as an "A" type content pool, "B" type content pool, or "C" type content pool), and based on any specific time, content is selected from any one of the specified content pools. Any content that has been played is recorded in a log (comprising content item play history), and based on one or more rules such as when the last time a specific artist from any one content pool has been played, an artist is played or skipped in favor of another selection from the pool. Any played content is rotated to the back of the content pool (e.g., "A" type content pool, "B" type content pool, or "C" type content pool based on the originating pool). Using this method, content item separation can be based on the number of content items in the content pools, and the number of times the content pool appears on the clock sequence. In general, for various reasons, interactivity can prevent the convention content sequencing from functioning effectively. However, derived from the conventional methods as described, content sequencing can be successfully implemented using one or more random variables, rules, or combinations thereof. For example, in some embodiments, content can be selected randomly from any one or more pools or content. Moreover, the content of each of the pools can be randomized at any time, before or after one or more selections from any one of the pools of content.

Figure 29:
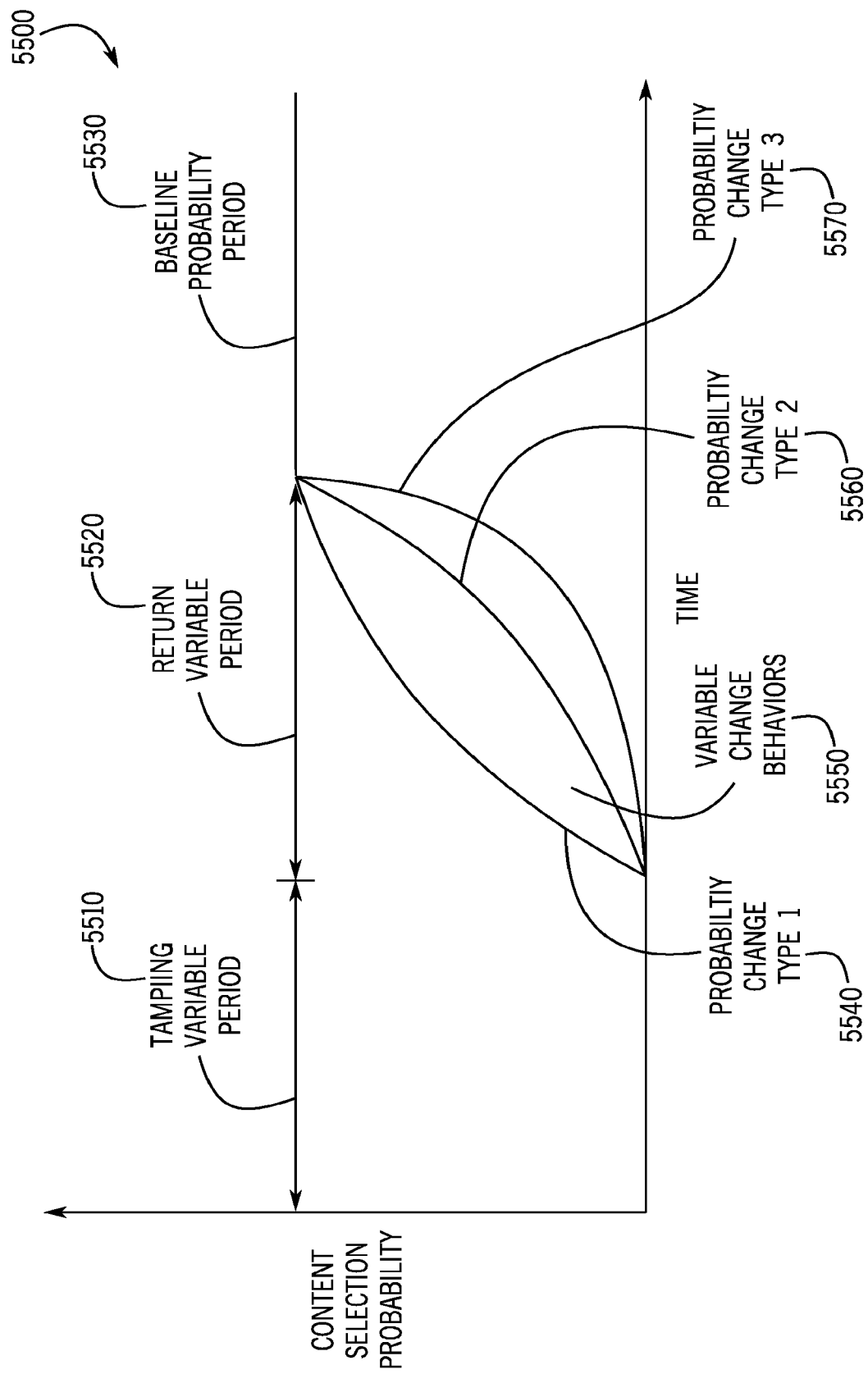
FIG. 29 depicts the probability of selection of a pool of content or any content of any pool from being available for selection during a random selection event in accordance with some embodiments of the invention.

In some embodiments, the probability of any one of the pools or any content of any one of the pools from being available for selection during a random selection event can be modified. For example, in reference to graph 5500 of FIG. 29 showing content selection probability as a function of time, in some embodiments, during any time period, there can be a zero probability of the content being played (shown as the 'tamping variable period' 5510). Within another time period, there can be a "return" period 5520, where the probability of the content being played rises, and eventually returns to a base probability 5530 assigned to the content or pool of content. In some embodiments, depending on a variety of factors, the return period behavior can vary as shown as probability types 1 (5540), type 2 (5560), and type 3 (5570). The tamping period can also vary in some embodiments. For example, in some embodiments, the tamping period and/or return and the rise behavior can depend on the content (e.g., such as the song or the album the song originates), the genre, popularity, one or more splogging variables as disclosed herein (e.g., such as not playing more than three content items with long introductions within a specific time period), the base level probability, or combinations thereof, etc.

In some embodiments of the invention, the content selection can be multidimensional including a song or item, a video, etc., and additionally, attributes of the content can be used to adjust the probability of the playing of the content such as the artist, album, genre, mood, theme (i.e., any of the slogging attributes disclosed herein). For example, selection of an element may pass an artist selection criteria but fail a mood criteria, however, the probability selection is adjusted so that there is no failure to zero (i.e., a content element will always be selected to play regarding of the applied criteria to any randomly selected content from any random or specifically selected pool of content.

In some embodiments, the content selection can use a temporal timing selection as described above with respect to conventional methods to drive or affect the outcome of probability selection defined and described in FIG. 29. For example, when a clock position defines selection from an "A" type pool, any selected content probability derived from the method of FIG. 29 is driven towards "A" type content and away from "B" and "C" type content. In other embodiments, rather than the "A" type content selection being derived based on time, the driving content (e.g., whether driving "A", "B", or "C" content) can be based on a specific sequence of A, B, and C content (e.g., such as 'acbcbacbacab' or 'bcacbacbacacb', and so on). This methods allows for flexibility to insert items without being driven solely by a time sequence. For example, an ad can be inserted between the first bac and the second bac of the sequence 'bcacbacbacacb', and after the add is inserted, the sequence continues from the ad to the second bac sequence.

In some further embodiments, any content or category of content described herein can be assigned a specific probability of playing. For example, a first category can be assigned a 20% chance, a second category can be assigned a 30% chance, and a third category can be assigned a 50% chance of playing. In some other embodiments, any content or category of content described herein can be assigned a specific probability of playing that can be influenced by a temporal clock as described above.

Some embodiments can include one or more overrides of selection parameters. In some embodiments, any selected content can be arranged in sequence based on a rules engine or rules defined in a rules database (defining the override). In some embodiments, the sequencing engine can then apply one or more rules to any content item from any number of buckets of content. In some embodiments, content sequencing can be defined using more than one rule. In some embodiments, one or more rules can be dominant or controlling over one or more other rules. For example, for any given content pool including settings for separation, the settings can be modified for any period of time. For example, for any given period, if the combination of settings initially defined the selection probability from one category to be zero, content may still be played from the category during a specified time period (e.g., during a period running from Thanksgiving Holiday to Christmas) based at least in part on an override rule (i.e., that specifies content from the initially zero probably pool to be played during the specified period). As a further non-limiting example embodiment, some embodiments include applying a gender rule that ensures two female vocalists do not play sequentially. In some further embodiments, rules can be based on a mood level or type. In some embodiments, combinations of mood and genre can interplay with respect to which type of announcer and/or events for the break can be sequenced by the audio sequencing system and method. In some embodiments, the audio sequencing system and method can recognize the difference between genres and types of moods (such as high-energy jazz and high-energy rock) by a spectrum balancing process. As a non-limiting example, a broadcast of post-lunch playing of content items can be created by using transition information to choose content items to order the sequence based on the splog data to control the mood or energy level (e.g., to maintain an upbeat or medium to high energy to encourage or influence the alertness of the listener). In some further embodiments, rules can be at least partially based on frequency of play and separation. In some further embodiments, content sequencing can be based on one or more constriction rules to ensure a sequenced content comprises a non-diversified content (e.g., such as when featuring content from one artist or combination of a limited number of artists). In some other embodiments, content sequencing can be based on one or more diversification rules to ensure a sequenced content comprises a diversified content (e.g., such as when featuring content from a plurality of artists and/or genres) to ensure the sequenced content is diverse. In some embodiments, one or more rules can be applied based on one or more date and/or time periods. In some embodiments, the rules can be applied based on separation, averaging, peaks and/or valley limiting of the content (e.g., specifying an average mood across a certain number of content items, or peaking at a certain content item or time period).

In some embodiments, the content of the content pools can be based at least partially on human input. In some further embodiments, the content of the content pools can be based at least partially on automated selection (e.g., by a computer, including a system 30 of the audio sequencing system and method). In some embodiments, the content of the content pools can be based at least partially on human input and system input). Further, in some embodiments, the rules applied to content of the content pools can be based at least partially on human input. In some further embodiments, the rules of the content pools can be based at least partially on automated selection (e.g., by a computer, including a system 30 of the audio sequencing system and method analyzing the pool of content). In some further embodiments, the rules of the content pools can be based at least partially on human input and system input. In some embodiments, the system can override any combination of rules initially defined by a human. In other embodiments, automated rules can be overridden by human input. In some embodiments, one or more rules can be relaxed (using an ease-back process).

In some embodiments, one or more brand content pools can be linked to the brands preferences. For example, in some embodiments, a brand content pool can comprise pieces of audio, music beds, sweepers, and other factors that are being sequenced that define a sound that is the content pool including liners, sweepers, news, produced features, artist interviews, etc. In some embodiments, any number or combination of content elements from the pool can be assembled in a specific sequence so that the resulting broadcast segment at least partially defines the brand and distinguishes the brand from competitive offerings.

In some embodiments, in real time, the audio sequencing system and method can apply a selection process that uses constraining criteria applied to selected content including, but not limited to an one or more specific artists, one or more artist's albums, chart data (e.g., such as popularity or sales), and non-interpretive meta-data, splog data, etc. Further, other data can be used including individual user data, future audience data, and historical data including sequence history or recurring temporal parameters of the sequences.

In some embodiments, sequencing ordering can be fixed. In some embodiments, content can be selected from one or more buckets of content and arranged in a fixed or random order. In some embodiments, buckets of content can include sub-categories or buckets of content within a bucket of content. In some embodiments, the buckets of content can be categorized, and content can be selected from any one of multiple categorized buckets of content. For example, in some embodiments, buckets of content can be categorized by one or more parameters, including, but not limited to release data, announcer drops, newsbreaks, etc. In some further embodiments, content can be selected from one or more buckets of content, and can be arranged dynamically in order in real time. In other embodiments, contents selected from one or more buckets of content can be played for a certain percentage of time (e.g., played at least once or multiple times over a period of time). In some embodiments, in addition to fixed and random sequencing of content, hybrid sequencing can be used based on one or more methods including played or repeated interval time, fixed or hard sequence rules, random selection, or combinations thereof.

In some embodiments, real time audio content selection can comprise a user playing content in real time and a next content can be selected based on a selection from a pool and the user's play history using any combination of the selection and sequencing rules described earlier. The audio sequencing system and method can apply a selection process for a content that is next played by the user substantially in real time or near real time. In some embodiments, the selection is stitched with other content items. In other embodiments, the audio sequencing system and method can apply a selection process in batch to produce content of any size for any play period. For example, for an offline user, the audio sequencing system and method can apply a selection process to define a total play content with a play list into the future for a specific period of time.

In some embodiments, the audio sequencing system and method can apply a look-back process to search for content played in the past at any specific time or during any specific time period. Using this process, the audio sequencing system and method can apply a selection process to avoid content selection for playing during similar time periods. In some embodiments, the look-back process to search for content played based on mood, songs, albums, genres, artists, or any splogging criteria to avoid time period repetition of the content selection. In some embodiments, the audio sequencing system and method can apply any rules to content taking into account gaps in a user's listening period. For example, in some embodiments, a look-back process applied over a longer time period during which a user was not listening can be compressed and applied to a user's total listening time (i.e., the listening time period comprising separated listening time periods). The audio sequencing system and method can adjoin each listening time, or reduce by a certain factor.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general purpose computer selectively activated or configured by one or more computer programs stored in the computer memory, cache, or obtained over a network. When data is obtained over a network the data can be processed by other computers on the network, e.g. a cloud of computing resources.

The embodiments of the present invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A server system comprising:
   at least one processor;
   a production engine;
   a non-transitory computer readable medium, having stored thereon, instructions that when executed by the at least one processor, cause the production engine to perform operations comprising:
   downloading a selection of audio elements based at least in part on a predefined parameter comprising at least one of a listener preference, a production engine preference, and a third-party preference;
   using downloaded metadata or any portion of the audio elements, learning or identifying a characteristic of the selection of audio elements based at least in part on an analysis of any one or more of rhythmic profile, chordal, melodic content, harmonic, and amplitude over time; and
   at least in part based on the characteristic, arranging at least some of the selection of audio elements into at least one content audio file on a production database, the at least one content audio file being available as a produced portion of a broadcast.

2. The server system of claim 1, wherein the selection of audio elements are processed to at least one of a pre-selected dynamic range, equalization, and duration.

3. The server system of claim 1, wherein the server system couples to at least one content feed which includes at least one of an RSS feed, a JSON file, a POX file, a CSV file, and a text file.

4. The server system of claim 1, wherein the server system couples to at least one content feed which comprises at least one of a third-party server or database, and at least one internal server or database of the server system.

5. The server system of claim 4, wherein accessible content of the content feed includes at least one of at least one news article, at least one news brief, at least one news event, at least one news break, at least one news announcement, at least one current news event, lifestyle related news, social media news, and a past or historical news event, at least one sound effect, live speech, recorded speech, and speech rendered from a text source.

6. The server system of claim 4, wherein accessible content of the content feed includes at least one of an article or event, a commercial or ad, announcer information, DJ information, at least a portion of a song, music, sound effect, trivia information, weather information, lifestyle related information, social media information, and interviewer or interviewee information.

7. The system of claim 1, wherein the non-transitory computer readable medium includes instructions that when executed by the computing device, cause the computing device to perform operations comprising:
   selecting at least one production break audio file; and
   blending the at least one production break audio file with at least one other content file.

8. A production content server system comprising:
   a computing device comprising at least one processor;
   a non-transitory computer readable medium, having stored thereon, instructions that when executed by the computing device, cause the computing device to perform operations comprising:
   causing a content maker engine to couple to at least one content server or database, the at least one content server or database including at least one content audio file, the at least one content audio file comprising content from at least one content source, the content including at least one of audio and video;
   receiving from a user content break parameters including at least one of a type of content, a content age or currency, a number of content articles to include, a language, a start time, a volume, a duration of a single content article, or group of content articles;
   retrieving the at least one content audio file by accessing the production content database, the at least one content audio file selected based at least in part on the content break parameters;
   attempting preparation of at least one sequence, wherein a successful attempt is based at least in part on at least one of user provided priorities, one or more priorities from the content break parameters, and one or more parameters from an at least one new content audio file;
   for a successful attempt, using the sequence, processing a production break audio file including the at least one content audio file;
   for an unsuccessful attempt, returning to retrieving the at least one content audio file and repeating attempting preparation of the at least one sequence using a greater number of breadth of content themes and content times than used in any one previous attempt; and blending the at least one production break audio file with at least one other content file.

9. The system of claim 8, wherein the at least one other content file includes at least one of a song and a music file.

10. The system of claim 8, wherein the at least one content source comprises at least one of a third-party server or database, at least one internal server or database of the production content server system, a JSON file, a PDX file, a CSV file, a TEXT file, and an RSS feed.

11. The system of claim 8, wherein the blending comprises an overlap between the at least one production break audio file and the at least one other content file.

12. The system of claim 8, wherein the blending is based on at least one of a mood, a specific voice override, a style, and a genre of the at least one other content file.

13. The system of claim 8, wherein the content break parameters include at least one of a mood, a specific voice override, and genre of the at least one other content file.

14. The system of claim 8, wherein the at least one other content file is selected based at least in part on an availability of production break audio file and the mood, a specific voice override, and genre of the at least one other content file.

15. The system of claim 8, wherein the content includes at least one of a news article, a news brief, a news event, a news break, a news announcement, a current news event, lifestyle related news, social media news, and a past or historical news event.

16. The system of claim 8, wherein the content includes at least one of an article or event, a commercial or ad, announcer information, DJ information, at least a portion of a song, music, sound effect, trivia information, lifestyle related information, social media information, weather information, and interviewer or interviewee information.

* * * * *

UNITED STATES PATENT AND TRADEMARK OFFICE
CERTIFICATE OF CORRECTION

PATENT NO. : 10,990,350 B2
APPLICATION NO. : 16/717096
DATED : April 27, 2021
INVENTOR(S) : Zack J. Zalon et al.

Page 1 of 1

It is certified that error appears in the above-identified patent and that said Letters Patent is hereby corrected as shown below:

In the Claims

Claim 10, Column 49, Line 8, the text "a PDX file," should read -- a POX file, --

Signed and Sealed this
First Day of June, 2021

Drew Hirshfeld
*Performing the Functions and Duties of the*
*Under Secretary of Commerce for Intellectual Property and*
*Director of the United States Patent and Trademark Office*